US012603076B2

(12) United States Patent
Kano

(10) Patent No.: US 12,603,076 B2
(45) Date of Patent: Apr. 14, 2026

(54) NOISE CONTROL SYSTEM, NON-TRANSITORY COMPUTER-READABLE RECORDING MEDIUM INCLUDING A PROGRAM, AND NOISE CONTROL METHOD

(71) Applicant: Panasonic Intellectual Property Corporation of America, Torrance, CA (US)

(72) Inventor: Hiroyuki Kano, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 182 days.

(21) Appl. No.: 18/664,733

(22) Filed: May 15, 2024

(65) Prior Publication Data

US 2024/0296823 A1 Sep. 5, 2024

Related U.S. Application Data

(63) Continuation of application No. PCT/JP2022/040288, filed on Oct. 28, 2022.

(30) Foreign Application Priority Data

Nov. 18, 2021 (JP) ................................ 2021-187532

(51) Int. Cl.
*G10K 11/178* (2006.01)

(52) U.S. Cl.
CPC .. *G10K 11/17825* (2018.01); *G10K 11/17823* (2018.01); *G10K 11/17881* (2018.01); (Continued)

(58) Field of Classification Search
None
See application file for complete search history.

(56) References Cited

U.S. PATENT DOCUMENTS 6,418,228 B1 * 7/2002 Terai ................ G10K 11/17854 381/71.8
9,129,586 B2 9/2015 Bajic et al.
(Continued)

FOREIGN PATENT DOCUMENTS

CN 112053675 B * 10/2025 ......... G10L 21/0208
EP 0973151 A2 * 1/2000 ....... G10K 11/17833
(Continued)

OTHER PUBLICATIONS

International Search Report issued in International Pat. Appl. No. PCT/JP2022/040288, dated Jan. 24, 2023, along with an English translation thereof.

*Primary Examiner* — Qin Zhu
(74) *Attorney, Agent, or Firm* — Greenblum & Bernstein, P.L.C.

(57) ABSTRACT

A noise control system includes: a noise detector; a first control filter that outputs a first control signal; a second control filter that outputs a second control signal; an adder that adds the first control signal and the second control signal to output a third control signal; a speaker that generates a control sound on the basis of the third control signal; an error microphone; a transmission characteristic corrector; a first coefficient updater that updates a coefficient of the first control filter so as to minimize the error signal; a first band limiting filter that performs a band limitation to the noise signal; a second band limiting filter that performs a band limitation to the third control signal; and a second coefficient updater that updates, on the basis of an output signal from the first band limiting filter and an output signal from the second band limiting filter, a coefficient of the second control filter.

12 Claims, 51 Drawing Sheets

(52) U.S. Cl.
CPC ................ *G10K 2210/3026* (2013.01); *G10K 2210/3027* (2013.01); *G10K 2210/3028* (2013.01)

(56) References Cited

U.S. PATENT DOCUMENTS

| | | | | |
|---|---|---|---|---|
| 9,633,645 | B2 * | 4/2017 | Wurm | G10K 11/17854 |
| 2004/0247137 | A1 * | 12/2004 | Inoue | G10K 11/17854 381/71.4 |
| 2008/0317254 | A1 * | 12/2008 | Kano | G10K 11/17857 381/71.4 |
| 2014/0072135 | A1 * | 3/2014 | Bajic | G10K 11/17854 381/71.11 |
| 2021/0304726 | A1 * | 9/2021 | Wang | G10K 11/17854 |
| 2022/0230621 | A1 * | 7/2022 | Sakamoto | G10K 11/17823 |

FOREIGN PATENT DOCUMENTS

| | | | | | |
|---|---|---|---|---|---|
| EP | 4057276 | B1 | * | 8/2024 | H04R 3/005 |
| EP | 3828880 | B1 | * | 1/2025 | H04M 9/08 |
| JP | 04-190396 | | | 7/1992 | |
| JP | 05-073074 | | | 3/1993 | |
| JP | 07-271383 | | | 10/1995 | |
| JP | 2000-089770 | | | 3/2000 | |
| JP | 2000-347671 | | | 12/2000 | |
| JP | 2004354657 | A | * | 12/2004 | G10K 11/17854 |
| JP | 2004361721 | A | * | 12/2004 | G10K 11/17855 |
| JP | 2009029405 | A | * | 2/2009 | G10K 11/17881 |

* cited by examiner

NOISE CONTROL SYSTEM, NON-TRANSITORY COMPUTER-READABLE RECORDING MEDIUM INCLUDING A PROGRAM, AND NOISE CONTROL METHOD

FIELD OF INVENTION

The present disclosure relates to a noise control system, a non-transitory computer-readable recording medium including a program, and a noise control method.

BACKGROUND ART

For instance, each of Patent Literatures 1, 2 discloses a noise control device belonging to a background art and using an active noise control (ANC) system.

However, the noise control device disclosed in each of Patent Literatures 1, 2 is used under a condition that a causality of the ANC system that a control processing time is shorter than a noise propagation time is satisfied, and thus may cause a noise increase when the causality is not satisfied.

Patent Literature 1: Japanese Unexamined Patent Publication No HEI 7-271383

Patent Literature 2: Japanese Unexamined Patent Publication No. 2000-347671

SUMMARY OF THE INVENTION

The present disclosure has an object of providing a noise control system, a non-transitory computer-readable recording medium including a program, and a noise control method each achieving suppression of a noise increase even when a causality of an ANC system is not satisfied.

A noise control system according to one aspect of the present disclosure includes: a noise detector that detects a noise from a noise source to output a noise signal; a first control filter that performs signal processing to the noise signal to output a first control signal; a second control filter that performs signal processing to the noise signal to output a second control signal; an adder that adds the first control signal and the second control signal to output a third control signal; a speaker that generates a control sound on the basis of the third control signal; an error microphone that is provided at a control point and detects an interference sound of the noise and the control sound to output an error signal; a transmission characteristic corrector that has a transmission characteristic coefficient in accordance with a transmission characteristic from the speaker to the error microphone and performs signal processing to the noise signal on the basis of the transmission characteristic coefficient; a first coefficient updater that updates, on the basis of an output signal from the transmission characteristic corrector and the error signal, a coefficient of the first control filter so as to minimize the error signal; a first band limiting filter that performs a band limitation to the noise signal in such a manner as to fall within a predetermined frequency band; a second band limiting filter that performs a band limitation to the third control signal in such a manner as to fall within the predetermined frequency band; and a second coefficient updater that updates, on the basis of an output signal from the first band limiting filter and an output signal from the second band limiting filter, a coefficient of the second control filter so as to minimize the output signal from the second band limiting filter.

DETAILED DESCRIPTION

Knowledge Forming the Basis of the Present Disclosure

An active noise control (hereinafter, referred to as an "ANC") of canceling a noise by generating a sound having a reverse phase from a control speaker is practically adapted for a sound from an automobile engine, an air conditioning duct, and the like. For each adaptation, a feedforward control (hereinafter, referred to as an "FF control") using an adaptive filter is predominant, and this control way is established under a major condition that all the processes are finished before a noise reaches a control point. The major condition will be described with reference to the accompanying drawings.

Figure 16:
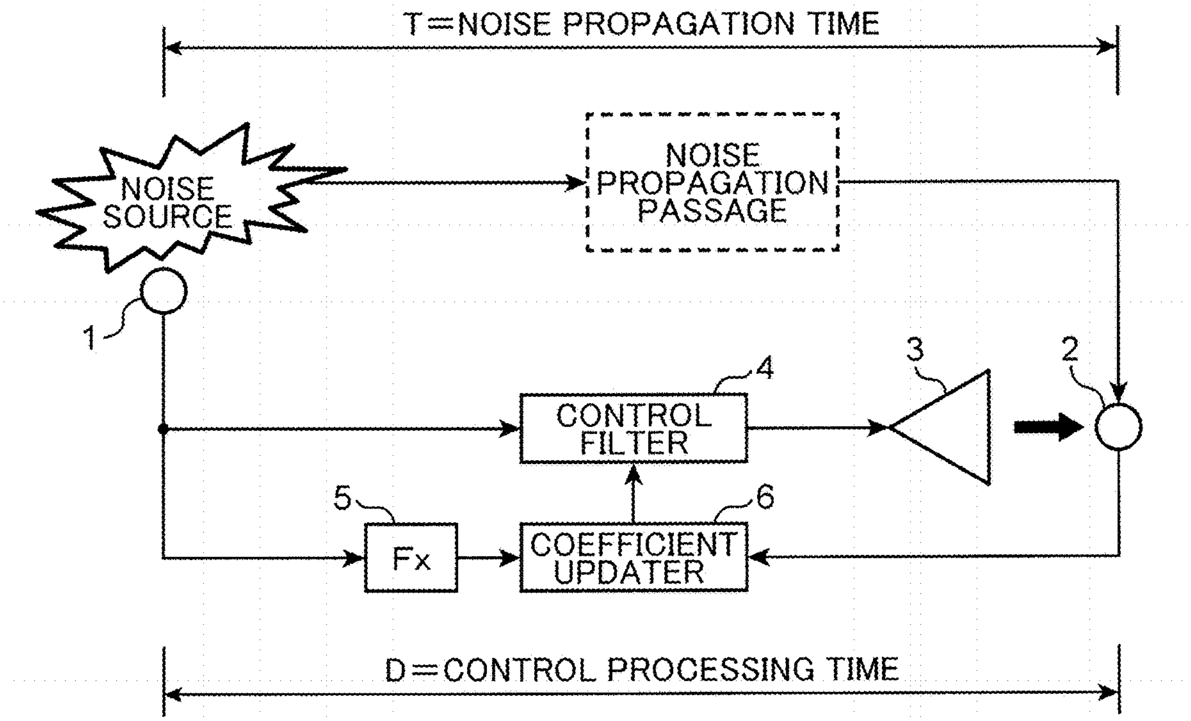
FIG. 16 is a configuration diagram explaining an operation principle of a typical active noise control (ANC).

FIG. 16 is a diagram showing a typical ANC using an adaptive filter. A noise control device includes a noise microphone 1 serving as a noise detector, an error microphone 2 provided at a control point, a speaker 3, a control filter 4, a transmission characteristic corrector (hereinafter, referred to as an "Fx filter") 5 that corrects a noise signal on the basis of a transmission characteristic from the speaker 3 to the error microphone 2, and a coefficient updater 6 that updates a coefficient of the control filter 4.

First, the noise microphone 1 detects a noise occurring from a noise source, and a detection signal thereof is subjected to signal processing with a coefficient of the control filter 4. Then, the speaker 3 receives an output signal from the control filter 4 as a control signal to generate a control sound. Thereafter, the noise having been propagated from the noise source through a noise propagation passage interferes with the control sound from the speaker 3, and the error microphone 2 detects a result of the interference to be an error signal.

By contrast, the noise signal from the noise microphone 1 is input into the Fx filter 5 and subjected to signal processing with a coefficient of the Fx filter 5. Here, the coefficient of the Fx filter 5 approximates to the transmission characteristic from the speaker 3 to the error microphone 2. The coefficient updater 6 receives an output signal from the Fx filter 5 and the error signal from the error microphone 2, and the coefficient updater 6 updates, on the basis of the received information, a coefficient of the control filter 4 so as to minimize the error signal. A combination of the control filter 4 and the coefficient updater 6 is referred to as an "adaptive filter" as well. Repeating the process sequence leads to a reduction in the noise at the control point of the error microphone 2.

The coefficient updater 6 generally adopts a least mean squares (hereinafter referred to as "LMS") algorithm, but may adopt another algorithm or way, such as a learning identification way. Such an LMS algorithm using the Fx filter 5 is called "Filtered-x LMS algorithm", and this algorism is also a generally used way.

Heretofore described is the operation of the typical ANC using the adaptive filter. A precondition for normal working of the operation requires a relation between a time T and a time D to satisfy "D<T", the time T being a noise propagation time required for a noise to reach a control point via a noise propagation passage and the time D being a control processing time required for a noise signal detected at the noise microphone 1 to be reproduced as a control sound from the speaker 3 via the control filter 4 and reach the error microphone 2. In a case where the condition is not met, the control is not made in time before the noise reaches the control point, that is, the control delays. This results in an increase in the noise.

For instance, adaptation of the ANC to reduce a noise from a home appliance, such as an air conditioner or a cleaner, indispensably needs a size reduction in a control system in such a manner that the appliance accommodates relevant control devices including a microphone and a speaker therein. The size reduction is less likely to ensure a sufficient distance from a source of the noise to the control point. Consequently, a sound control delays out of a noise transmission time required for the noise to reach the control point from the source of the noise. Besides, unspecified noise sources need to be taken into consideration in adaptation of the ANC for, for example, a running noise from an automobile. Under the circumstances, an increased correlation (coherence) between the noise signal detected at the noise microphone and the error signal detected at the error microphone is necessary to satisfactorily ensure a noise reduction effect, and hence, the noise microphone is required to be arranged much closer to the error microphone. This makes it impossible to ensure a sufficient time for the noise control, resulting in increasing a risk of a failure that the noise control is not made in time.

Figure 17:
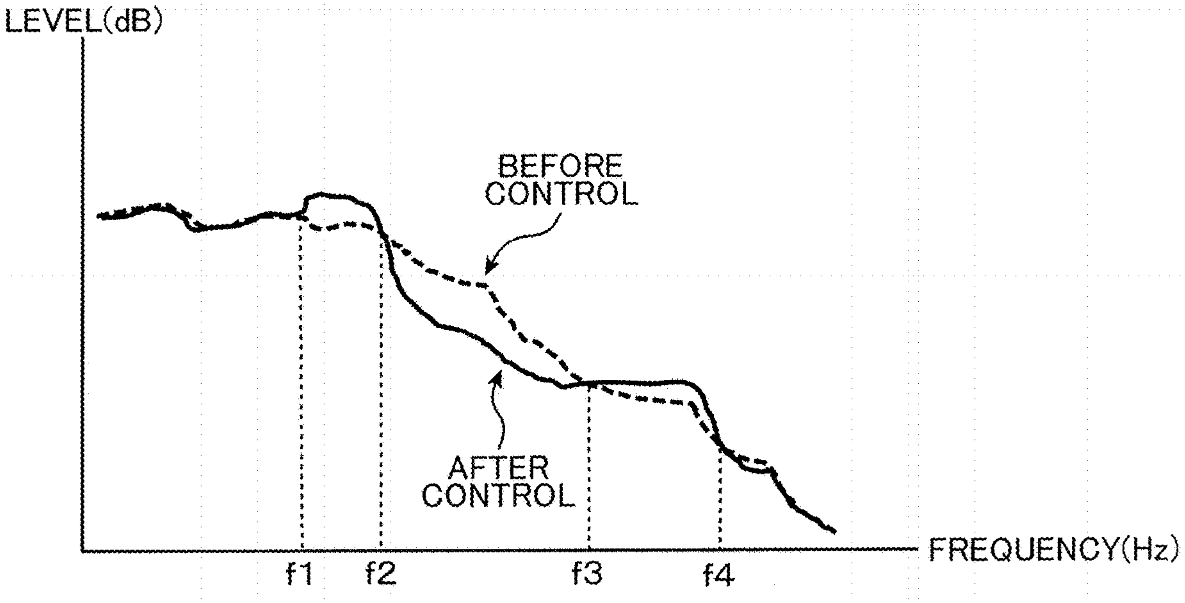
FIG. 17 is a graph showing a noise control effect of the typical ANC.

FIG. 17 is a graph showing a noise control effect of the typical ANC, and particularly, shows an effect in a delay in the noise control. FIG. 17 shows a noise reduction effect in a band from frequencies f2 to f3, but a noise increase in a band from frequencies f1 to f2 and a band from frequencies f3 to f4.

The noise increase in a low band like the band from the frequencies f1 to f2 may be caused by a distortion attributed to an input capacitance of the speaker 3. In other words, when the speaker 3 receives an input at a level which is not correctly reproducible, the input has a frequency with a harmonic distortion, and the distortion leads to the noise increase.

Patent Literature 1 discloses a background art of preventing an occurrence of a distortion related to a reproduction or generation performance of the speaker 3 in a lower band.

Figure 18:
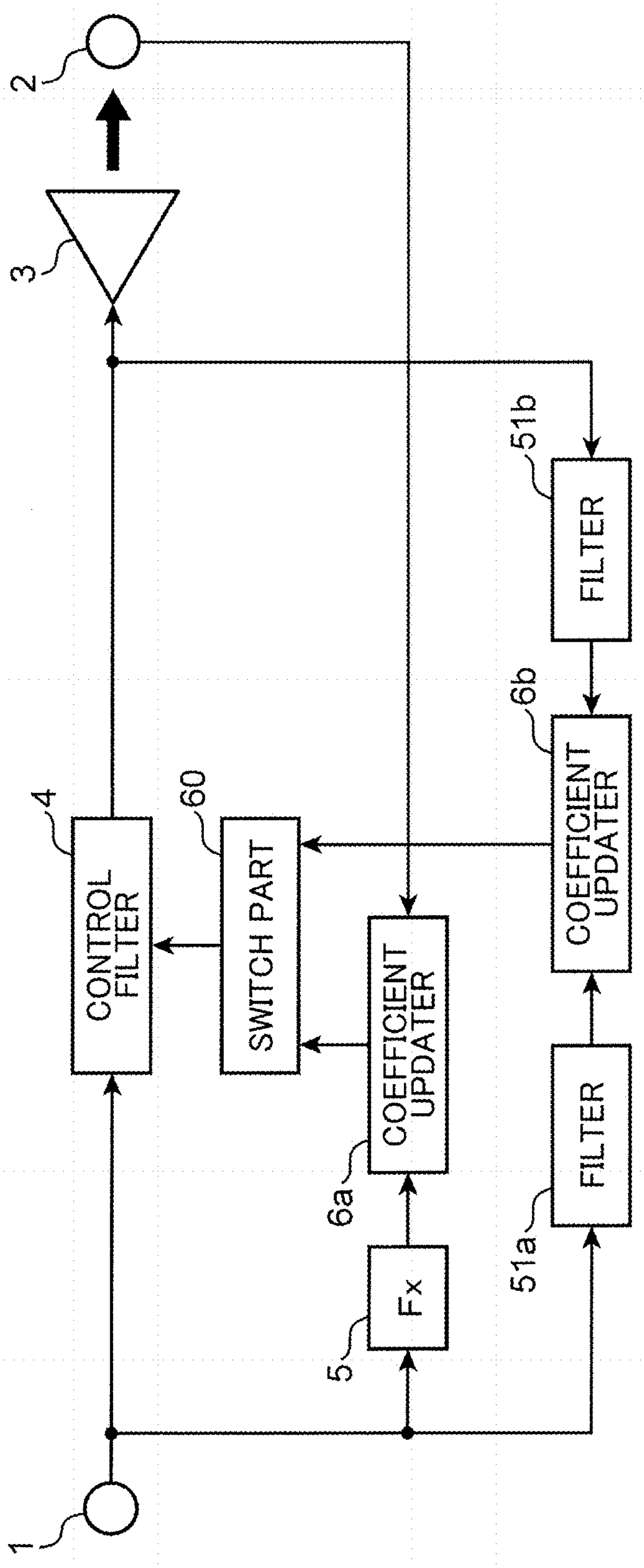
FIG. 18 is a configuration diagram of a noise control device or system according to a background art.

FIG. 18 is a configuration diagram of a noise control device or system according to the background art disclosed in Patent Literature 1.

A control filter 4 performs signal processing to a noise signal detected at a noise microphone 1 in FIG. 18, and a speaker 3 reproduces the noise signal to generate a control sound. Then, an error microphone 2 detects a result of an interference of a noise and the control sound to be an error signal.

By contrast, an Fx filter 5 performs signal processing to the noise signal from the noise microphone 1, a coefficient updater 6*a* receives an output signal from the filter and the error signal from the error microphone 2, and the coefficient updater 6*a* updates a coefficient of the control filter 4 so as to minimize the error signal.

That is to say, the operation described heretofore is same as the operation of the typical ANC using an adaptive filter as described with reference to FIG. 16.

Figure 19:
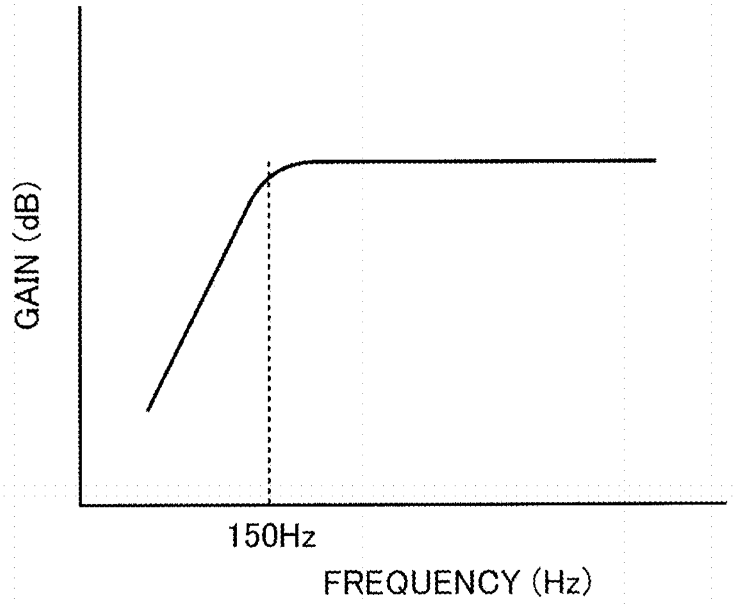
FIG. 19 is a graph showing an amplitude frequency characteristic of a speaker.
Figure 20:
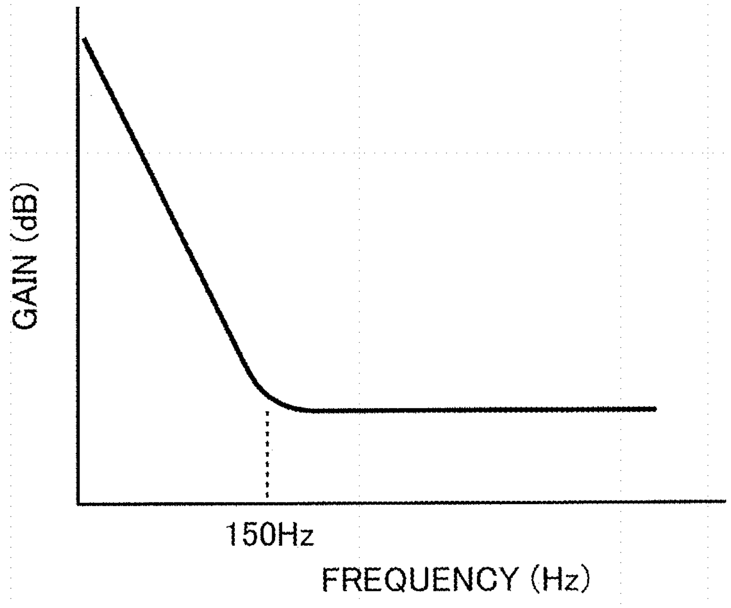
FIG. 20 is a graph showing an amplitude frequency characteristic of an output signal from a control filter.

FIG. 19 is a graph showing an amplitude frequency characteristic of the speaker, and FIG. 20 is a graph showing an amplitude frequency characteristic of an output signal from the control filter. When the speaker 3 has the frequency characteristic shown in FIG. 19, a reproduction or generation level, i.e., a gain, decreases at 150 Hz or lower. Hence, it is necessary to increase a level of the control signal in a low frequency band of 150 Hz or lower to correct the level decrease with an aim of obtaining a noise reduction effect in this low frequency band. For instance, when a noise has a fixed level in all the frequencies like a white noise, a control signal to be input into the speaker 3 needs to have an inverse frequency characteristic as shown in FIG. 20. It is understood from this perspective that the control signal has a higher level in a lower band.

However, the speaker 3 has such a characteristic that the generated gain is smaller in a lower band as shown in FIG. 19. Hence, a level of input is inevitably increased to reach a limit of the input capacitance, which results in an occurrence of a harmonic distortion. This leads to the noise increase in the range of the frequencies f1 to f2 shown in FIG. 17.

Here, each of filters 51*a*, 51*b* shown in FIG. 18 has a low pass filter (hereinafter, referred to as an "LPF") characteristic shown in FIG. 21, and extracts only a low band component at 100 Hz or lower from each of the noise signal from the noise microphone 1 and the control signal from the control filter 4 to input the lower band component into a coefficient updater 6*b*. The coefficient updater 6*b* updates, on the basis of the input information, a coefficient of the control filter 4 so as to minimize only the low band component at 100 Hz or lower in the control signal output from the control filter 4.

In fact, a switch part 60 is used for a change or switching between a normal noise control by the coefficient updater 6*a* and low band component suppression by the coefficient updater 6*b*. Specifically, first, the coefficient updater 6*a* executes a noise reduction at the error microphone 2, and subsequently, the coefficient updater 6*b* decreases the level of the low band component in the control signal from the control filter 4. The switch part 60 switches the noise reduction and the level decreasing of the low band component therebetween. Repetitive execution of the noise reduction and the level decreasing realizes a desired noise reduction effect while suppressing a noise increase in the low band attributed to the input capacitance of the speaker 3.

Figure 22:
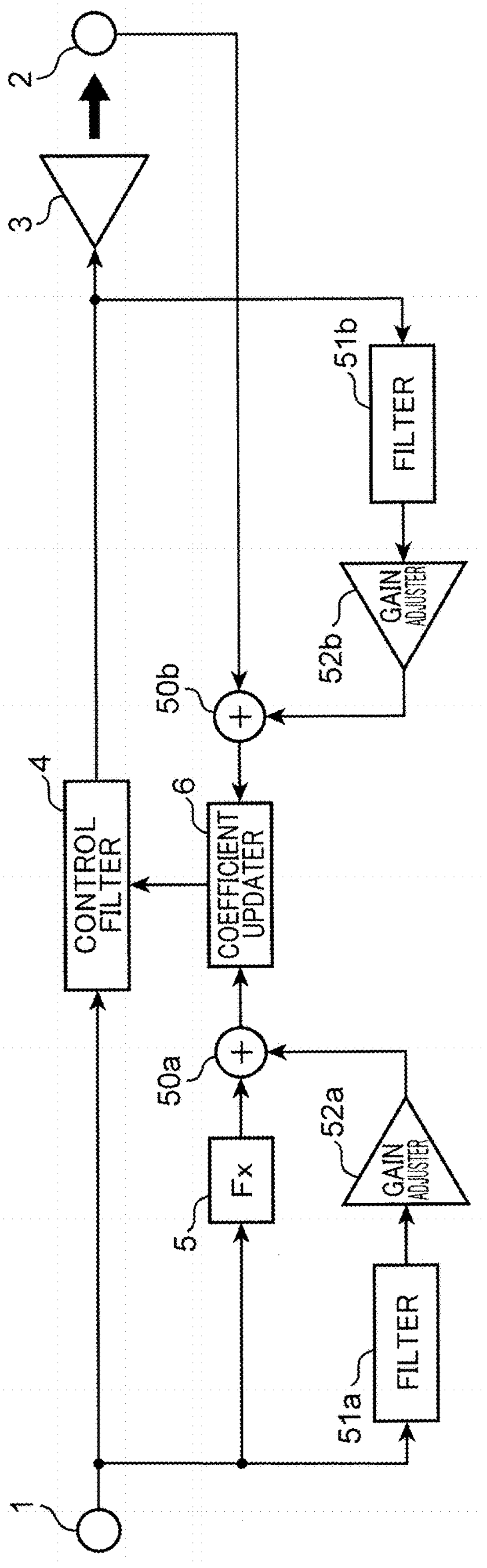
FIG. 22 is another configuration diagram of a noise control device or system according to a background art.

FIG. 22 shows a configuration example of Patent Literature 2 as another background art having an object of suppressing a noise increase in a low band attributed to an input capacitance of a speaker 3.

A control filter 4 performs signal processing to a noise signal detected at a noise microphone 1 in FIG. 22, and a speaker 3 reproduces the noise signal to generate a control sound. Then, an error microphone 2 detects a result of an interference of a noise and the control sound to be an error signal.

By contrast, an Fx filter 5 performs signal processing to the noise signal from the noise microphone 1, and a coefficient updater 6 receives an output signal from the filter and the error signal respectively via adders 50*a*, 50*b*. Then, the coefficient updater 6 updates a coefficient of the control filter 4 so as to minimize the error signal.

That is to say, the operation described heretofore is same as the operation of the typical ANC using an adaptive filter as described with reference to FIG. 16.

Figure 21:
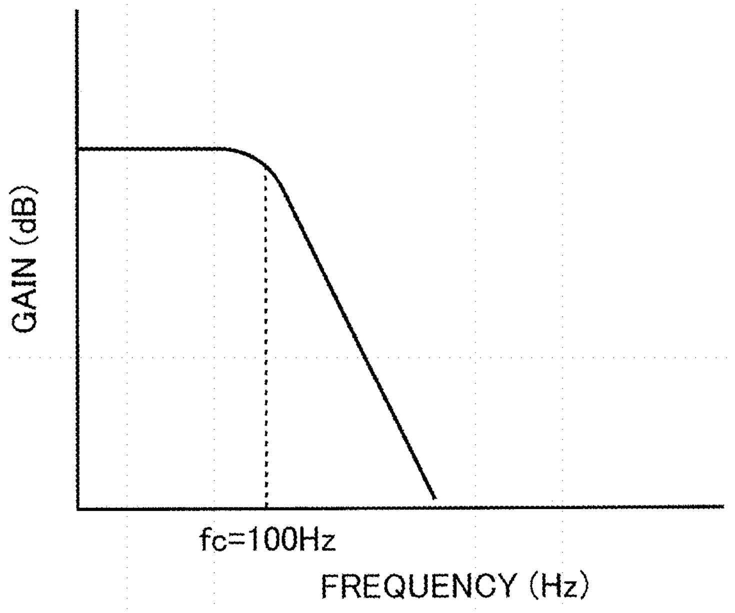
FIG. 21 is a graph showing an amplitude frequency characteristic of the control filter.

Here, each of filters 51*a*, 51*b* shown in FIG. 22 has an LPF characteristic shown in FIG. 21 like each of the corresponding filters in Patent Literature 1, and extracts only low band components at 100 Hz or lower respectively from the noise signal from the noise microphone 1 and the control signal from the control filter 4 to input the lower band components respectively into gain adjusters 52*a*, 52*b*. The gain adjuster 52*a* adjusts a level of an input signal at a predetermined value and outputs an output signal thereof to the adder 50*a*, and the gain adjuster 52*b* adjusts a level of an input signal at a predetermined value and outputs an output signal thereof to the adder 50*b*. Then, the coefficient updater 6 receives an output signal from each of the adders 50*a*, 50*b*, and the coefficient updater 6 updates the coefficient of the control filter 4 by using an input signal based on each output signal so as to minimize only each low band component at 100 Hz or lower in the control signal output from the control filter 4.

In other words, use of the adders 50*a*, 50*b* enables the single coefficient updater 6 to execute both the normal noise reduction at the error microphone 2 and a decrease in the level of the low band component in the control signal from the control filter 4. This consequently realizes a desired noise reduction effect while suppressing a noise increase in the low band attributed to the input capacitance of the speaker 3 in addition to a reduction in a calculation amount.

Patent Literature 2 further discloses a phase inverter that inverts a phase of a control signal. However, for instance, the phase inverter is only required to set a gain value not to a positive value but to a negative value for each of the gain adjusters 52*a*, 52*b* in FIG. 22. Thus, FIG. 22 omits illustration of the phase inverter.

It is noted here that each of Patent Literature 1 and Patent Literature 2 is established under a major condition that a causality of an ANC system is satisfied. That is to say, the relation "D≤T" described with reference to FIG. 16 needs to be satisfied. For explanation of the relation, a relation "D>T" will be discussed below.

Figure 23:
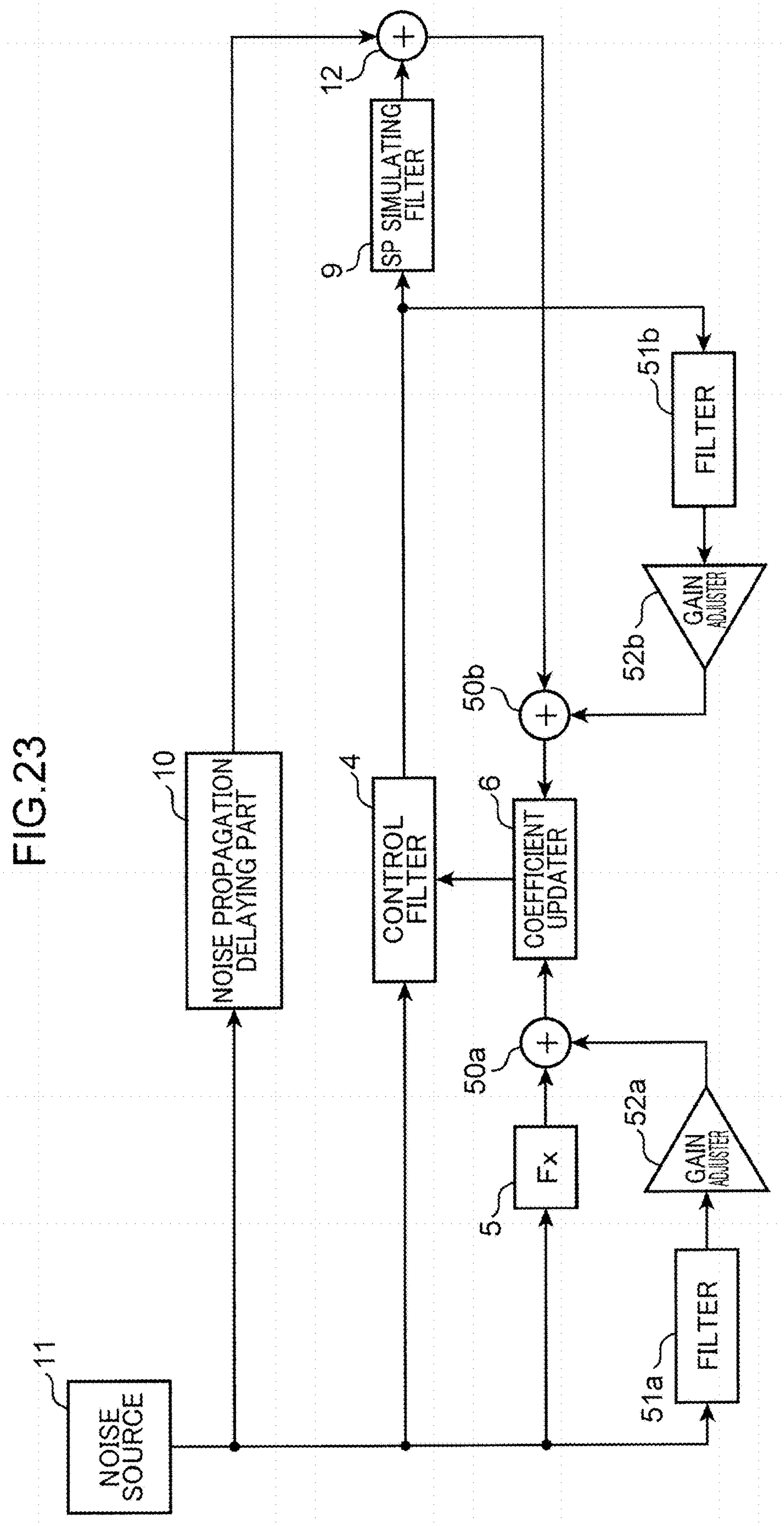
FIG. 23 is a configuration diagram explaining an operation of the noise control system according to the background art.

FIG. 23 shows a system established by using the configuration shown in FIG. 22 for effective discussion on an influence of the causality and better understanding thereof.

In FIG. 23, a noise source 11 generates a noise signal, a noise propagation delaying part 10 delays the noise signal for a predetermined time, and an adder 12 receives an output signal from the noise propagation delaying part.

Here, the adder 12 serves as the error microphone 2 in FIG. 22. The noise propagation delaying part 10 represents a noise propagation passage in FIG. 16 in a simple delay case. In FIG. 23, a noise signal is directly acquirable from the noise source 11, and thus, the noise microphone 1 shown in FIG. 22 is unnecessary.

Hence, the control filter 4 directly receives the noise signal from the noise source 11 and performs signal processing thereto with a coefficient of the filter to output a control signal. A speaker simulating filter 9 performs signal processing to the control signal, and the adder 12 receives an output signal therefrom.

Figure 24:
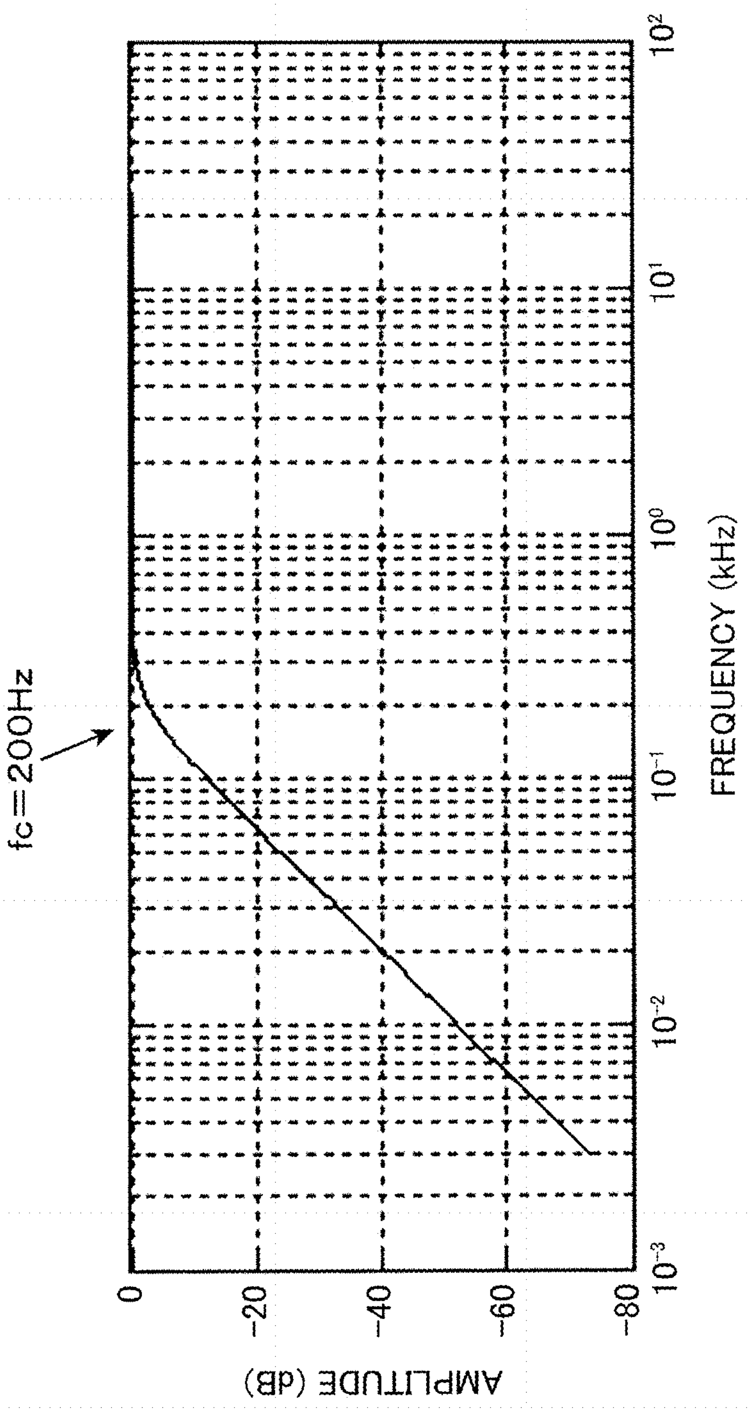
FIG. 24 is a graph showing an amplitude frequency characteristic of a speaker simulating filter.
Figure 25:
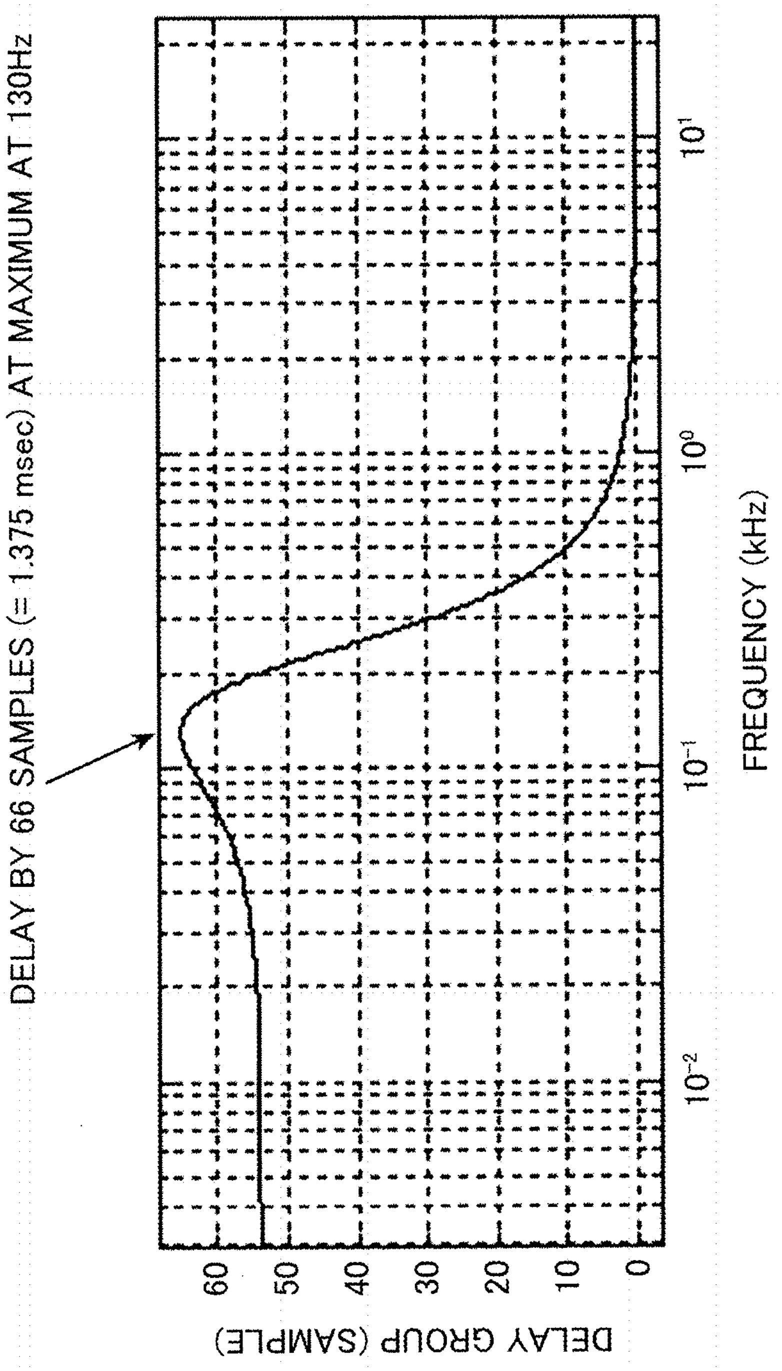
FIG. 25 is a graph showing a group delay characteristic of the speaker simulating filter.

Here, the speaker simulating filter 9 simulates a characteristic of the speaker 3 in FIG. 22. FIG. 24 shows an amplitude characteristic of the filter. FIG. 25 shows a group delay characteristic thereof. For instance, the speaker simulating filter 9 serves as a second-order high pass filter (hereinafter, referred to as an "HPF") having a cutoff frequency (hereinafter, referred to as "fc") of 200 Hz. The reason for simulating the speaker 3 as the second-order HPF lies in that a typical speaker also has a second-order resonance system having an amplitude characteristic (cutoff characteristic of −12 dB/oct.) equivalent to that of the second-order HPF. Similarly, the group delay characteristic has a maximum delay around a resonant frequency (=fc), a large group delay even at a lower frequency, and a rapidly reduced group delay at a high frequency fc or higher.

In this manner, the second-order HPF has a characteristic very similar to the characteristic of the speaker 3 without a possibility of causing a distortion attributed to mechanical resonance or vibration elements (e.g., a diaphragm, a damper, or an edge), and thus is suitable for accurately inspecting only the influence of the causality.

Next, the noise signal from the noise source 11 is input into an Fx filter 5 and input into a coefficient updater 6 via an adder 50*a*.

The coefficient updater 6 further receives an error signal from an adder 12 via an adder 50*b*.

Then, the coefficient updater 6 updates a coefficient of the control filter 4 so as to minimize the error signal. This results in a decrease in a noise level of the error signal.

First, an influence of a causality about the typical ANC (i.e., without using the filters 51*a*, 51*b* and the gain adjusters 52*a*, 52*b*) based on the foregoing will be discussed.

Here, the noise signal output from the noise source 11 is referred to as a specific white noise having an even level at all the frequencies for better understanding.

The speaker simulating filter 9 has a group delay characteristic shown in FIG. 25, and thus, a large delay time is set for the noise propagation delaying part 10 under a condition of no concern about the causality. For instance, in a case where the number of filter taps (hereinafter, abbreviated as the "number of taps") in the control filter 4 is defined to be 2048, a delay of 1000 taps (1000 samples) is set for the noise propagation delaying part 10, i.e., "T=1000". By contrast, the relation "D≤T" is satisfied in consideration of a relation "0<D≤66" from the group delay characteristic of the speaker simulating filter 9 shown in FIG. 25.

Figure 26:
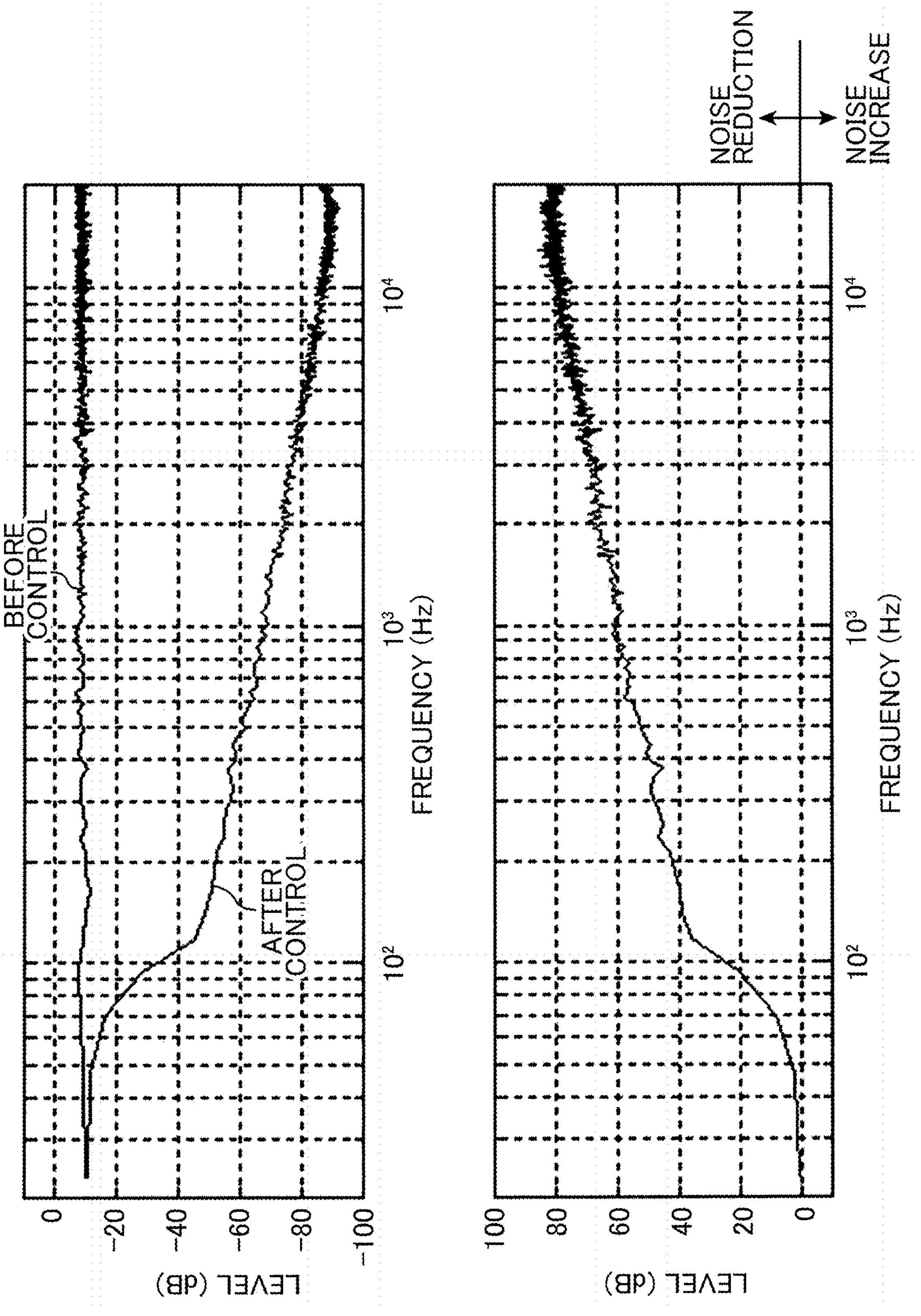
FIG. 26 includes graphs each showing a noise control effect.

FIG. 26 shows a noise reduction effect (error signal) obtained by the adder 12 at this time. FIG. 26 includes an upper graph showing respective characteristics seen before and after a control and a lower graph showing a difference effect obtained by subtracting the characteristic seen after the control from the characteristic seen before the control. By contrast, an effect amount rapidly reduces at 120 Hz or lower. This is because the control is more difficult at a lower frequency of the amplitude characteristic of the speaker simulating filter 9 shown in FIG. 25. However, no occurrence of a noise increase is seen.

Figure 27:
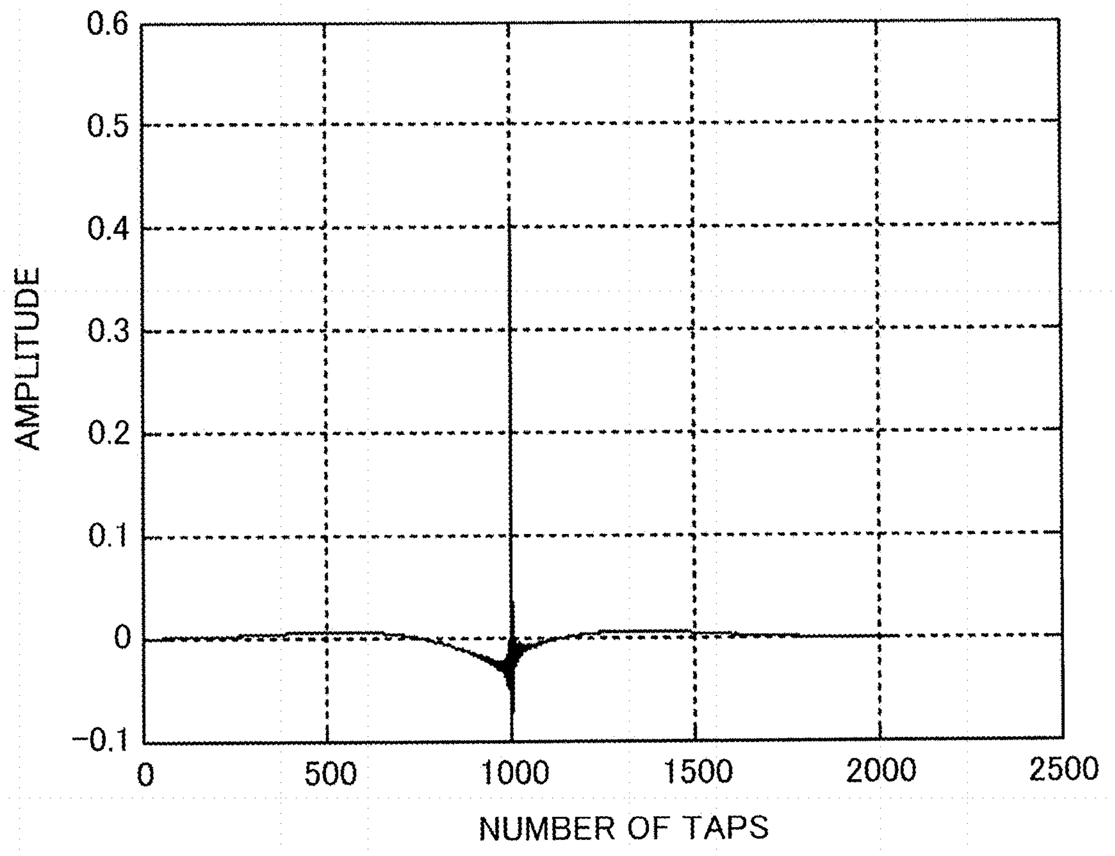
FIG. 27 is a graph showing a time characteristic of a control filter.

It is confirmed from the coefficient of the control filter 4 that a time characteristic is as shown in FIG. 27 and has an impulse peak at the $1000^{th}$ tap, and that characteristics therebefore and thereafter are satisfactorily expressed. As a result, it is seen from the amplitude frequency characteristic of the coefficient shown in FIG. 28 that an amplitude level is the highest around 45 Hz, and the amplitude level is decreased at a low frequency of 45 Hz or lower. Specifically, the coefficient of the control filter 4 has a higher amplitude level from a frequency around 200 Hz to a lower band having a lower frequency to express an inverse characteristic of an amplitude characteristic of the speaker simulating filter 9 shown in FIG. 25. However, it is not that the level endlessly increases to be higher as the frequency decreases, but the increase stops around 45 Hz and the characteristic becomes stable in such a manner that the amplitude level gradually decreases after reaching around 45 Hz or lower. This consequently leads to no occurrence of a noise increase.

The effect has been sufficiently discussed under the condition of no concern about the causality as described above. Next, a delay of 0 or zero tap (i.e., no delay) is set for the noise propagation delaying part 10. An equality "T=0" is defined in this state and a relation "0<D≤66" is acquired from a group delay characteristic of the speaker simulating filter 9, and thus, the relation "D>T" is established. This means that a causality is not satisfied.

Figure 29:
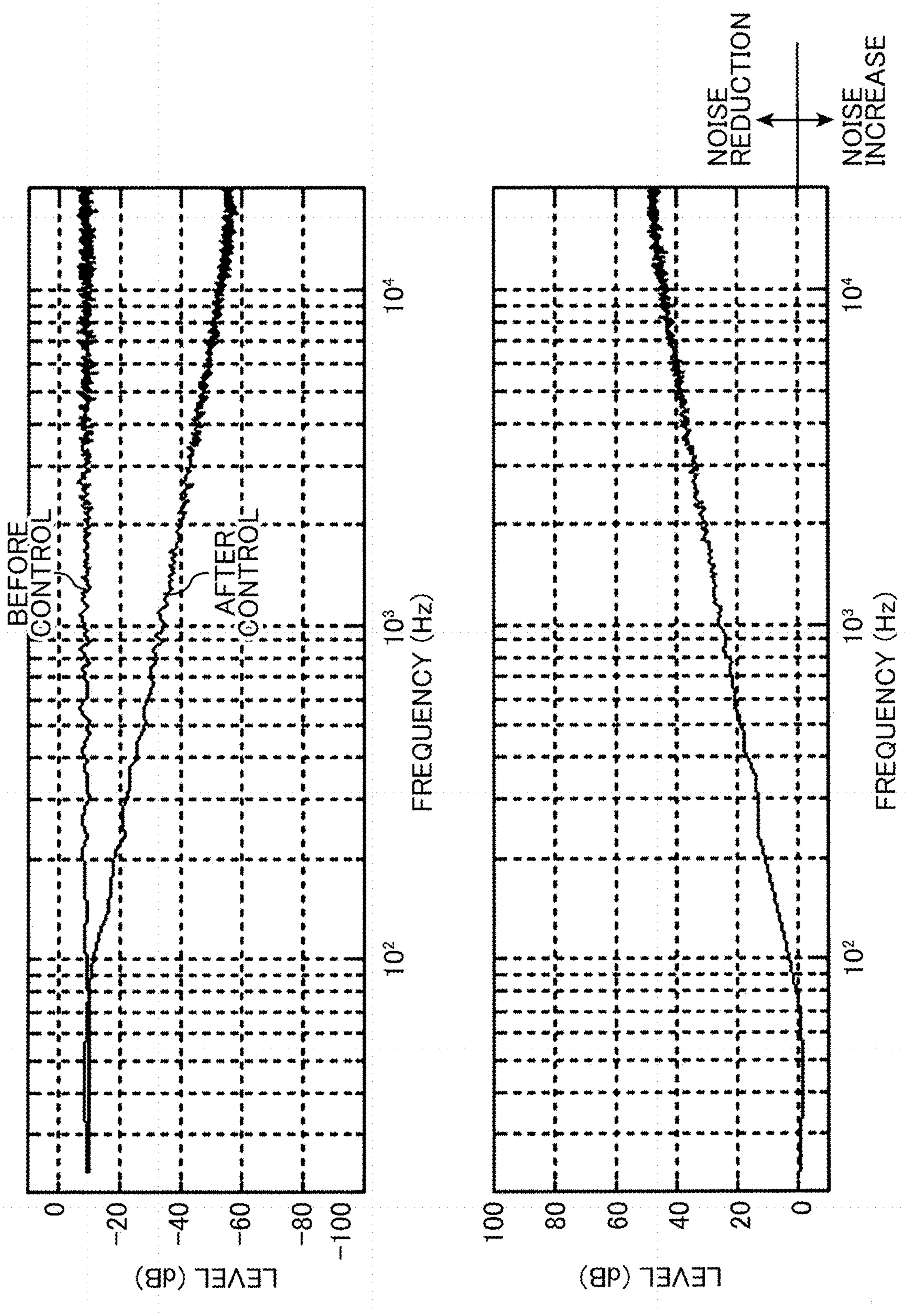
FIG. 29 includes graphs each showing a noise control effect.

FIG. 29 shows a noise reduction effect (error signal) obtained by the adder 12 at this time. An effect amount is much smaller than the amount in FIG. 26, but a tendency that the effect amount increases as the frequency becomes higher is the same as the tendency seen in the drawing. This is because the speaker simulating filter 9 has a smaller group delay as the frequency becomes higher.

It is noted here that no effect is seen at a low frequency due to an influence of the amplitude characteristic of the speaker simulating filter 9, on the contrary, a slight noise increase is seen at 60 Hz or lower.

Figure 28:
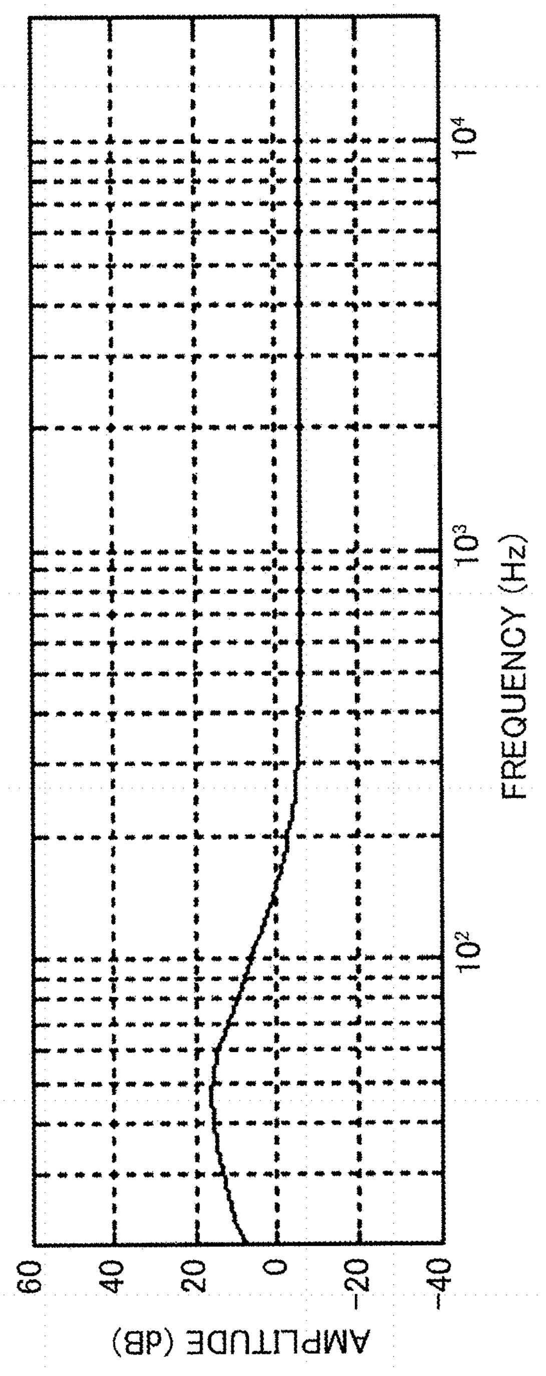
FIG. 28 is a graph showing an amplitude frequency characteristic of the control filter.
Figure 30:
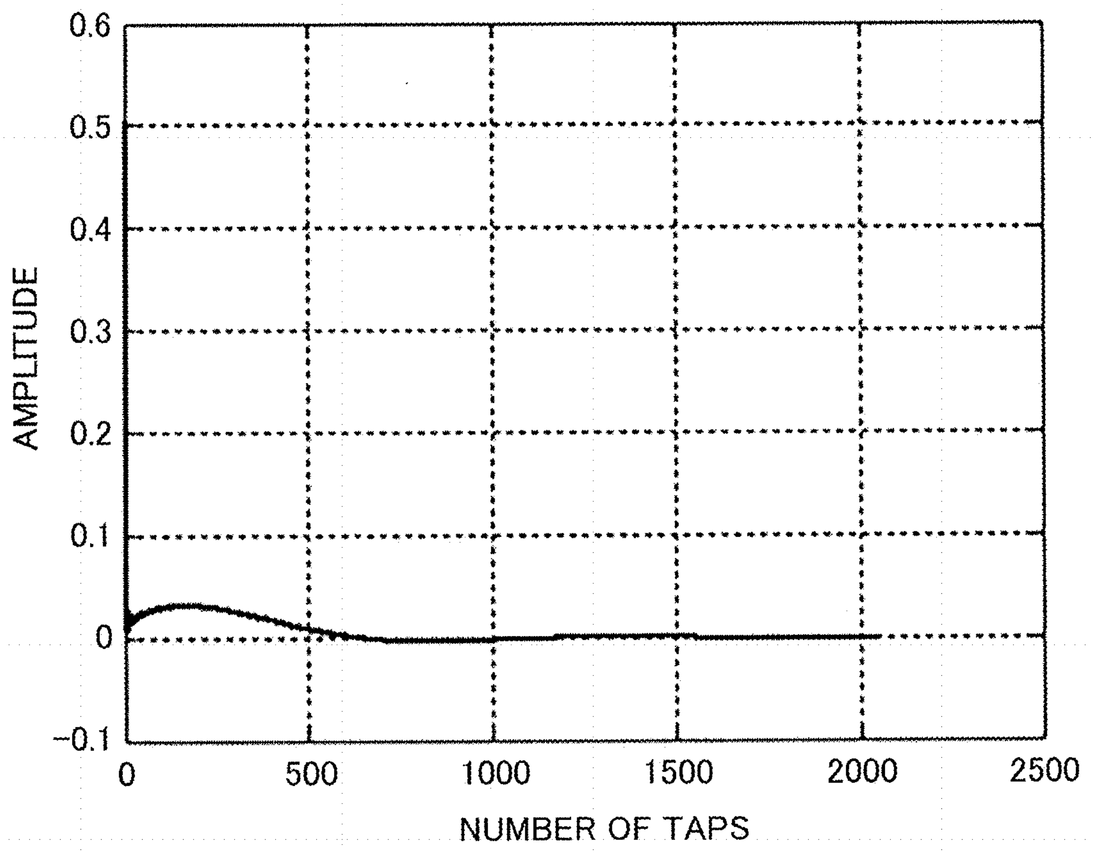
FIG. 30 is a graph showing a time characteristic of a control filter.
Figure 31:
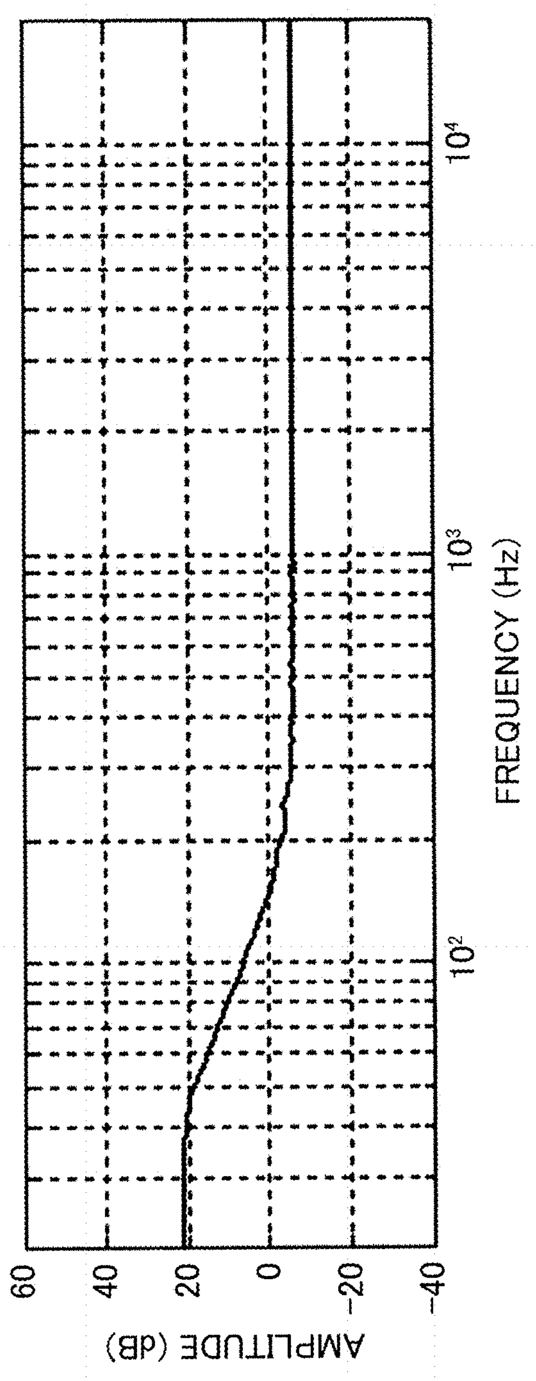
FIG. 31 is a graph showing an amplitude frequency characteristic of the control filter.

It is confirmed from the coefficient of the control filter 4 that a time characteristic is as shown in FIG. 30 and has an impulse peak at the $0^{th}$ tap, and that characteristics thereafter are satisfactorily expressed but characteristics therebefore are totally inexpressible. As a result, it is seen from the amplitude frequency characteristic of the coefficient shown in FIG. 31 that an amplitude level increases to be higher from around 200 Hz to a low band at the frequency or lower, and the amplitude level reaches a maximum at 40 Hz or lower and kept at the maximum. That is, the characteristic has no tendency that the amplitude level decreases to be stable at a low frequency of 45 Hz or lower as shown in FIG. 28. This consequently leads to a noise increase at 60 Hz or lower.

In this regard, hereinafter, operations in the configuration of Patent Literature 2 using the filters 51*a*, 51*b* and the gain adjusters 52*a*, 52*b* shown in FIG. 23 are discussed. Specifically, an appropriate characteristic and an appropriate constant are set for each of the filters 51*a*, 51*b* and the gain adjusters 52*a*, 52*b* to check whether a noise increase at 60 Hz or lower is suppressed.

Figure 32:
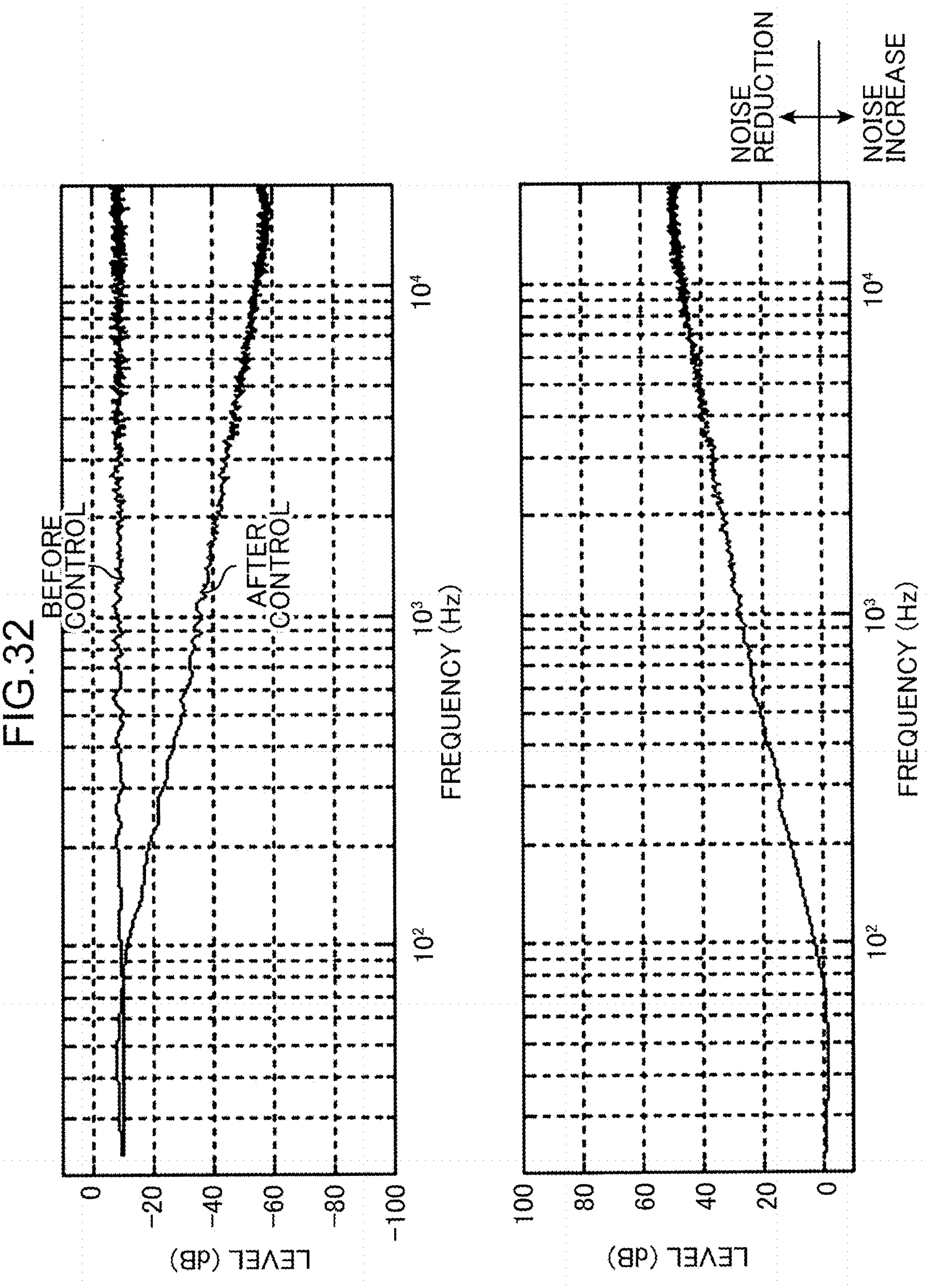
FIG. 32 includes graphs each showing a noise control effect.

An HPF having "fc=200 Hz" is adopted for the speaker simulating filter 9. Accordingly, for instance, an LPF having "fc=200 Hz" is adopted for each of the filters 51*a*, 51, and each of the gain adjusters 52*a*, 52*b* is set at 0.04. It is noted here that a value for each gain adjuster is set to keep a balance with a signal level and a convergence constant at updating of a coefficient. Hence, the value "0.04" is not always suitable for all cases, but is suitable for this case under the discussed condition. FIG. 32 shows a noise reduction effect (error signal) obtained by the adder 12 at this time. An effect amount in this case becomes slightly greater at 200 Hz or higher than the effective amount in FIG. 29, and thus, adoption of the LPF having "fc=200 Hz" for each of the filters 51*a*, 51*b* may be considered to be effective. However, almost the same noise increase is seen at 60 Hz or lower without being suppressed.

Figure 33:
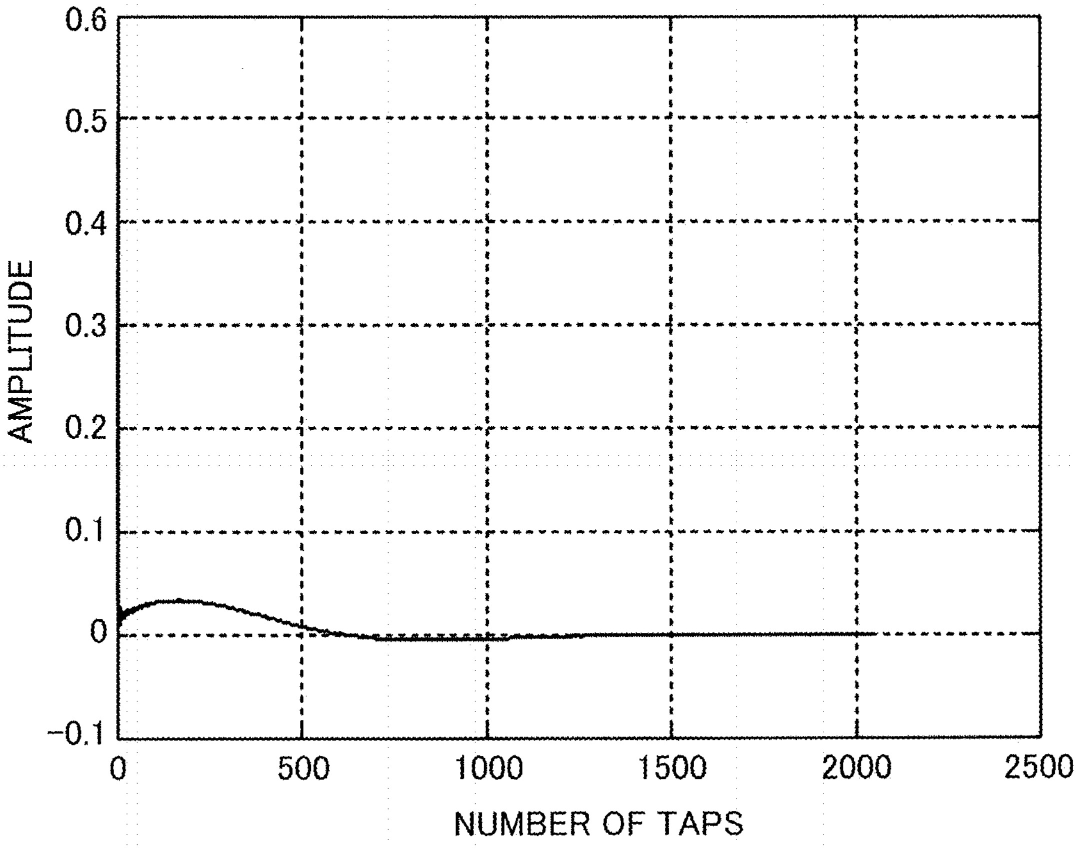
FIG. 33 is a graph showing a time characteristic of a control filter.

It is confirmed from the coefficient of the control filter 4 at this time that a time characteristic is as shown in FIG. 33 and has an impulse peak at the $0^{th}$ tap in the same manner as the time characteristic in FIG. 30. Further, it is seen from the amplitude frequency characteristic of the coefficient shown in FIG. 34 that an amplitude level increases to be higher from around 200 Hz to a low band at the frequency or lower and the amplitude reaches a maximum at 40 Hz or lower and kept at the maximum in the same manner as the amplitude level in FIG. 31. That is to say, suppression of the amplitude level of the coefficient of the control filter 4 intended by Patent Literature 2 is confirmed to be failed.

Figure 35:
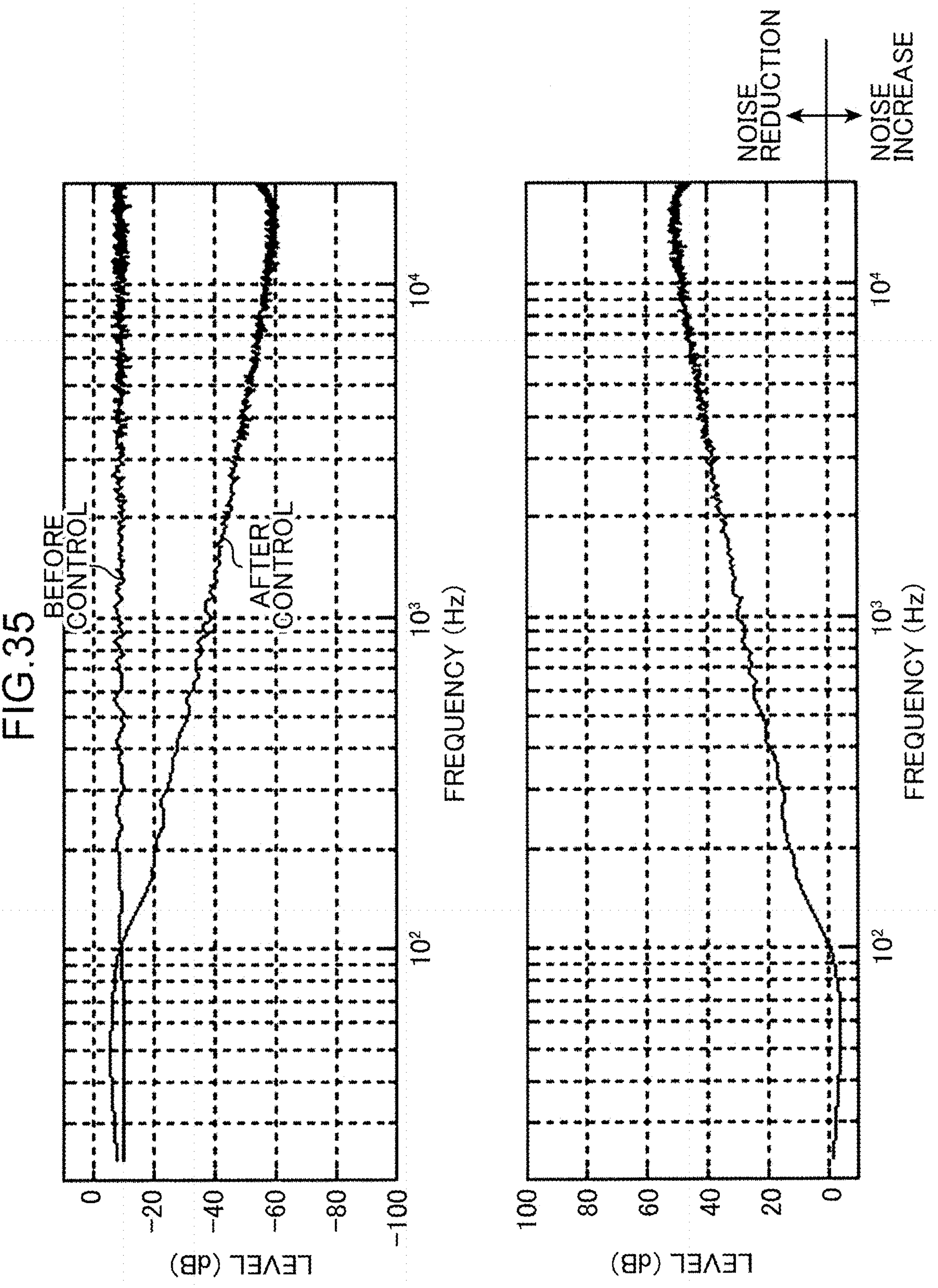
FIG. 35 includes graphs each showing a noise control effect.

Suppression of a noise increase is failed at the aforementioned setting. Therefore, another example is discussed by setting the value "0.08" for each of the gain adjusters 52*a*, 52*b* with an expectation for further suppression. FIG. 35 shows a noise reduction effect (error signal) obtained by the adder 12. An effect amount in this case becomes further slightly greater at 200 Hz or higher than the effective amount in FIG. 32, but a noise increase is larger at 60 Hz or lower.

Figure 34:
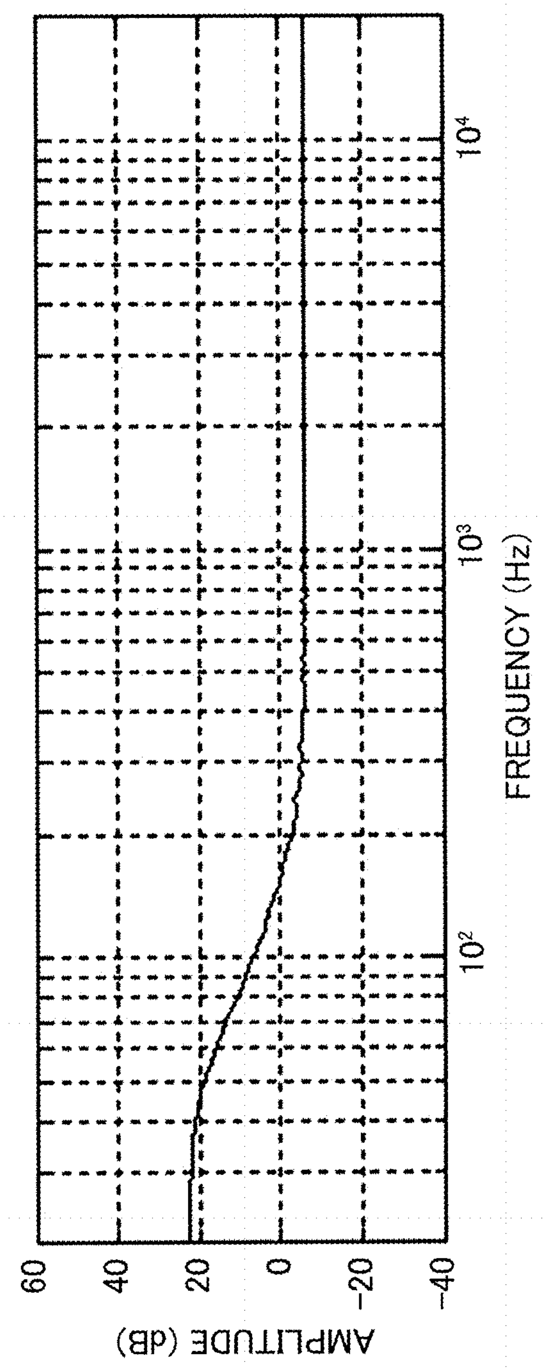
FIG. 34 is a graph showing an amplitude frequency characteristic of the control filter.
Figure 36:
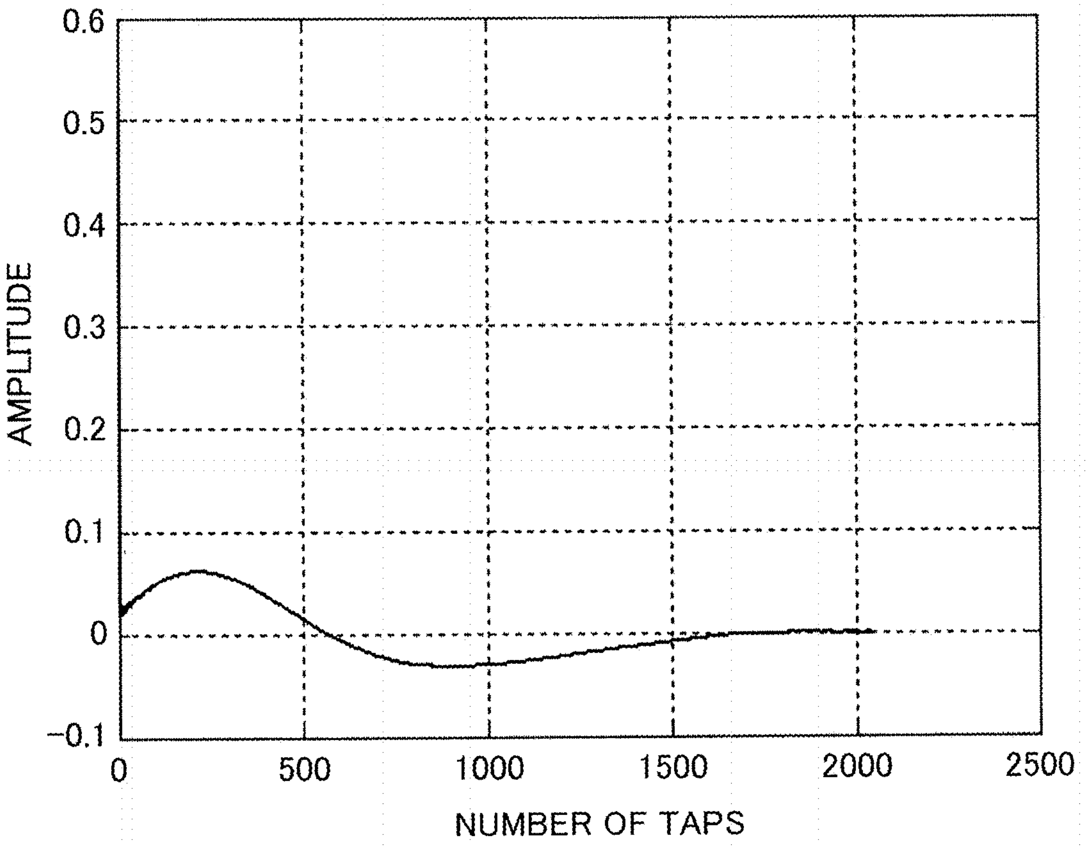
FIG. 36 is a graph showing a time characteristic of a control filter.
Figure 37:
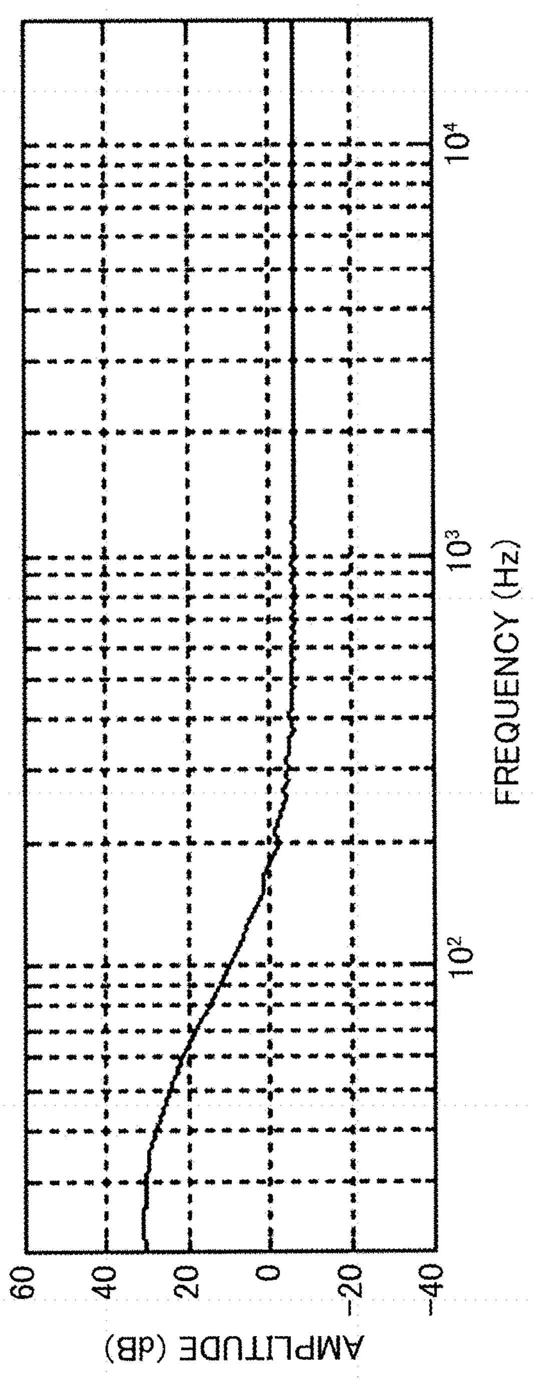
FIG. 37 is a graph showing an amplitude frequency characteristic of the control filter.

It is confirmed from the coefficient of the control filter 4 at this time that a time characteristic has an impulse peak at the $0^{th}$ tap as shown in FIG. 36, and an amplitude frequency characteristic of a coefficient shown in FIG. 37 has a higher amplitude level at 40 Hz or lower than the amplitude level of the amplitude frequency characteristic of the coefficient in FIG. 34. Even under this condition, suppression of the amplitude level of the coefficient of the control filter 4 intended by Patent Literature 2 is confirmed to be failed.

Figure 38:
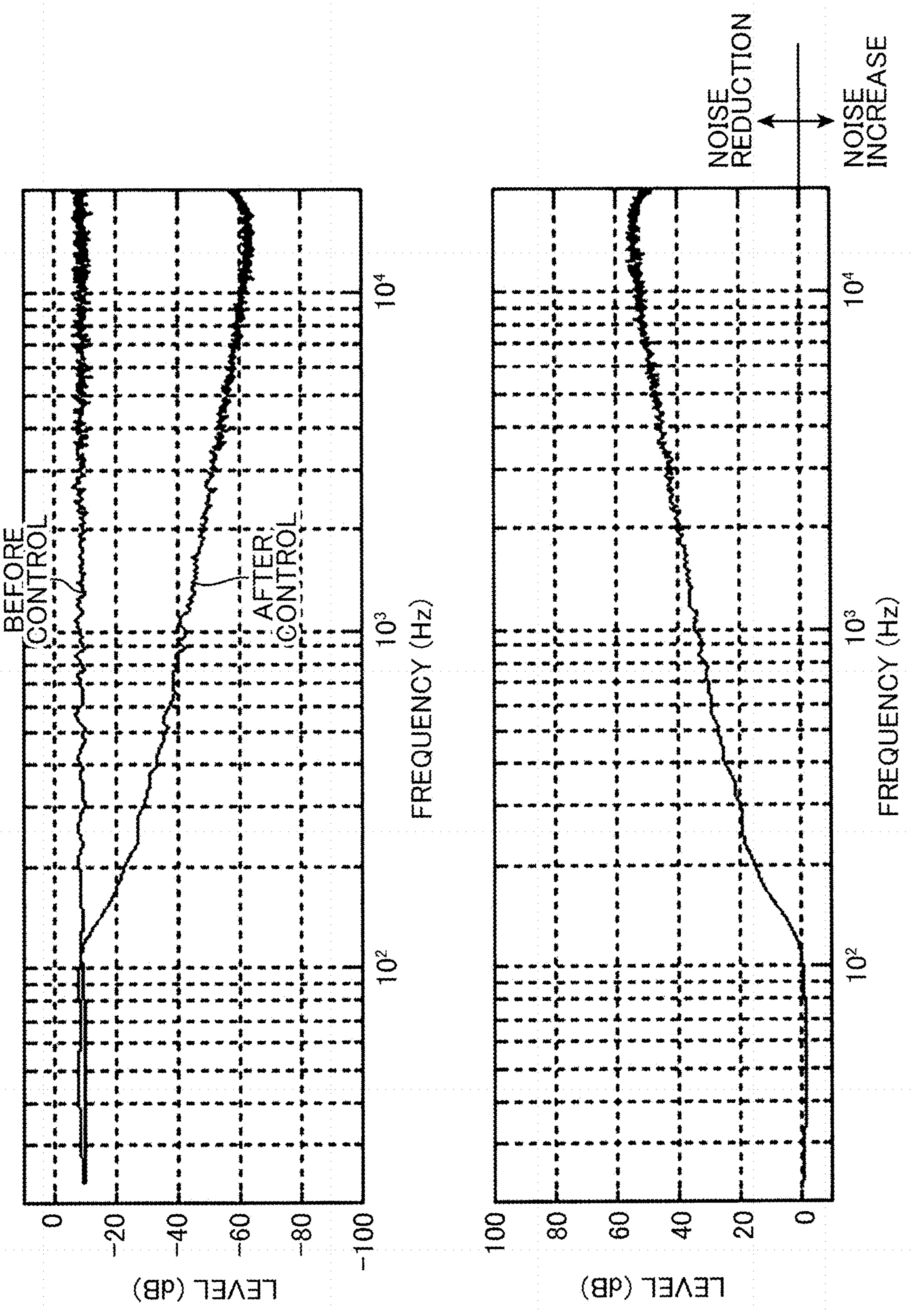
FIG. 38 includes graphs each showing a noise control effect.

The aforementioned adjustment by the gain adjusters 52*a*, 52*b* fails to suppress the noise increase. Therefore, next, an LPF having "fc=100 Hz" is adopted for each of the filters 51*a*, 51*b* instead. FIG. 38 shows a noise reduction effect (error signal) obtained by the adder 12. An effect amount in this case becomes further slightly greater at 200 Hz or higher than the effective amount in FIG. 35, and thus, adoption of the LPF having "fc=100 Hz" for each of the filters 51*a*, 51 may be considered to be effective. However, a noise increase is seen in a wider frequency range, i.e., at 100 Hz or lower.

Figure 39:
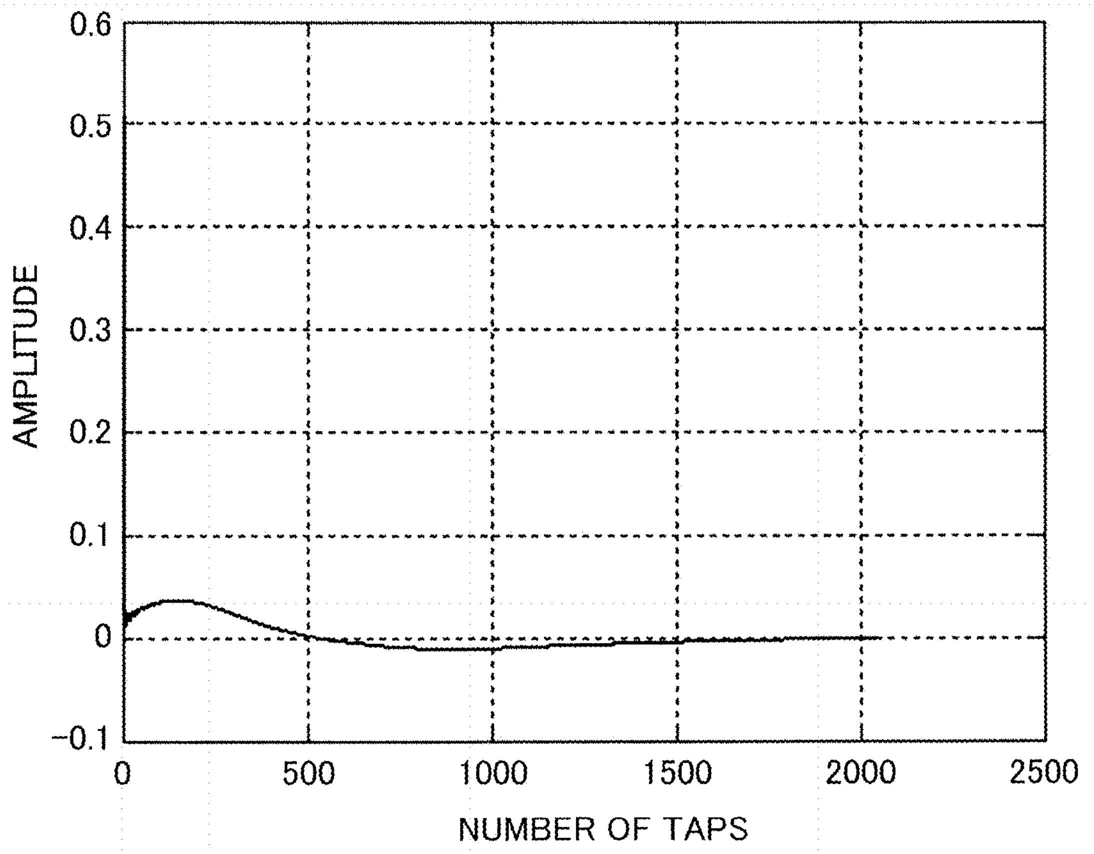
FIG. 39 is a graph showing a time characteristic of a control filter.
Figure 40:
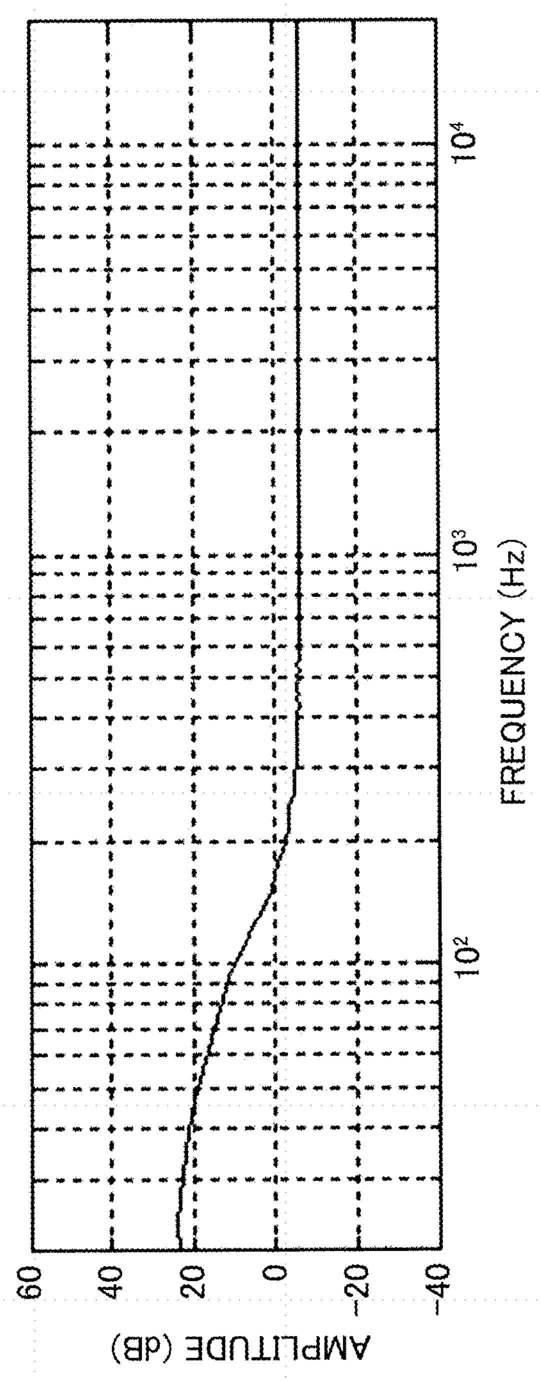
FIG. 40 is a graph showing an amplitude frequency characteristic of the control filter.

It is confirmed from the coefficient of the control filter 4 at this time that a time characteristic has an impulse peak at the $0^{th}$ tap as shown in FIG. 39, and an amplitude frequency characteristic of a coefficient shown in FIG. 40 has a lower amplitude level at 40 Hz or lower than the amplitude level of the amplitude frequency characteristic of the coefficient in FIG. 37. However, the amplitude level is higher around 100 Hz than the amplitude level of the coefficient in FIG. 31.

As discussed heretofore, in a state where the causality is not satisfied, suppression of an amplitude level of the coefficient of the control filter 4 intended by Patent Literature 2 is confirmed to be failed even under an appropriate setting of the conditions of the filters 51*a*, 51*b* and the gain adjusters 52*a*, 52*b*.

A configuration excluding the speaker simulating filter 9 in FIG. 23 is discussed just for reference. In this case, the Fx filter 5 is excludable, and an equality or relation "D=T=0" is established. In other words, the relation "D≤T" is established, and thus, the causality is satisfied. It is noted here that the filters 51*a*, 51*b* and the gain adjusters 52*a*, 52*b* are not used. Except these conditions, the remaining conditions in FIG. 29 are adopted.

Figure 41:
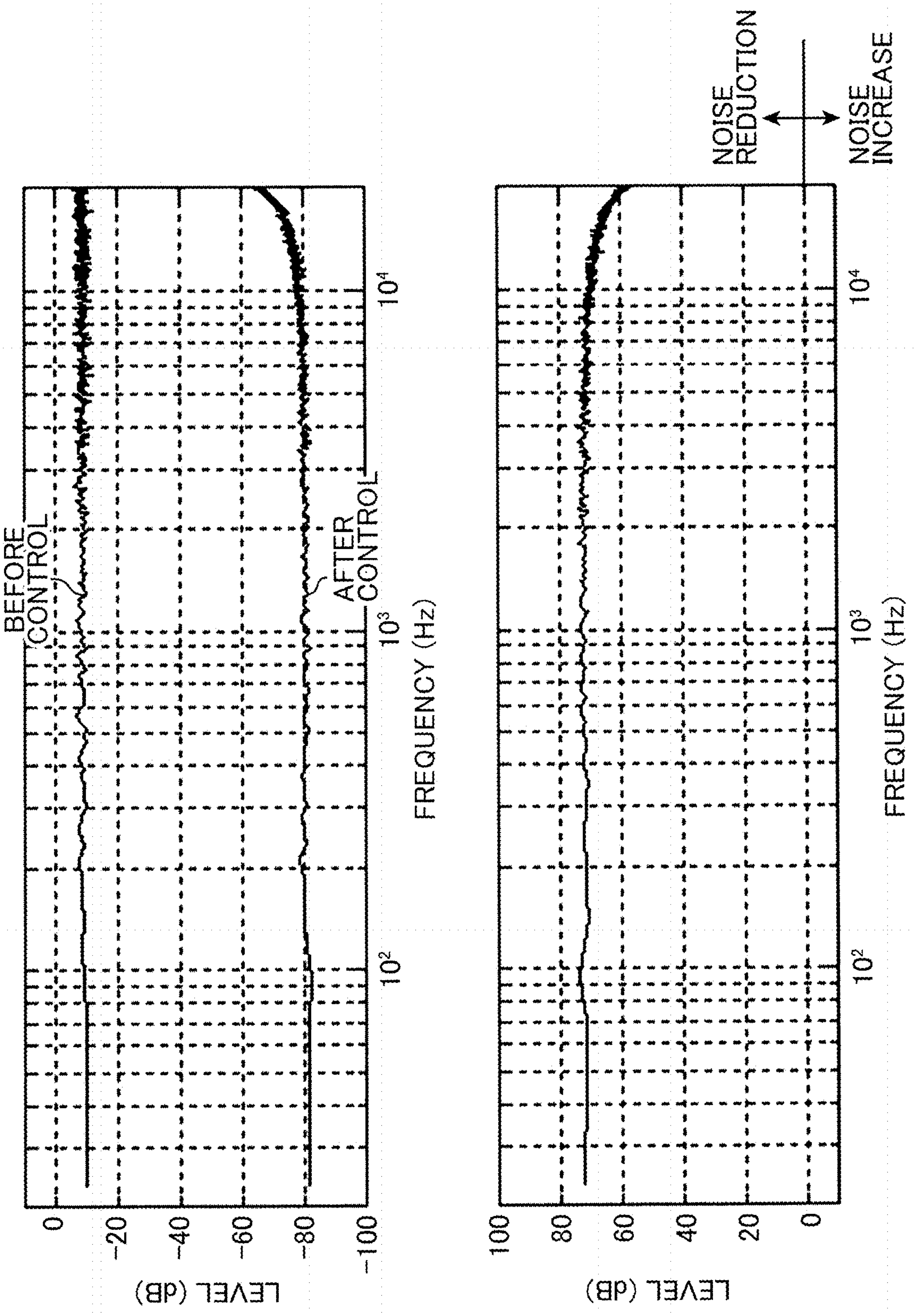
FIG. 41 includes graphs each showing a noise control effect.

FIG. 41 shows a noise reduction effect (error signal) obtained by the adder 12 at this time. A much greater effect amount than the effective amount in FIG. 29 is seen in all the frequencies. Conversely, the speaker simulating filter 9 is said to have an influence even in a high band with a small group delay.

Figure 42:
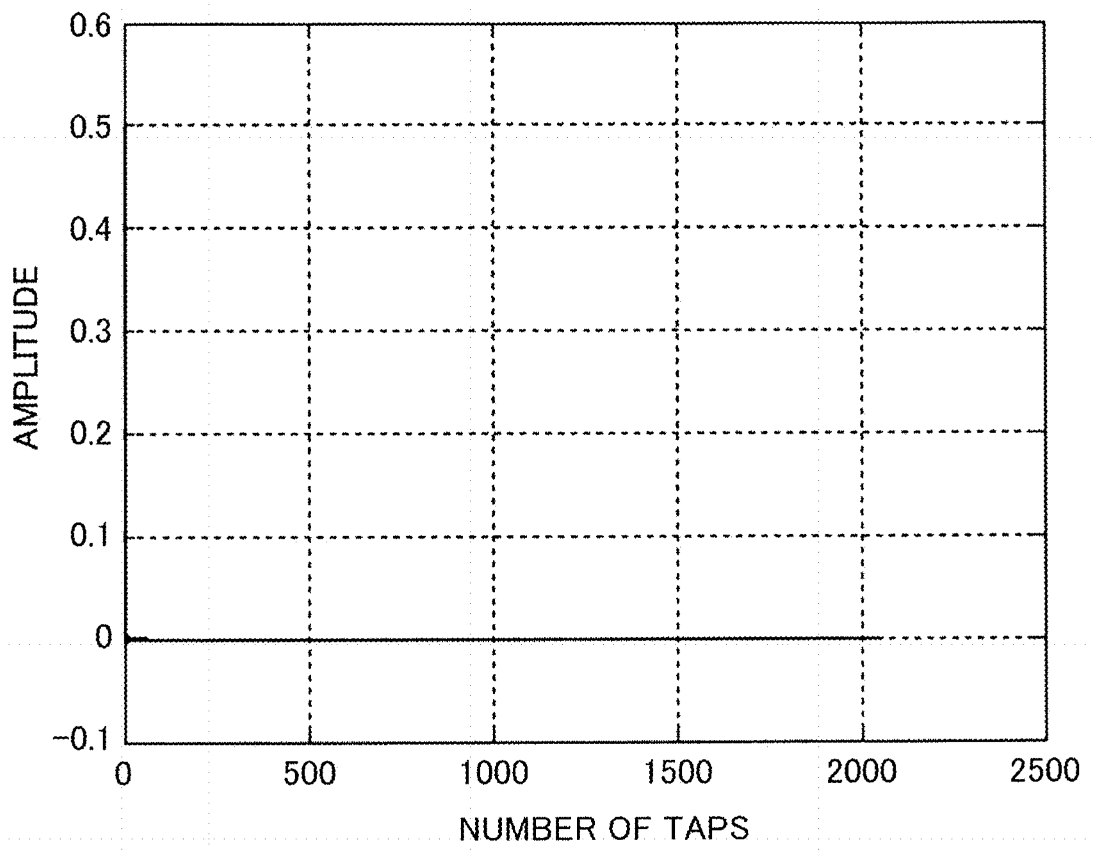
FIG. 42 is a graph showing a time characteristic of a control filter.
Figure 43:
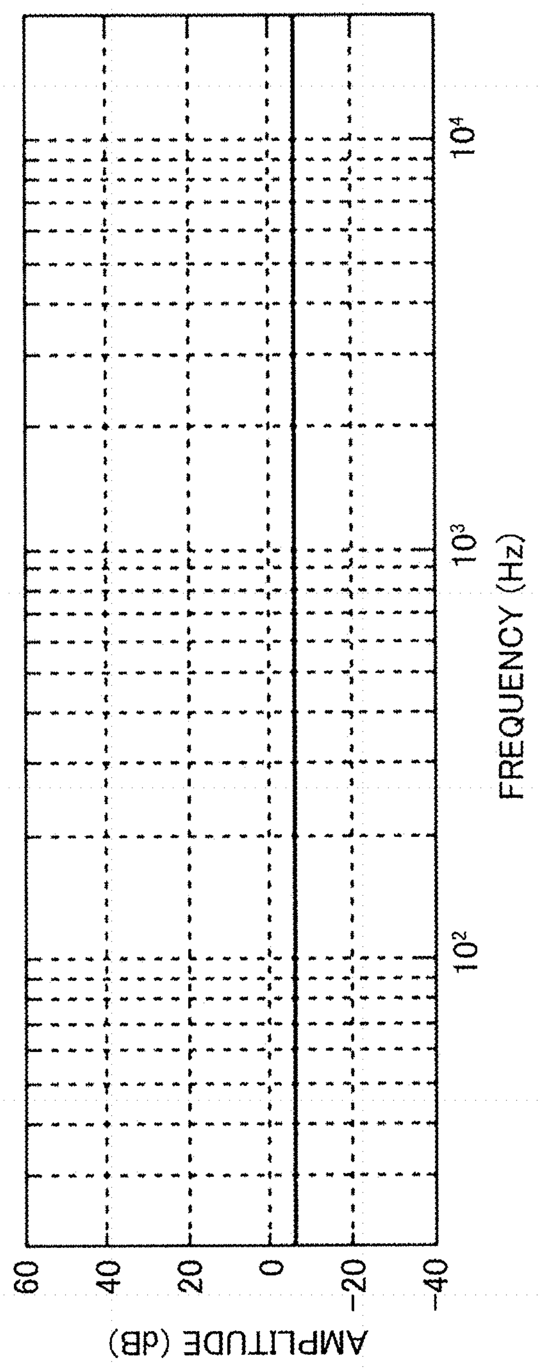
FIG. 43 is a graph showing an amplitude frequency characteristic of the control filter.

It is confirmed from the coefficient of the control filter 4 at this time that a time characteristic is a simple characteristic having an impulse peak at the $0^{th}$ tap as shown in FIG. 42, and an amplitude frequency characteristic of a coefficient shown in FIG. 43 also has a fixed frequency.

It is confirmed from these perspectives that the causality is not satisfied due to the influence of the speaker simulating filter 9 in the cases respectively shown in FIG. 29, FIG. 32, FIG. 35, and FIG. 38.

By the way, in an actual environment adapting the ANC system, e.g., in an automobile, an air conditioner, or a cleaner, not a white noise having a fixed level in all the frequencies but a noise having such a characteristic that a level is lower at a higher frequency is generally seen. Hence, next, a noise having such a frequency characteristic will be discussed.

Figure 44:
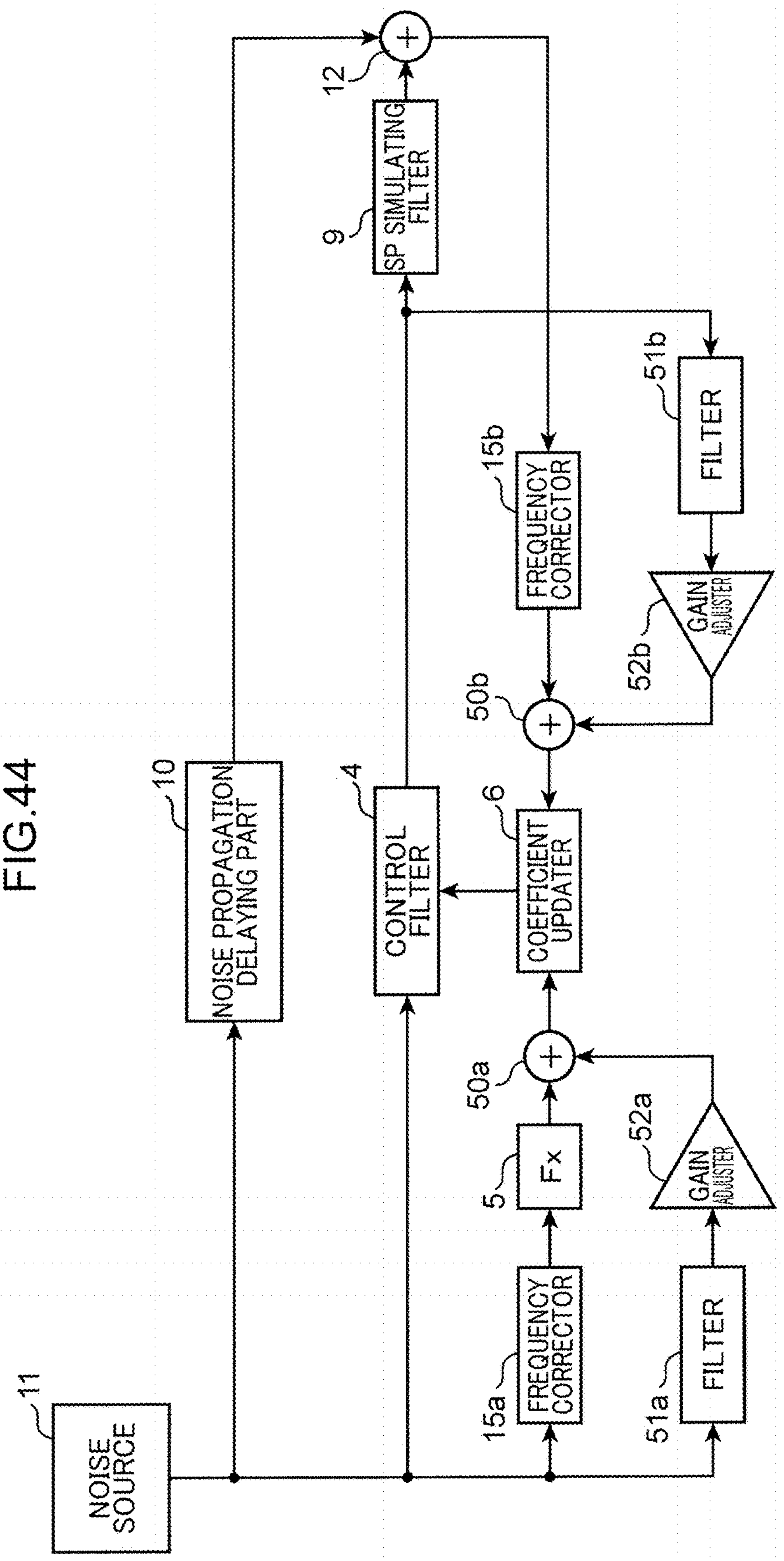
FIG. 44 is a configuration diagram explaining an operation of a noise control system or device according to the background art.

FIG. 44 additionally includes frequency correctors 15*a*, 15*b* in comparison with FIG. 23, and a noise source 11 outputs a colored noise having such a characteristic that a level is lower at a higher frequency. Here, the frequency corrector 15*a* adjusts a frequency characteristic of the colored noise, and the frequency corrector 15*b* adjusts a frequency characteristic of an error signal from an adder 12. The frequency corrector 15*a* has the same characteristic as the characteristic of the frequency corrector 15*b*.

Figure 45:
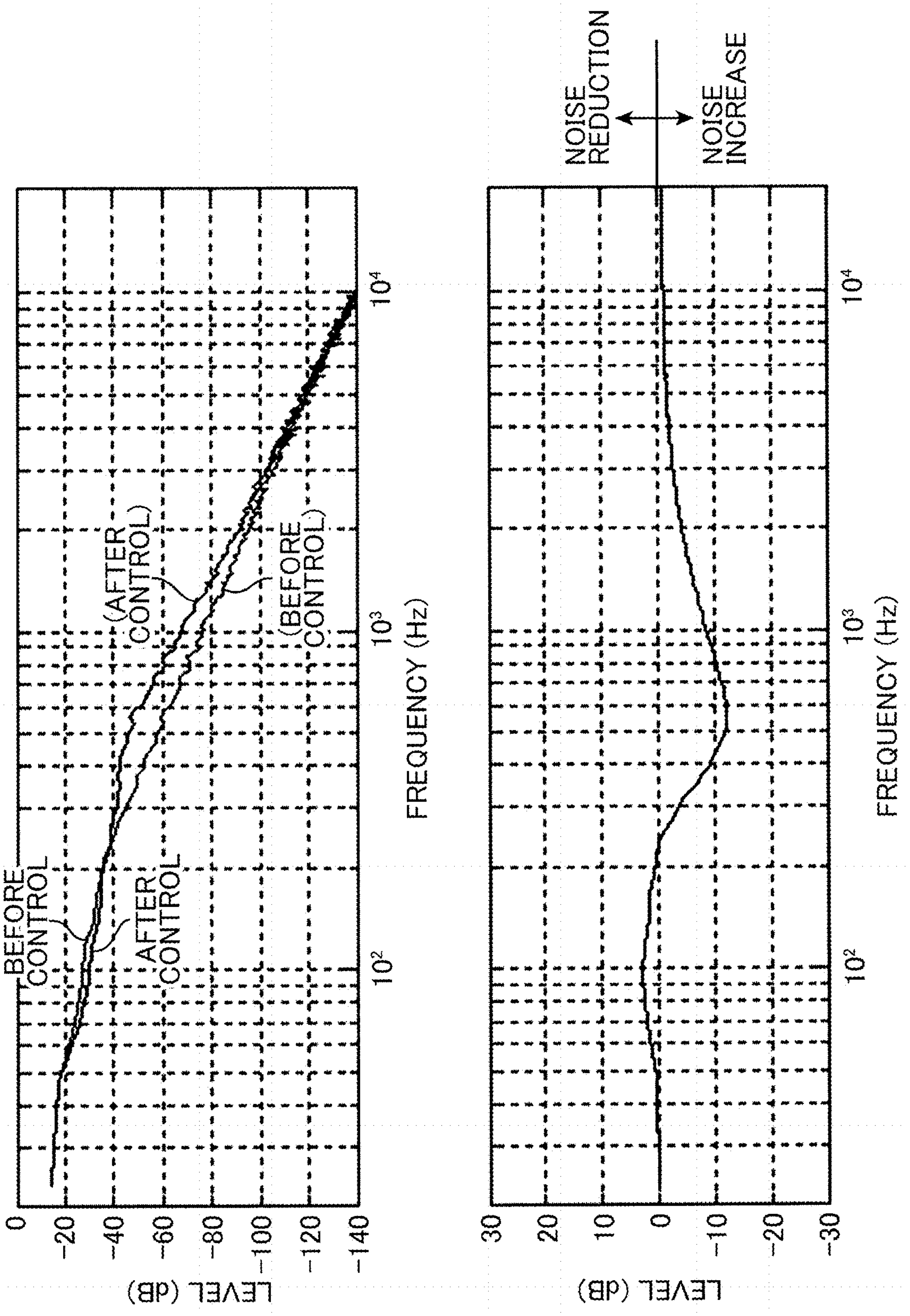
FIG. 45 includes graphs each showing a noise control effect.

First, the colored noise is examined without use of the frequency correctors 15*a*, 15*b*, and a noise reduction effect (error signal) is obtained by the adder 12 as shown in FIG. 45. A noise signal has a higher level at a lower frequency, and thus, the lower frequency must be preferentially controlled. However, a speaker simulating filter 9 has such a characteristic that a level is lower at a lower frequency as shown in FIG. 24, and thus, the control is more difficult at the lower frequency. Eventually, a noise reduction effect is slightly obtained only in a range from 50 to 200 Hz, on the contrary, a noise increase is seen at 250 Hz or higher.

Figure 46:
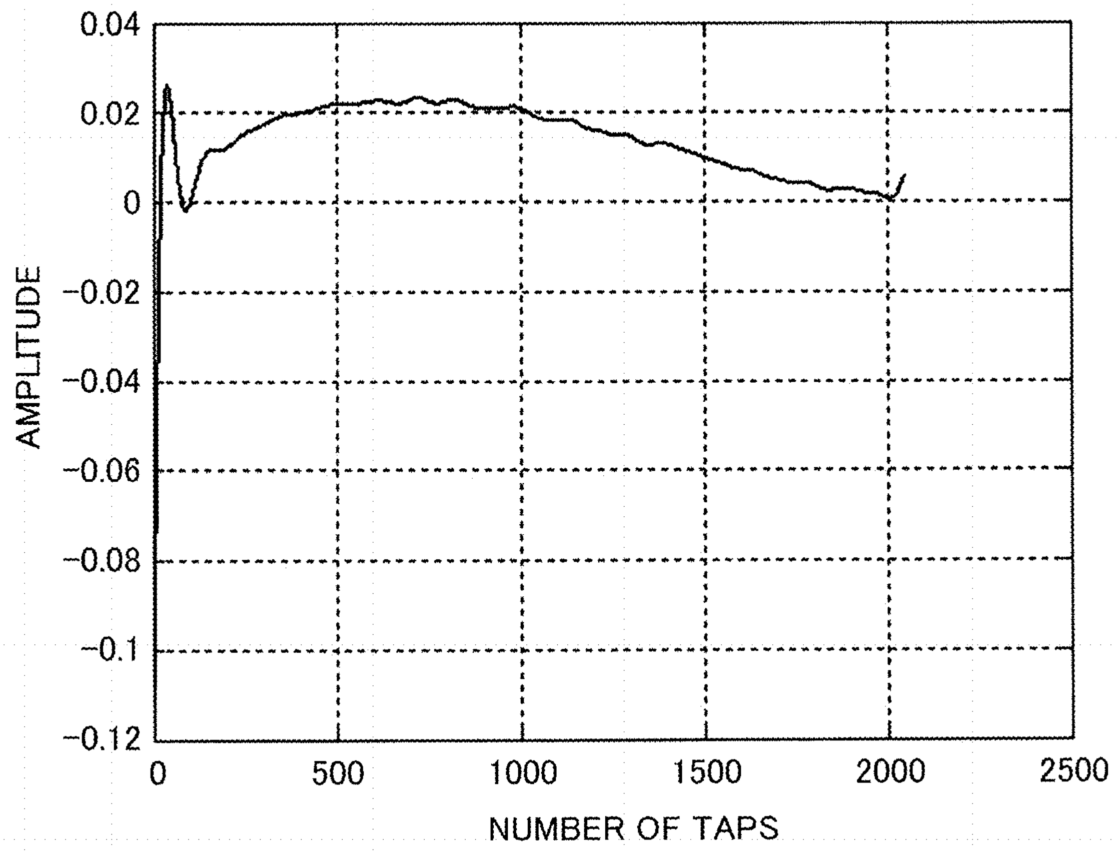
FIG. 46 is a graph showing a time characteristic of a control filter.
Figure 47:
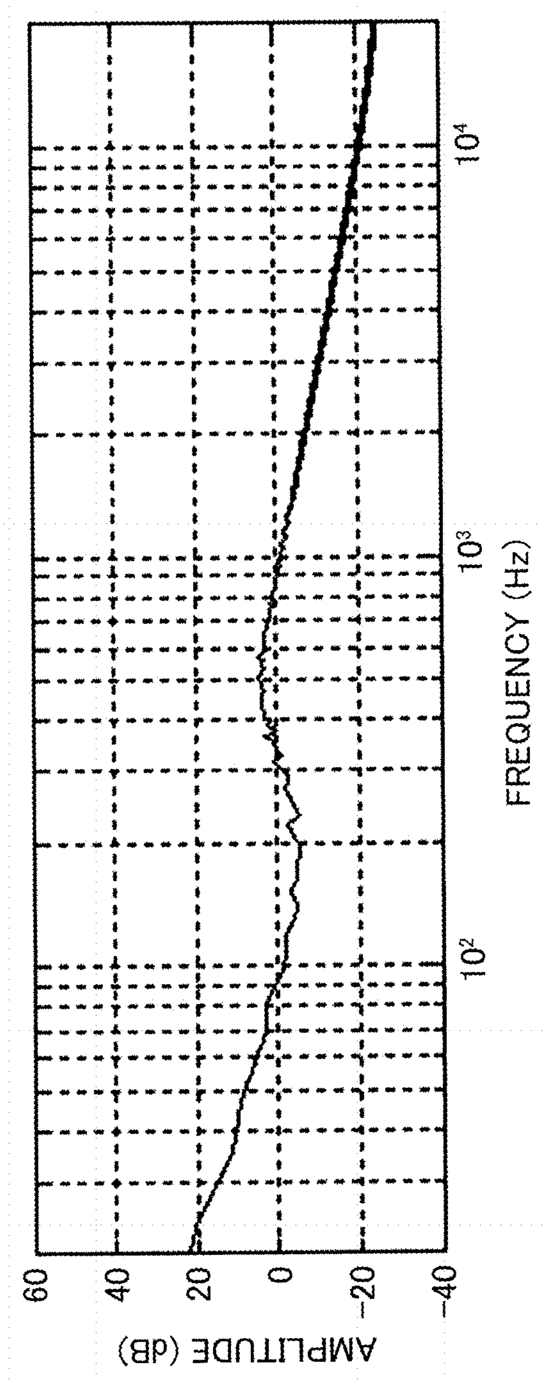
FIG. 47 is a graph showing an amplitude frequency characteristic of the control filter.

It is confirmed from a coefficient of a control filter 4 at this time that a time characteristic has an impulse peak at the $0^{th}$ tap as shown in FIG. 46, and an amplitude frequency characteristic of a coefficient shown in FIG. 47 has a higher amplitude level around 500 Hz. This leads to a noise increase around 500 Hz shown in FIG. 45.

Subsequently, each of the frequency correctors 15*a*, 15*b* in FIG. 44 is appropriately set. For instance, adoption of an HPF having “fc=500 Hz” for each corrector so that a frequency at 500 Hz or lower is gradually cut off leads to a noise reduction effect (error signal) obtained by the adder 12 as shown FIG. 48.

Figure 48:
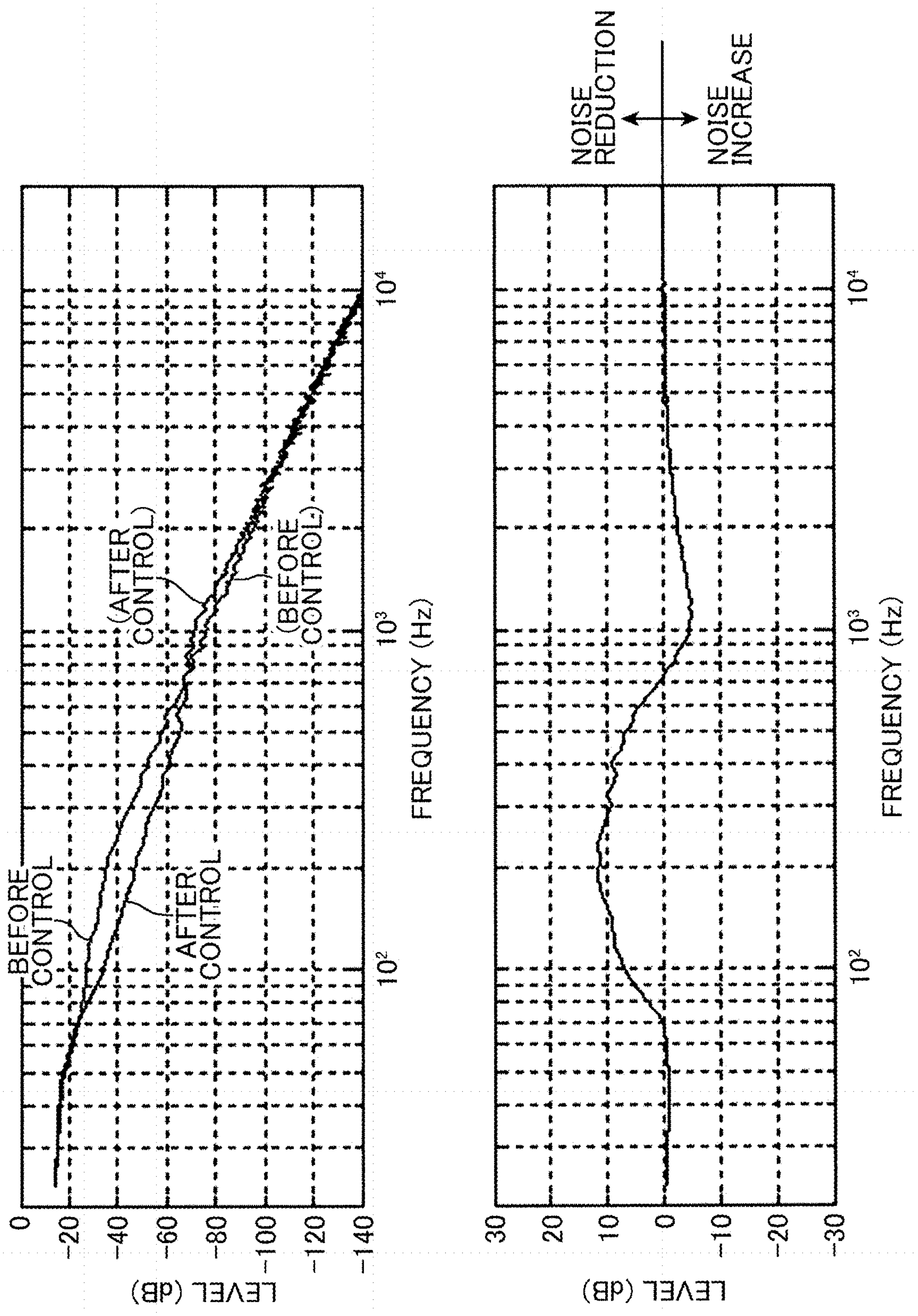
FIG. 48 includes graphs each showing a noise control effect.

FIG. 48 shows a noise reduction effect of around 10 dB at maximum around 70 to 700 Hz, and thus, the effect is much greater than the effect in FIG. 45. However, a noise increase is seen at 800 Hz or higher although the noise increase is not so large as the noise increase in FIG. 45.

Figure 49:
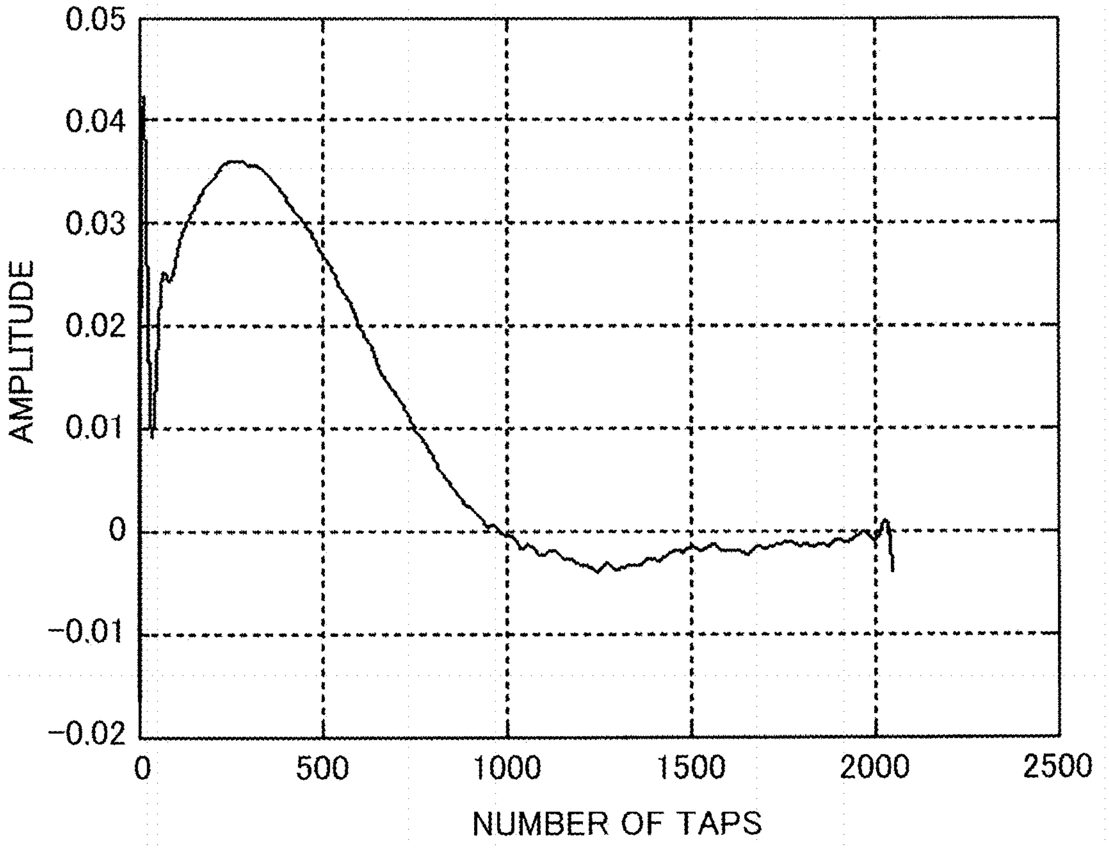
FIG. 49 is a graph showing a time characteristic of a control filter.
Figure 50:
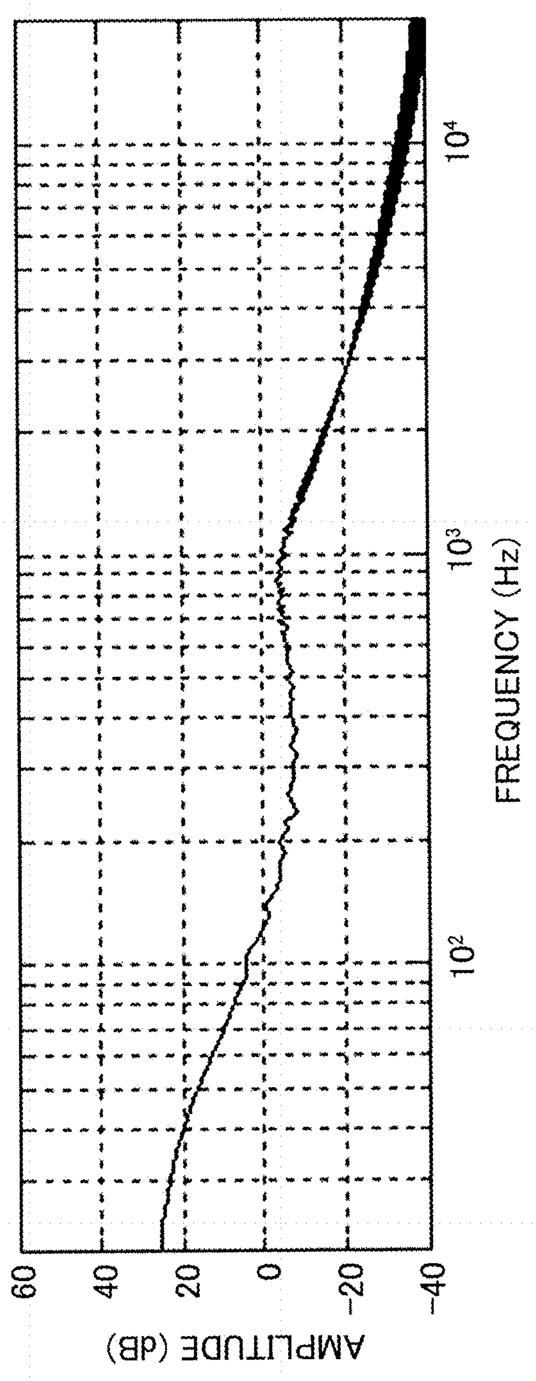
FIG. 50 is a graph showing an amplitude frequency characteristic of the control filter.

It is confirmed from the coefficient of the control filter 4 at this time that a time characteristic has an impulse peak at the $0^{th}$ tap as shown in FIG. 49, and an amplitude frequency characteristic of a coefficient shown in FIG. 50 has a higher amplitude level around 1000 Hz. This leads to a noise increase around 1000 Hz shown in FIG. 48.

Heretofore, the filters 51*a*, 51*b* and the gain adjusters 52*a*, 52*b* in FIG. 44 are excluded, but hereinafter, these filters and adjusters are used for examination under an appropriate condition.

FIG. 48 shows a noise increase at 800 Hz or higher. Accordingly, an HPF having “fc=700 Hz” is adopted for each of the filters 51*a*, 51*b* so as to extract the frequency band, and each of the gain adjusters 52*a*, 52*b* is adjusted at an appropriate level.

Figure 51:
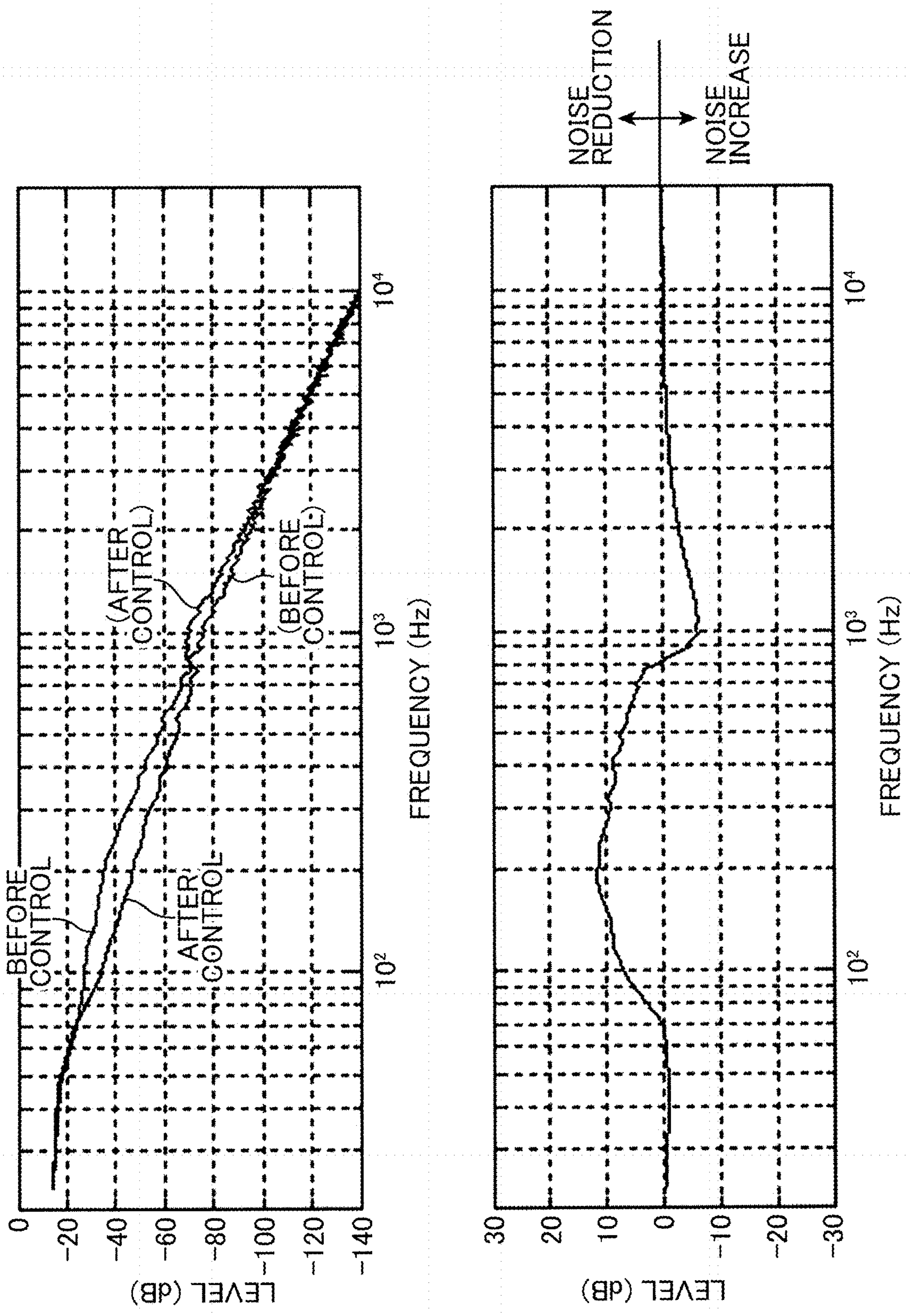
FIG. 51 includes graphs each showing a noise control effect.

As a result, a slightly greater noise reduction effect of around 10 dB at maximum is obtained at 70 to 800 Hz shown in FIG. 51, but a noise increase at 800 Hz or higher remains seen without being suppressed.

Figure 52:
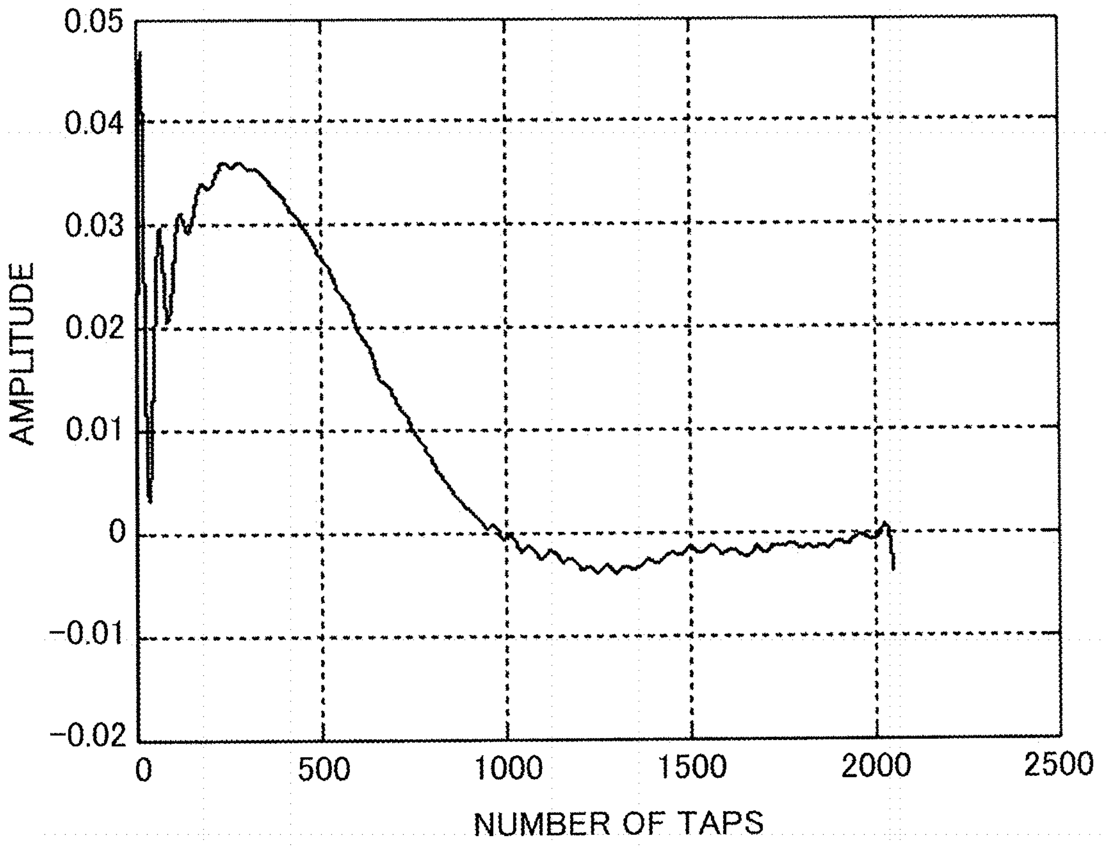
FIG. 52 is a graph showing a time characteristic of a control filter.
Figure 53:
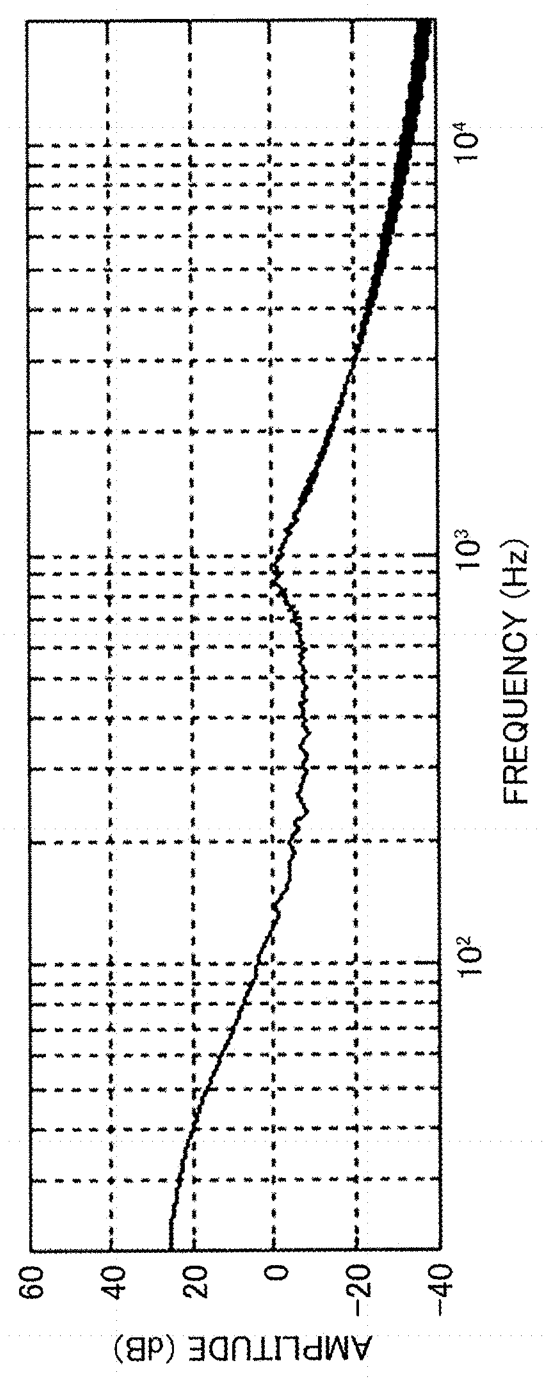
FIG. 53 is a graph showing an amplitude frequency characteristic of the control filter.

It is confirmed from the coefficient of the control filter 4 at this time that a time characteristic has an impulse peak at the $0^{th}$ tap as shown in FIG. 52, and an amplitude frequency characteristic of a coefficient shown in FIG. 53 has a higher amplitude level around 900 Hz. This leads to a noise increase around 1000 Hz shown in FIG. 51.

Conclusively, the background art including Patent Literature 2 is found to fail to suppress a noise increase in a high band like the one shown in FIG. 51 as well as a noise increase in a low band like the one shown in each of FIG. 29, FIG. 32, FIG. 35, and FIG. 38 when a causality is not satisfied.

Hereinafter, features of the present disclosure will be described.

A noise control system according to a first feature of the present disclosure includes: a noise detector that detects a noise from a noise source to output a noise signal; a first control filter that performs signal processing to the noise signal to output a first control signal; a second control filter that performs signal processing to the noise signal to output a second control signal; an adder that adds the first control signal and the second control signal to output a third control signal; a speaker that generates a control sound on the basis of the third control signal; an error microphone that is provided at a control point and detects an interference sound of the noise and the control sound to output an error signal; a transmission characteristic corrector that has a transmission characteristic coefficient in accordance with a transmission characteristic from the speaker to the error microphone and performs signal processing to the noise signal on the basis of the transmission characteristic coefficient; a first coefficient updater that updates, on the basis of an output signal from the transmission characteristic corrector and the error signal, a coefficient of the first control filter so as to minimize the error signal; a first band limiting filter that performs a band limitation to the noise signal in such a manner as to fall within a predetermined frequency band; a second band limiting filter that performs a band limitation to the third control signal in such a manner as to fall within the predetermined frequency band; and a second coefficient updater that updates, on the basis of an output signal from the first band limiting filter and an output signal from the second band limiting filter, a coefficient of the second control filter so as to minimize the output signal from the second band limiting filter.

In the first feature, even when an error signal detected at the error microphone increases a noise after the first control filter controls the noise, the second control filter outputs the second control signal for the first control signal from the first control filter to be the third control signal via the adder so as to reduce the frequency band in which the noise increases, thereby decreasing a noise increase component in the third control signal. This consequently achieves suppression of a noise increase and attains a noise reduction effect at the error microphone.

With a noise control system according to a second feature of the disclosure, in the first feature, the first control filter has the number of taps which is different from the number of taps in the second control filter.

In the second feature, the smaller number of taps in the second control filter than the number of taps in the first control filter leads to a success in reducing a calculation amount. This attains a noise reduction effect while suppressing a noise increase. In other words, the noise control effect and optimization of the calculation amount are attained.

With a noise control system according to a third feature of the disclosure, in the second feature, the number of taps in the second control filter is smaller than the number of taps in the first control filter.

The third feature succeeds in maximally preventing the noise control effect from becoming smaller due to the smaller number of taps in the filter.

With a noise control system according to a fourth feature of the disclosure, in any one of the first to third features, the predetermined frequency band is a frequency band in which the error signal increases the noise.

The fourth feature solves a drawback of an occurrence of a noise increase accompanied by a noise reduction by the first control filter against a noise at a location of the error microphone that inherently serves as a control point. Specifically, each of the first band limiting filter and the second band limiting filter has a filter coefficient for filtering in a frequency band in which the noise increases. This enables filtering of a frequency component causing the noise increase in the first control signal from the first control filter to be the third control signal via the adder. The second coefficient updater updates a coefficient of the second control filter for the filtered signal component. Consequently, the second control signal from the second control filter works to reduce only the noise increase component in the first control signal. This results in reducing a noise increase component in the third control signal, and finally attains a noise reduction while suppressing an increase in the noise at the location of the error microphone that serves as the control point.

A noise control system according to a fifth feature of the disclosure further includes, in any one of the first to fourth features, a plurality of processing groups each including the second control filter, the first band limiting filter, the second band limiting filter, and the second coefficient updater, the processing groups having different predetermined frequency bands from each other.

In the fifth feature, even when a noise increases in a plurality of frequency bands, each group reduces a noise increase in each frequency band to achieve suppression of the noise increase in all the frequency bands.

With a noise control system according to a sixth feature of the disclosure, in any one of the first to fifth features, the control point includes a first control point and a second control point, and the speaker includes a first speaker for the first control point and a second speaker for the second control point. The noise control system further includes first and second processing groups each including the second control filter, the first band limiting filter, the second band limiting filter, and the second coefficient updater, the first processing group being for the first speaker and the second processing group being for the second speaker.

In the sixth feature, even when there is a plurality of control points, each group for each speaker enables execution of an optimal noise control at each control point.

A noise control system according to a seventh feature of the disclosure further includes, in any one of the first to sixth features: an effect measurement part that measures a noise control effect on the basis of the error signal; and a filter characteristic setting part that determines the predetermined frequency band on the basis of the noise control effect measured by the effect measurement part, and sets a filter coefficient of each of the first band limiting filter and the second band limiting filter.

The seventh feature enables grasping of a situation of the noise increase on the basis of the noise control effect at the location of the error microphone, and setting of the filter coefficient of each of the first band limiting filter and the second band limiting filter in accordance with a frequency band in which the noise increases, and thus achieves appropriate suppression of a noise increase.

With a noise control system according to an eighth feature of the disclosure, in the seventh feature, the effect measurement part generates a difference signal between the error signal and the third control signal, and measures the noise control effect on the basis of the error signal and the difference signal.

The eighth feature enables acquisition of a pre-control signal or difference signal as well as a post-control signal or error signal in controlling of the noise. As a result, the noise control effect including both the noise reduction effect and the noise increase suppression is seen, and thus, the first control filter and the second control filter are appropriately operable in accordance with the noise control effect.

A noise control system according to a ninth feature of the disclosure further includes, in any one of the first to eighth features: an effect measurement part that measures a noise control effect on the basis of the error signal; and a convergence constant adjuster that adjusts a convergence constant of the second updater on the basis of the noise control effect measured by the effect measurement part.

The ninth feature enables the second coefficient updater to appropriately operate, which results in an achievement of reliable suppression of a noise increase at the location of the error microphone.

A noise control system according to a tenth feature of the disclosure further includes, in any one of the first to ninth features: a first frequency characteristic adjusting filter that adjusts a frequency characteristic of the noise signal; and a second frequency characteristic adjusting filter that adjusts a frequency characteristic of the error signal. The transmission characteristic corrector receives an output signal from the first frequency characteristic adjusting filter. The first coefficient updater updates, on the basis of an output signal from the transmission characteristic corrector and an output signal from the second frequency characteristic adjusting filter, the coefficient of the first control filter so as to minimize the output signal from the second frequency characteristic adjusting filter.

The tenth feature enables the first control filter to appropriately operate even in a case of a colored noise, such as an operation sound like a motor sound or a wind sound from an air conditioner or a cleaner, or a running noise from an automobile, having such a frequency characteristic that a level is lower in a higher band instead of a frequency characteristic having a fixed level.

A program according to an eleventh feature of the present disclosure is a program for operating a signal processor mounted on a noise control system including: a noise detector that detects a noise from a noise source to output a noise signal, a speaker that generates a control sound, and an error microphone that is provided at a control point and detects an interference sound of the noise and the control sound to output an error signal. The program includes: by the signal processor by executing the program, causing a first control filter to perform signal processing to the noise signal to output a first control signal; causing a second control filter to perform signal processing to the noise signal to output a second control signal; outputting a third control signal by adding the first control signal and the second control signal; causing a transmission characteristic corrector having a transmission characteristic coefficient in accordance with a transmission characteristic from the speaker to the error microphone to perform signal processing to the noise signal on the basis of the transmission characteristic coefficient; updating, on the basis of an output signal from the transmission characteristic corrector and the error signal, a coefficient of the first control filter so as to minimize the error signal; and updating a coefficient of the second control filter, on the basis of an output signal from a first band limiting filter that performs a band limitation to the noise signal in such a manner as to fall within a predetermined frequency band and an output signal from a second band limiting filter that performs a band limitation to the third control signal in such a manner as to fall within the predetermined frequency band, so as to minimize the output signal from the second band limiting filter.

In the eleventh feature, even when an error signal detected at the error microphone increases a noise after the first control filter controls the noise, the second control filter outputs the second control signal for the first control signal from the first control filter to be the third control signal so as to reduce the frequency band in which the noise increases, thereby decreasing a noise increase component in the third control signal. This consequently achieves suppression of a noise increase and attains a noise reduction effect at the error microphone.

A noise control method according to a twelfth feature of the present disclosure is a noise control method to be executed by a noise control system including a noise detector that detects a noise from a noise source to output a noise signal, a speaker that generates a control sound, and an error microphone that is provided at a control point and detects an interference sound of the noise and the control sound to output an error signal. The noise control method includes: by a signal processor, causing a first control filter to perform signal processing to the noise signal to output a first control signal; causing a second control filter to perform signal processing to the noise signal to output a second control signal; outputting a third control signal by adding the first control signal and the second control signal; causing a transmission characteristic corrector having a transmission characteristic coefficient in accordance with a transmission characteristic from the speaker to the error microphone to perform signal processing to the noise signal on the basis of the transmission characteristic coefficient; updating, on the basis of an output signal from the transmission characteristic corrector and the error signal, a coefficient of the first control filter so as to minimize the error signal; and updating a coefficient of the second control filter, on the basis of an output signal from a first band limiting filter that performs a band limitation to the noise signal in such a manner as to fall within a predetermined frequency band and an output signal from a second band limiting filter that performs a band limitation to the third control signal in such a manner as to fall within the predetermined frequency band, so as to minimize the output signal from the second band limiting filter.

In the twelfth feature, even when an error signal detected at the error microphone increases a noise after the first control filter controls the noise, the second control filter outputs the second control signal for the first control signal from the first control filter to be the third control signal so as to reduce the frequency band in which the noise increases, thereby decreasing a noise increase component in the third control signal. This consequently achieves suppression of a noise increase and attains a noise reduction effect at the error microphone.

EMBODIMENTS OF THE PRESENT DISCLOSURE

Hereinafter, embodiments of the disclosure will be described with reference to the accompanying drawings. The elements given the same reference numerals in different drawings are defined to be the same or corresponding elements. Further, constituent elements, arrangement and connection of the constituent elements, an operation order, and the like shown in the embodiments described below are mere examples, and do not intend to limit the present disclosure. The present disclosure is defined by the scope of claims. Moreover, constituent elements which are not recited in the independent claims each showing the broadest concept among the constituent elements in the embodiments are not indispensable to achieve the object of the present disclosure but are described as selectable constituent elements.

First Embodiment

Figure 1:
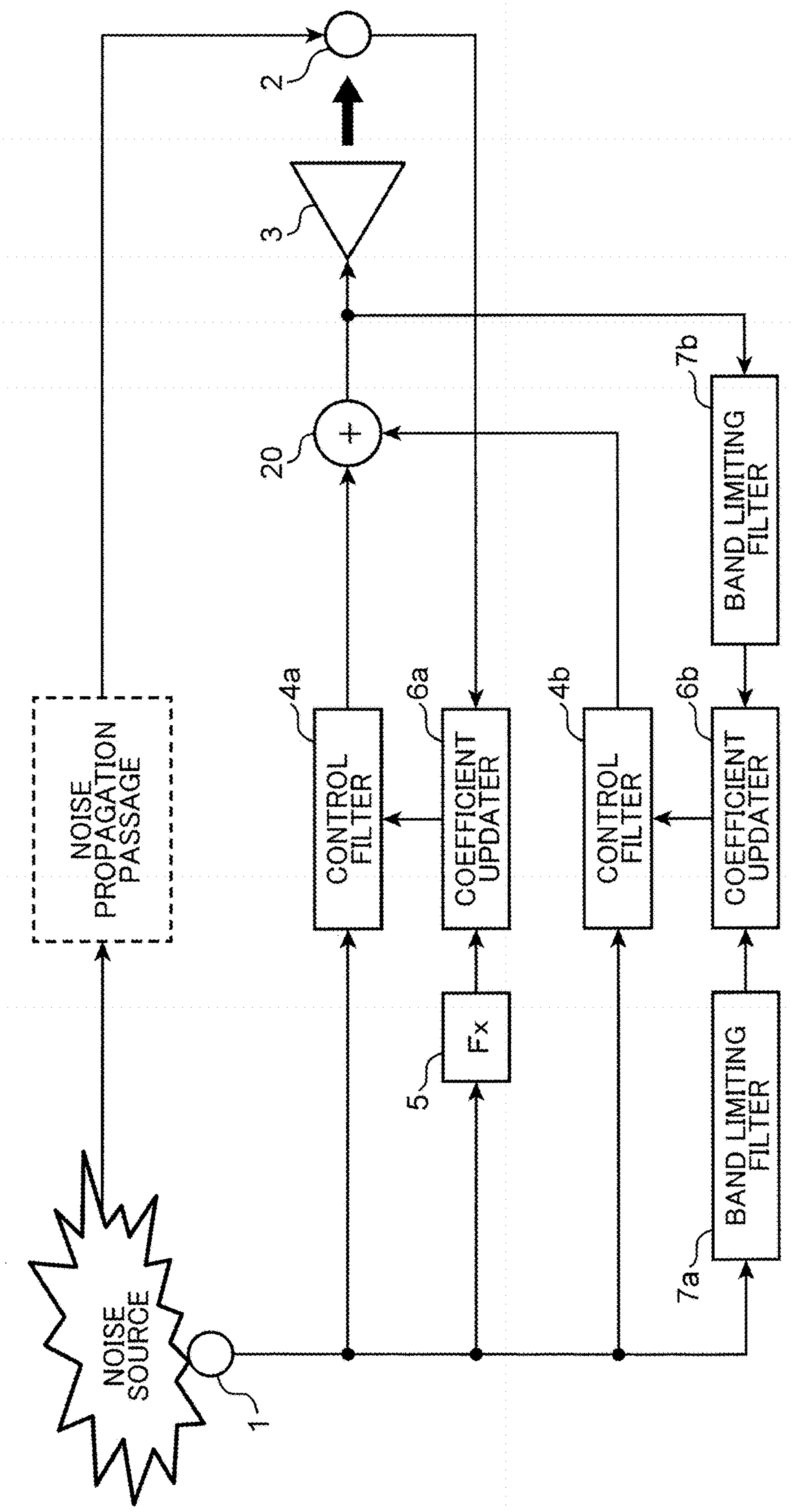
FIG. 1 is a schematic diagram showing a configuration of a noise control system according to a first embodiment.

A configuration of a noise control system according to a first embodiment of the present disclosure will be described. FIG. 1 is a diagram showing the configuration of the noise control system according to the first embodiment.

The noise control system includes a noise microphone 1 serving as a noise detector, a control filter 4*a* serving as a first control filter, a control filter 4*b* serving as a second control filter, an adder 20, a speaker 3, an error microphone 2, an Fx filter 5 ("Fx" in Fig) serving as a transmission characteristic corrector, a coefficient updater 6*a* serving as a first coefficient updater, a band limiting filter 7*a* serving as a first band limiting filter, a band limiting filter 7*b* serving as a second band limiting filter, and a coefficient updater 6*b* serving as a second coefficient updater.

Each of the control filter 4*a*, the control filter 4*b*, the adder 20, the Fx filter 5, the coefficient updater 6*a*, the band limiting filter 7*a*, the band limiting filter 7*b*, and the coefficient updater 6*b* may be mounted by using dedicated or universal hardware, or may be mounted to serve as software realized by executing a predetermined program by a processor or a signal processor like a CPU.

In the noise control system in FIG. 1, the control filter 4*a* performs signal processing to a noise signal detected at the noise microphone 1, the speaker 3 receives an output signal or a first control signal from the filter as a control signal via the adder 20, and the speaker 3 reproduces the control signal to generate a control sound. Then, the error microphone 2 detects an interference sound of a noise and the control sound to be an error signal.

By contrast, the Fx filter 5 having a proximate transmission characteristic from the speaker 3 to the error microphone 2 performs signal processing to the noise signal from the noise microphone 1, and the coefficient updater 6*a* receives an output signal from the filter and the error signal from the error microphone 2. Then, the coefficient updater 6*a* updates a coefficient of the control filter 4*a* so as to minimize the error signal.

Like the background art, the operation described heretofore is same as the operation of the typical ANC using an adaptive filter.

Subsequently, the band limiting filter 7*a* extracts a necessary frequency component from the noise signal from the noise microphone 1, the band limiting filter 7*b* extracts a necessary frequency component from the control signal from the adder 20, and the coefficient updater 6*b* receives an input of each of the extracted frequency components or signals. The coefficient updater 6*b* updates, on the basis of the input signals, a coefficient of the control filter 4 so as to minimize only the frequency components respectively extracted by the band limiting filters 7*a*, 7*b* in the control signal from the control filter 4*a*. The control filter 4*b* then performs signal processing to the noise signal from the noise microphone 1 by using the coefficient. The adder 20 inputs, into the speaker 3, an output signal or third control signal obtained by adding an output signal or second control signal having been subjected to the signal processing from the control filter 4*b* and an output signal from the control filter 4*a*. In other words, the adder 20 adds the first control signal from the control filter 4*a* and the second control signal from the control filter 4*b* to output the third control signal.

In this configuration, in a case where a noise increases due to a certain reason that a causality is not satisfied or other reason under a noise control by the control filter 4*a*, each of the band limiting filters 7*a*, 7*b* extracts a band in which the noise increases, and the coefficient updater 6*b* updates the coefficient of the control filter 4*b* to control the extracted band so that a frequency component causing the noise increase in the output signal from the control filter 4*a* reduces in the adder 20. This consequently achieves suppression of a noise increase and attains a noise reduction effect at a location of the error microphone 2 that serves as a control point.

Figure 2:
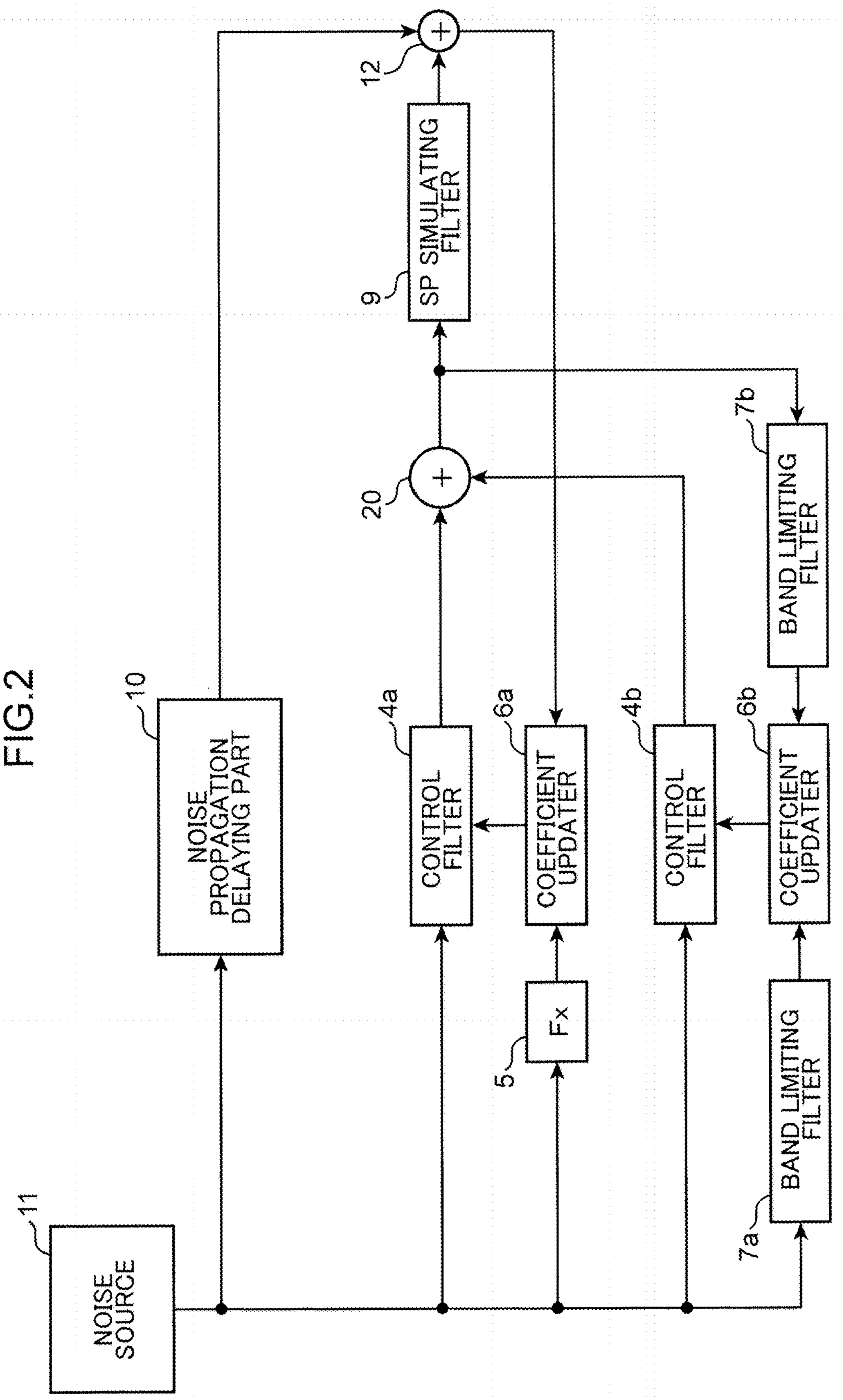
FIG. 2 is a diagram explaining an operation of the noise control system according to the first embodiment.

An actual operation will be described below with reference to FIG. 2. FIG. 2 shows a system established by using the configuration shown in FIG. 1 for effective discussion on an influence of the causality and better understanding thereof in the same manner as the description with reference to FIG. 23.

In FIG. 2, a noise source 11 generates a noise signal, a noise propagation delaying part 10 delays the noise signal for a predetermined time, and an adder 12 receives an output signal from the noise propagation delaying part.

Here, the adder 12 in FIG. 2 serves as the error microphone 2 in FIG. 1. A noise signal is directly acquirable from the noise source 11 in FIG. 2, and thus, the noise microphone 1 shown in FIG. 1 is unnecessary in FIG. 2.

Hence, the control filter 4*a* directly receives the noise signal from the noise source 11, and performs signal processing to the noise signal with a coefficient of the filter to output a control signal. A speaker simulating filter 9 performs signal processing to the control signal via the adder 20, and the adder 12 receives an output signal therefrom.

Here, the speaker simulating filter 9 simulates a characteristic of the speaker 3 in FIG. 1, and a second-order HPF having "fc=200 Hz" is adopted as an example in the same manner as that in FIG. 23.

Next, the Fx filter 5 receives the noise signal from the noise source 11, and the coefficient updater 6*a* receives an output signal from the filter.

The coefficient updater 6*a* further receives an error signal from the adder 12.

Then, the coefficient updater 6*a* updates a coefficient of the control filter 4*a* so as to minimize the error signal. This results in a decrease in a noise level of the error signal.

Subsequently, the band limiting filter 7*a* extracts a necessary frequency component from the noise signal from the noise source 11, the band limiting filter 7*b* also extracts a necessary frequency component from the control signal from the adder 20, and the coefficient updater 6*b* receives the extracted frequency components or signals. The coefficient updater 6*b* updates, by using the input signals, a coefficient of the control filter 4 so as to minimize only the frequency components respectively extracted by the band limiting filters 7*a*, 7*b* in the control signal from the control filter 4*a*. The control filter 4*b* performs signal processing to the noise signal from the noise source 11 by using the coefficient, and the adder 20 adds an output signal from the control filter 4*b* having been subjected to the signal processing and an output signal from the control filter 4*a*.

With reference to the configuration shown in FIG. 2, an operation in dissatisfaction of a causality will be discussed.

Here, a noise signal from the noise source 11 represents a colored noise that is a typical noise in an actual environment, such as a noise from an automobile, an air conditioner, or a cleaner, the colored noise having such a characteristic that a level is lower at a higher frequency. In this case, the configuration in FIG. 2 may be insufficient for an effective control. Accordingly, a configuration additionally including, as shown in FIG. 3, frequency correctors 15*a*, 15*b* like the configuration in FIG. 44 is adopted.

Figure 3:
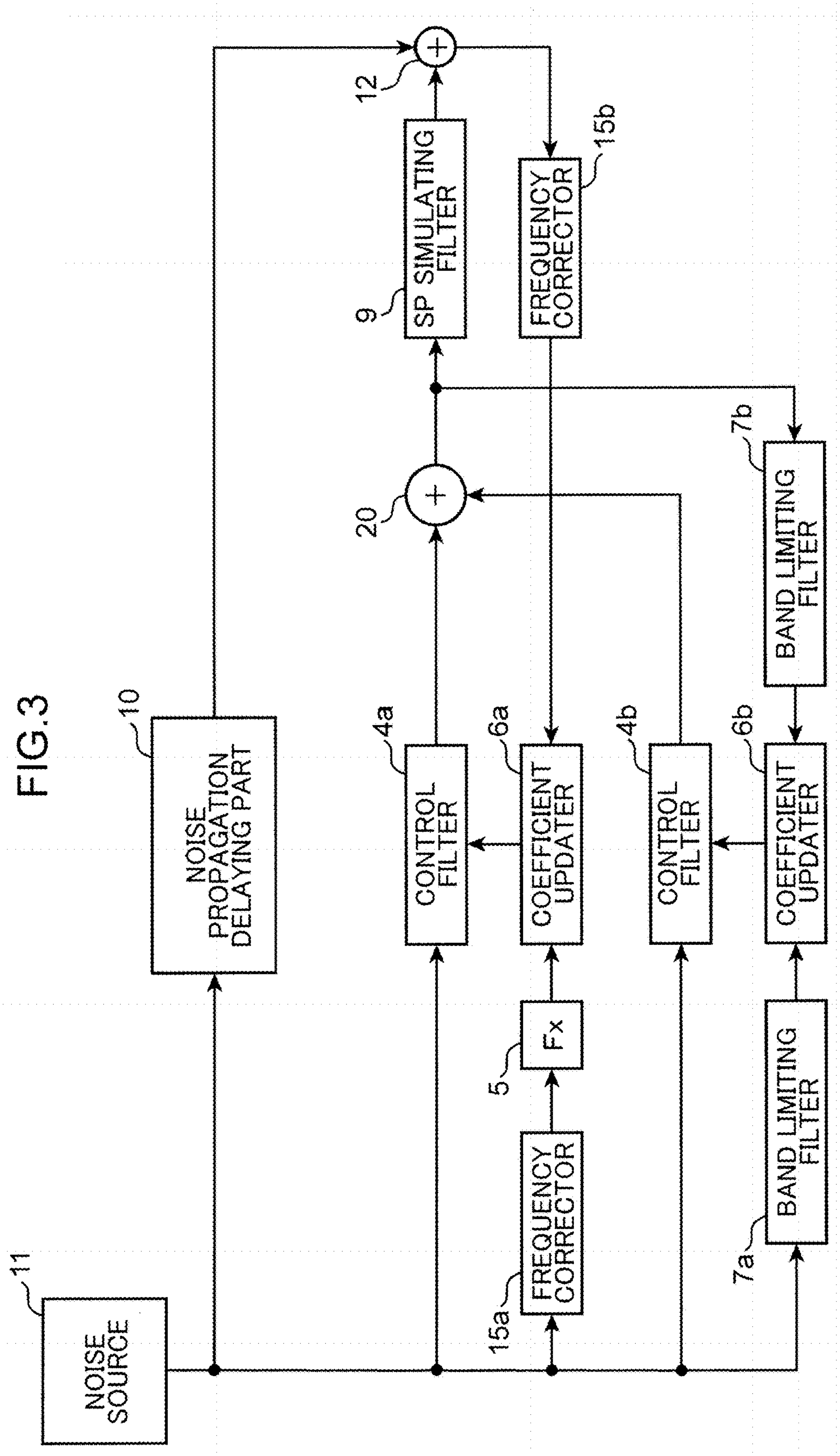
FIG. 3 is a diagram explaining an operation of the noise control system according to the first embodiment.

In FIG. 3, the frequency corrector 15*a* serving as the first frequency characteristic adjusting filter adjusts a frequency characteristic of a noise signal. The frequency corrector 15*b* serving as the second frequency characteristic adjusting filter adjusts a frequency characteristic of an error signal. An Fx filter 5 receives an output signal from the frequency corrector 15*a*. A coefficient updater 6*a* updates, on the basis of the output signal from the Fx filter 5 and an output signal from the frequency corrector 15*b*, a coefficient of a control filter 4*a* so as to minimize the output signal from the frequency corrector 15*b*.

With reference to the configuration shown in FIG. 3, an operation in the dissatisfaction of the causality will be described.

Next, a delay of 0 or zero tap is set for the noise propagation delaying part 10 in FIG. 3, and a condition that the causality is not satisfied, i.e., "D>T", is made. Further, an HPF having "fc=500 Hz" is adopted for each of the frequency correctors 15*a*, 15*b* like those in FIG. 44. Besides, an HPF having "fc=700 Hz" is adopted for each of the band limiting filters 7*a*, 7*b* like those in FIG. 51 so as to extract a frequency band in which a noise increases at 800 Hz or higher. Moreover, a coefficient updater 6*b* has an appropriate convergence constant to update a coefficient of the control filter 4*b* for suppressing the noise increase independently of a convergence constant of the coefficient updater 6*a* to update the coefficient of the control filter 4*a*.

The embodiment further enables an individual setting for each of the number of taps in the control filter 4*a* and the number of taps in the control filter 4*b* in addition to the individual setting for each of the convergence constant to update the coefficient for reducing the noise and the convergence constant to update the coefficient for suppressing the noise increase. These settings will be described later. Here, first, the same number of taps, i.e., 2048 taps, as the number of taps in the case in FIG. 44 is discussed.

Figure 4:
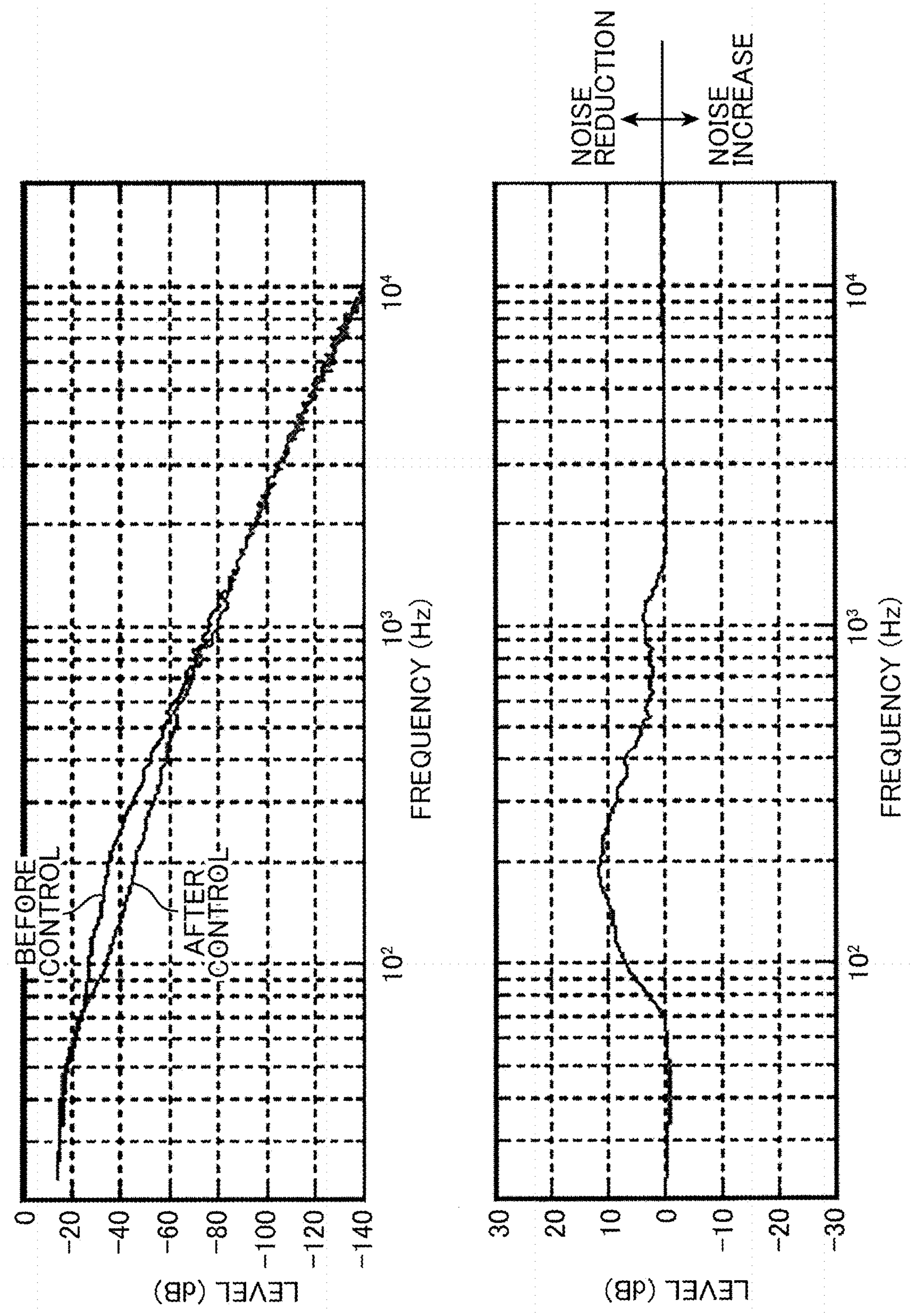
FIG. 4 includes graphs each showing a noise control effect.

In this regard, FIG. 4 show a noise reduction effect (error signal) obtained by the adder 12 at this time. In comparison with a control in each of FIG. 48 and FIG. 51, the control here is achieved in such a manner that an equivalent effective amount is acquired at 300 Hz or lower, an effective amount is acquired at 300 to 800 Hz as well, and a noise increase is suppressed and even an effect is seen at 800 Hz or higher.

It is seen from this perspective that the embodiment achieves suppression of a noise increase while maintaining the noise reduction effect even when the causality is not satisfied.

This is accomplished owing to preparation for two control filters with individually updatable coefficients, i.e., one control filter for a typical noise reduction and the other control filter for suppression of a noise increase, so that each control filter can execute its dedicated operation unlike the background art, such as Patent Literature 1 and Patent Literature 2. That is to say, the embodiment achieves a more flexible control than the background art adopting a single control filter for both the noise reduction and noise increase suppression. In other words, the use of two control filters leads to a success in realizing a characteristic that is difficult to be realized by the single control filter. This is confirmed from total control characteristics.

Figure 5:
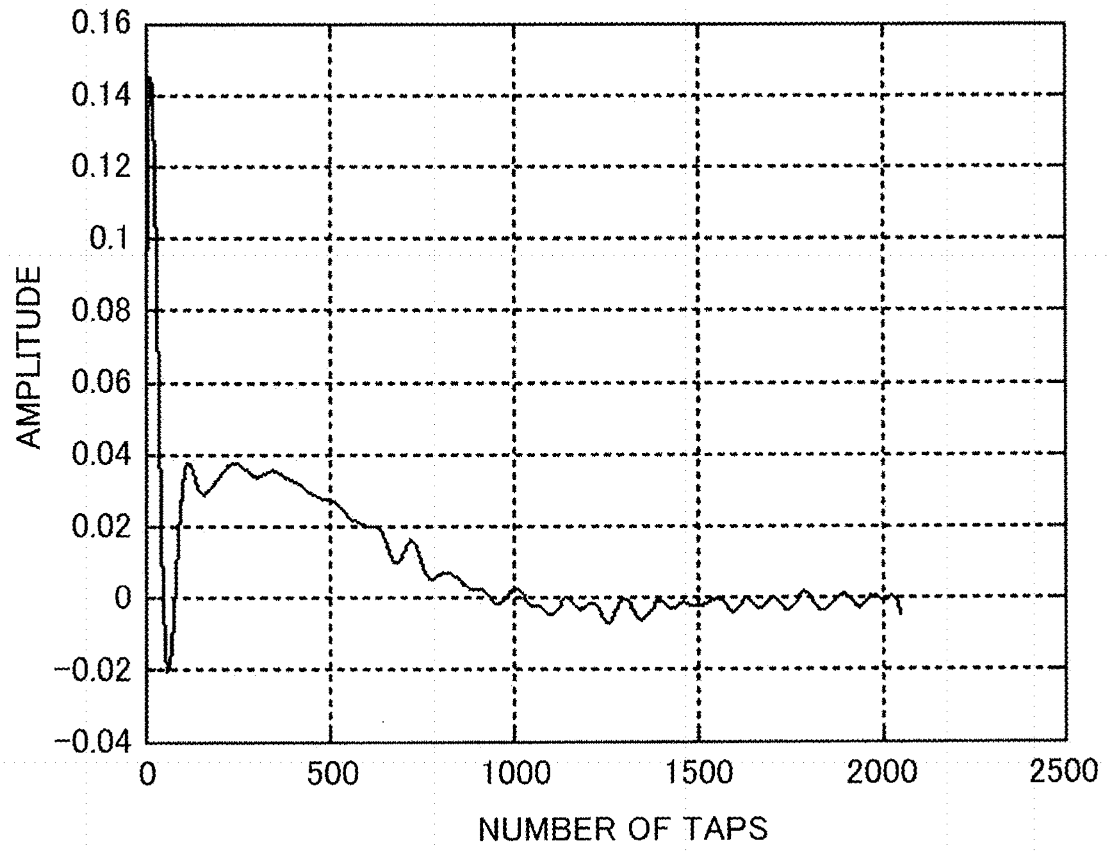
FIG. 5 is a graph showing a time characteristic of a control filter.
Figure 6:
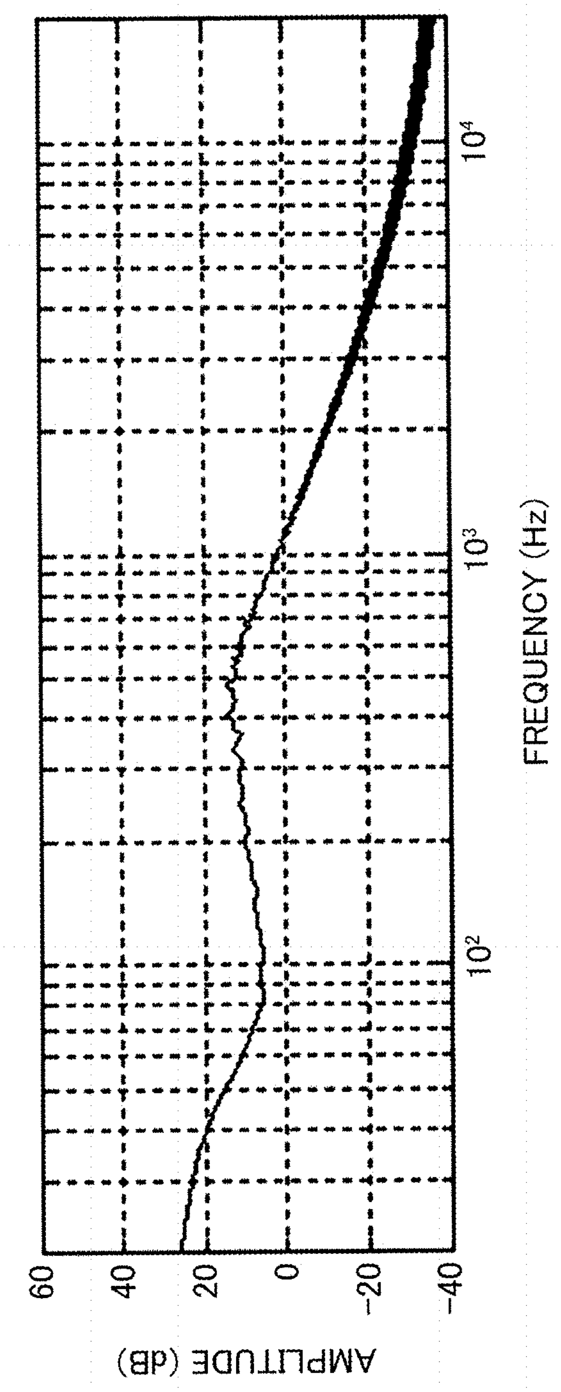
FIG. 6 is a graph showing an amplitude frequency characteristic of the control filter.
Figure 7:
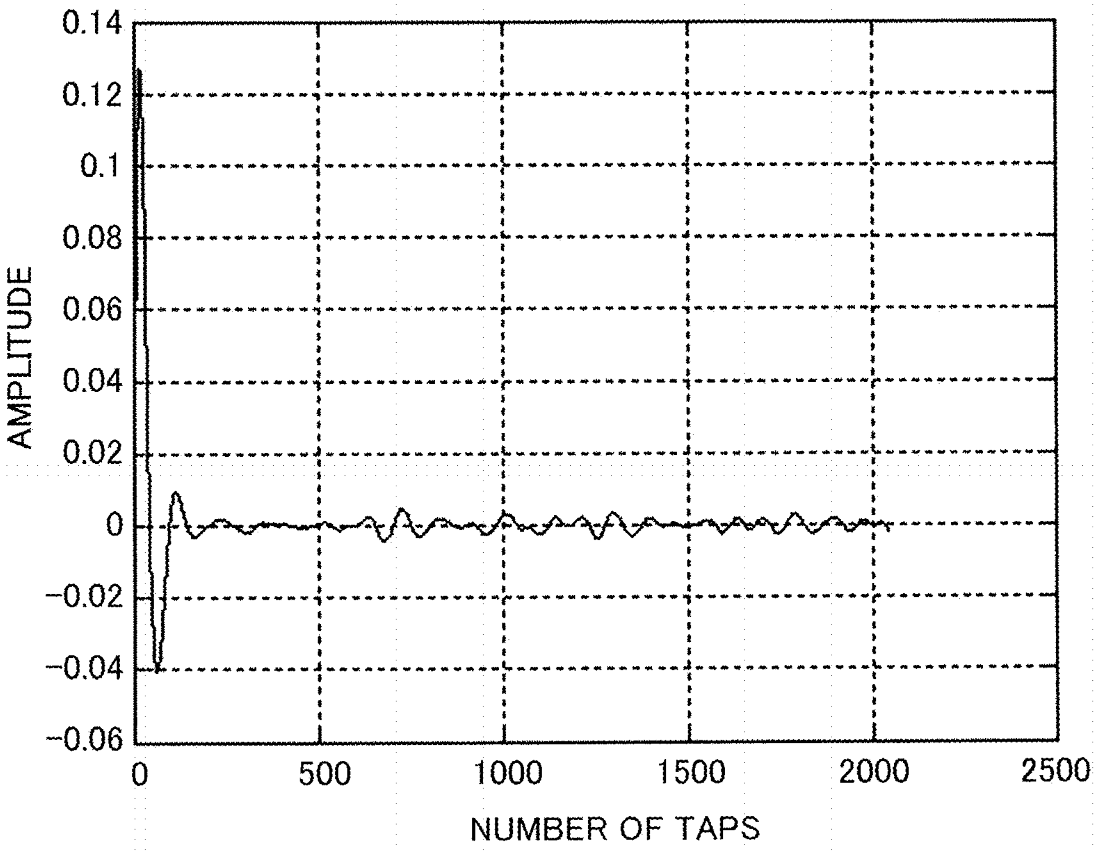
FIG. 7 is a graph showing a time characteristic of a control filter.
Figure 8:
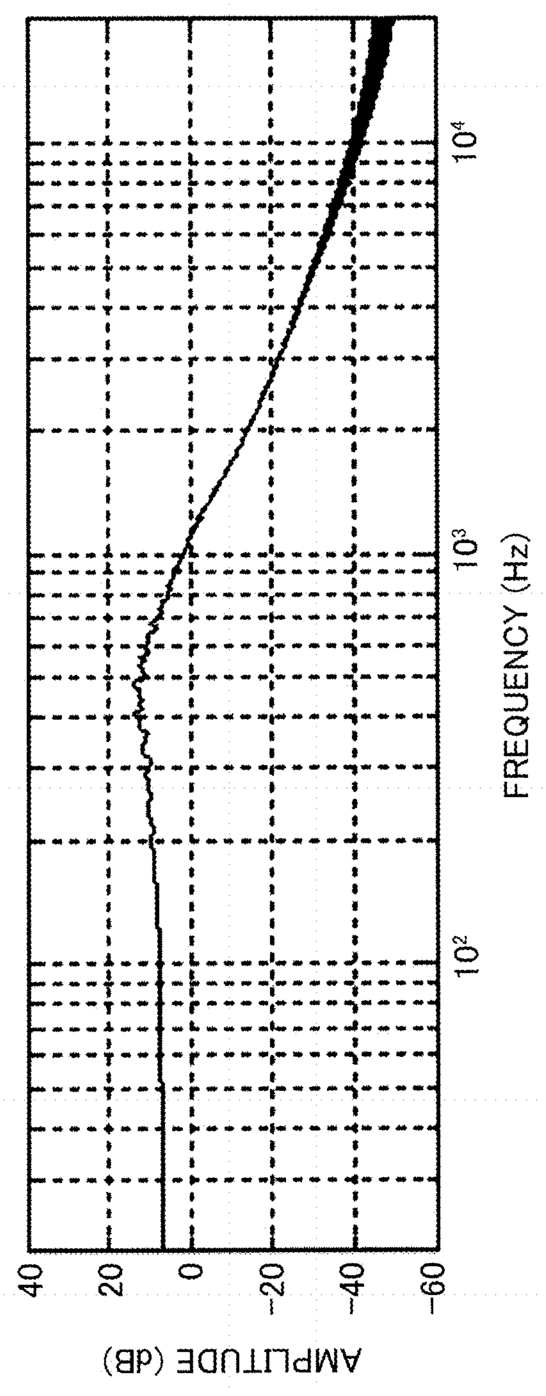
FIG. 8 is a graph showing an amplitude frequency characteristic of the control filter.

FIG. 5 shows a time characteristic of the coefficient of the control filter 4*a*. FIG. 6 shows an amplitude frequency characteristic having a higher level around 450 Hz. FIG. 7 shows a time characteristic of the coefficient of the control filter 4*b*. FIG. 8 shows an amplitude frequency characteristic having a higher level around 450 Hz.

Figure 9:
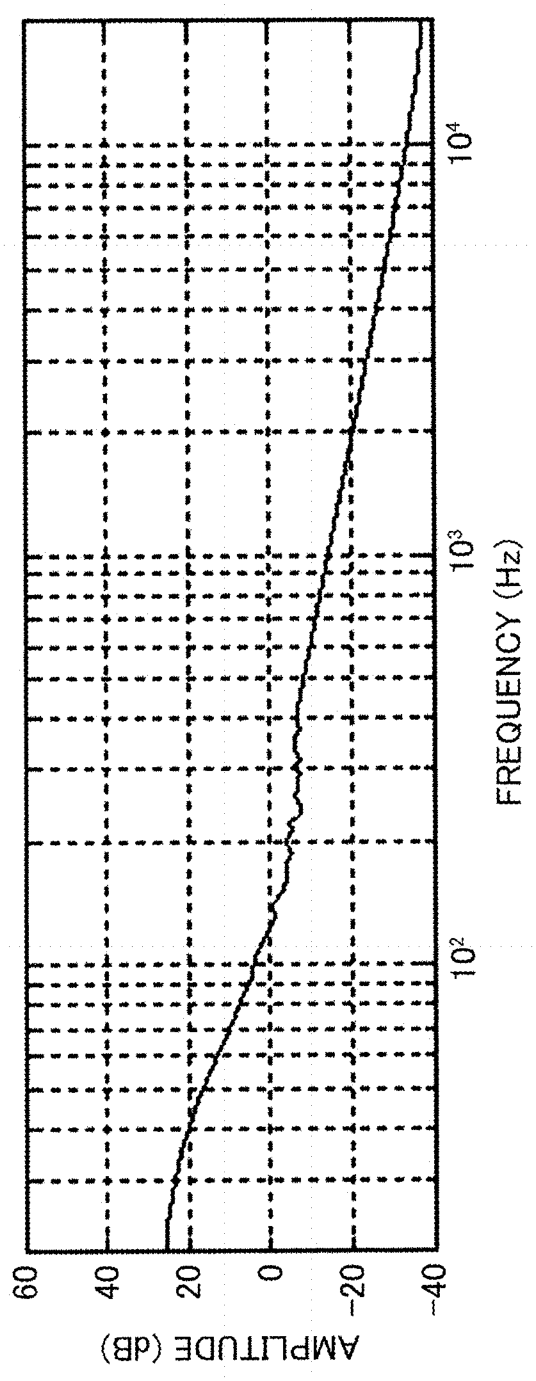
FIG. 9 is a graph showing total amplitude frequency characteristics of the control filters in combination.

In this regard, it is confirmed from FIG. 9 showing total control characteristics of the control filter 4*a* and the control filter 4*b* in combination that an increase in the level around 450 Hz is considerably suppressed. It is said from this perspective that the control filter 4*b* suppresses a noise increase related to the control filter 4*a*.

Here, a relation between the number of taps or a filter time length in the control filter 4*a* and the number of taps in the control filter 4*b* will be discussed with reference to FIG. 10.

Figure 10:
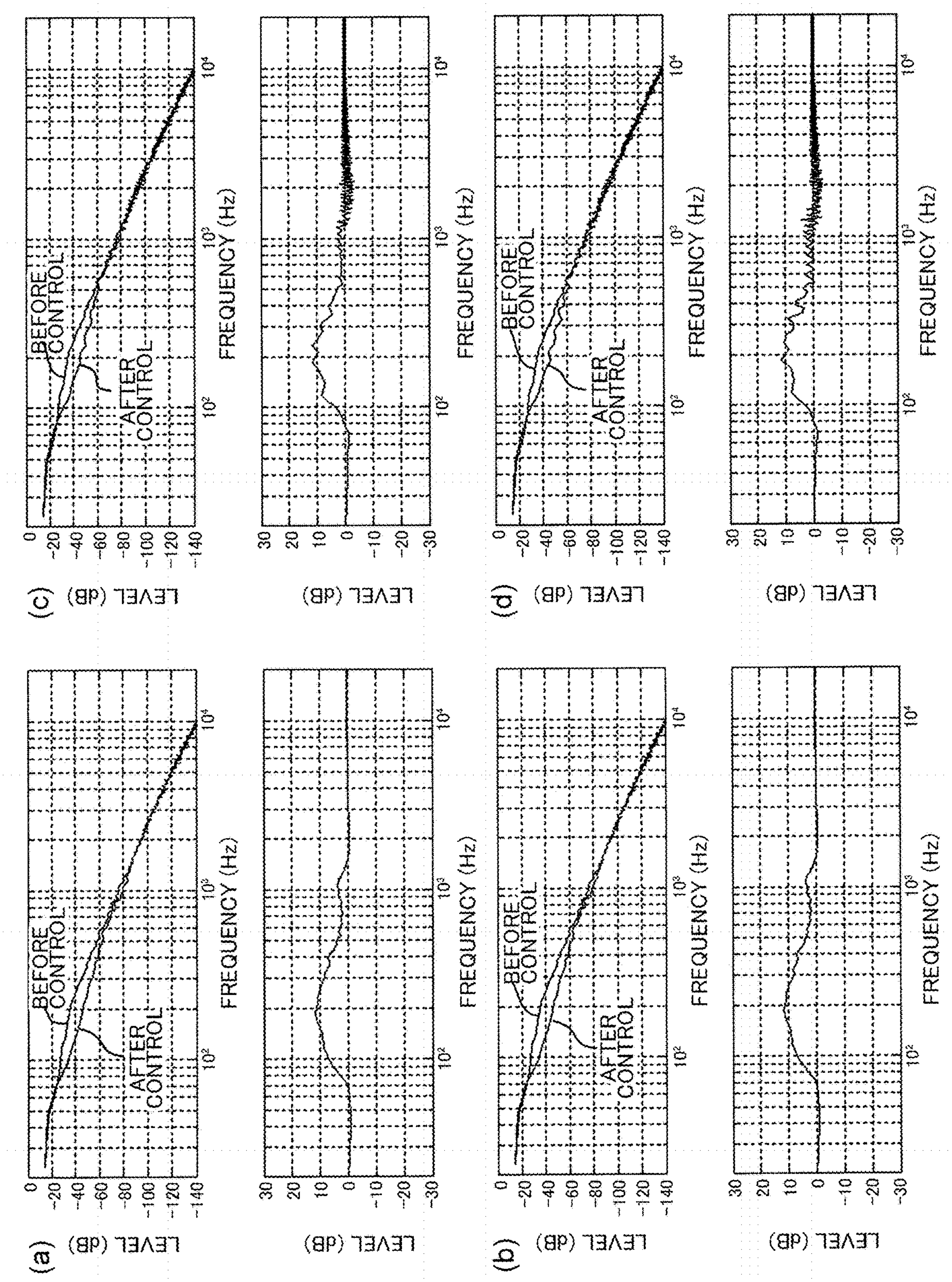
FIG. 10 includes graphs each showing a noise control effect in accordance with a difference in the number of taps in control filters.

FIG. 10(*a*) includes graphs each showing a case of 2048 taps in the control filter 4*a* and 2048 taps in the control filter 4*b* like the case in FIG. 4. A change in the effect in a case of a smaller number of taps for each of the control filter 4*a* and the control filter 4*b* will be discussed on the basis of the aforementioned number of taps.

FIG. 10(*b*) shows a change in the number of taps to 512 in the control filter 4*b* without a change in the number of taps, i.e., 2048 taps, in the control filter 4*a*. In this case, the same effect as the effect shown in FIG. 10(*a*) is obtained, and thus, no influence is seen due to the decrease in the number of taps.

FIG. 10(*c*) shows a change in the number of taps to 512 in the control filter 4*a* without a change in the number of taps, i.e., 2048 taps, in the control filter 4_b_. In this case, the noise increase is suppressed (that is, only a slight increase is seen at 2 kHz), but a noise reduction effect is smaller a little than that shown in FIG. 10(_a_).

FIG. 10(_d_) shows a change in the number taps to 512 taps in the control filter 4_a_ and a change in the number of taps to 512 taps in the control filter 4_b_. In this case, the noise increase is equivalent to that in FIG. 10(_c_) and the noise reduction effect is also equivalent to that in FIG. 10(_c_), but with some fluctuations.

It is said from these perspectives that the number of taps in the control filter 4_a_ is preferably larger than the number of taps in the control filter 4_b_. In particular, FIGS. 10(_a_) and (_b_) show that the number of taps in the control filter 4_b_ can be greatly decreased as long as the number of taps in the control filter 4_a_ is satisfactorily large, and hence, a calculation amount is reducible. By contrast, in an attempt to keep an overall calculation amount at a minimum, it is seen from FIGS. 10(_c_) and (_d_) that the number of taps in the control filter 4_a_ and the number of taps in the control filter 4_b_ may be firstly decreased, and subsequently, the numbers may be set to a same value.

The reason why the number of taps in the control filter 4_b_ can be decreased in this manner lies in that a frequency band in which the noise increases has a high frequency about 1 kHz or higher, and thus, a control accuracy is ensured even with a smaller number of taps. In other words, a larger number of taps is required for accurately expressing a lower frequency, but even a smaller number of taps is sufficient for accurately expressing a higher frequency.

Figure 11:
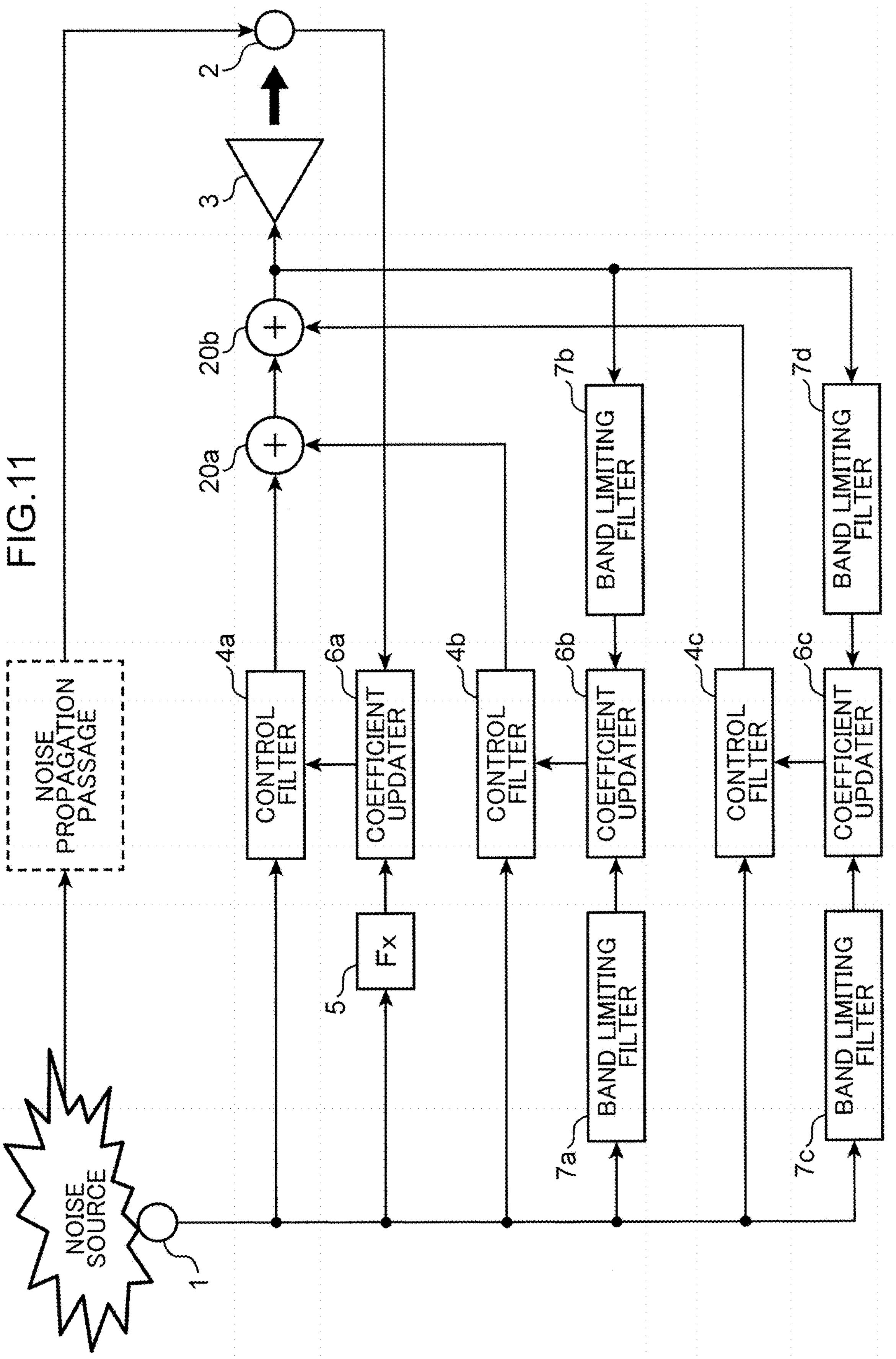
FIG. 11 is a schematic diagram showing a first modification of the configuration of the noise control system according to the first embodiment.

The configuration in FIG. 1 including the single control filter 4_b_ that suppresses a noise increase is satisfactory in a success in obtaining the effect shown in FIG. 4, but the configuration in FIG. 1 may be unsatisfactory for a wider or larger frequency band in which a noise increases. In this case, a control filter 4_c_ that suppresses a noise increase is further added as shown in FIG. 11. The addition of the control filter 4_c_ inevitably requires addition of an adder 20_b_, a coefficient updater 6_c_, and band limiting filters 7_c_, 7_d_. In this regard, a plurality of processing groups is provided, specifically, two processing groups are provided in this example, i.e., a processing group including the control filter 4_b_, the band limiting filter 7_a_, the band limiting filter 7_b_, the coefficient updater 6_b_, and a processing group including the control filter 4_c_, the band limiting filter 7_c_, the band limiting filter 7_d_, and the coefficient updater 6_c_. However, three or more processing groups may be provided. The band limiting filters 7_c_, 7_d_ may have a filter characteristic which is different from the filter characteristic of the band limiting filters 7_a_, 7_b_. Further, a value of a convergence constant is settable for the coefficient updater 6_c_ independently of the value for each of the coefficient updaters 6_a_, 6_b_. Besides, the number of taps in the control filter 4_c_ is settable independently of the number of taps in each of the control filters 4_a_, 4_b_.

The configuration in FIG. 11 makes the control filter 4_c_ control a noise increase related to the control filter 4_a_ and remaining even after a reduction by the control filter 4_b_, and thus attains a noise reduction effect while suppressing a noise increase which is seen in a wide or large band.

In other words, the number of control filter configurations may be increased to suppress a noise increase in accordance with a state of the noise increase.

Moreover, in existence of a plurality of noise sources and/or in providing a plurality of control points to expand a control area, a set of one control filter for a noise reduction and a control filter for noise increase suppression may be adopted. For instance, FIG. 12 shows an example case of two noise sources and two control points.

Figure 12:
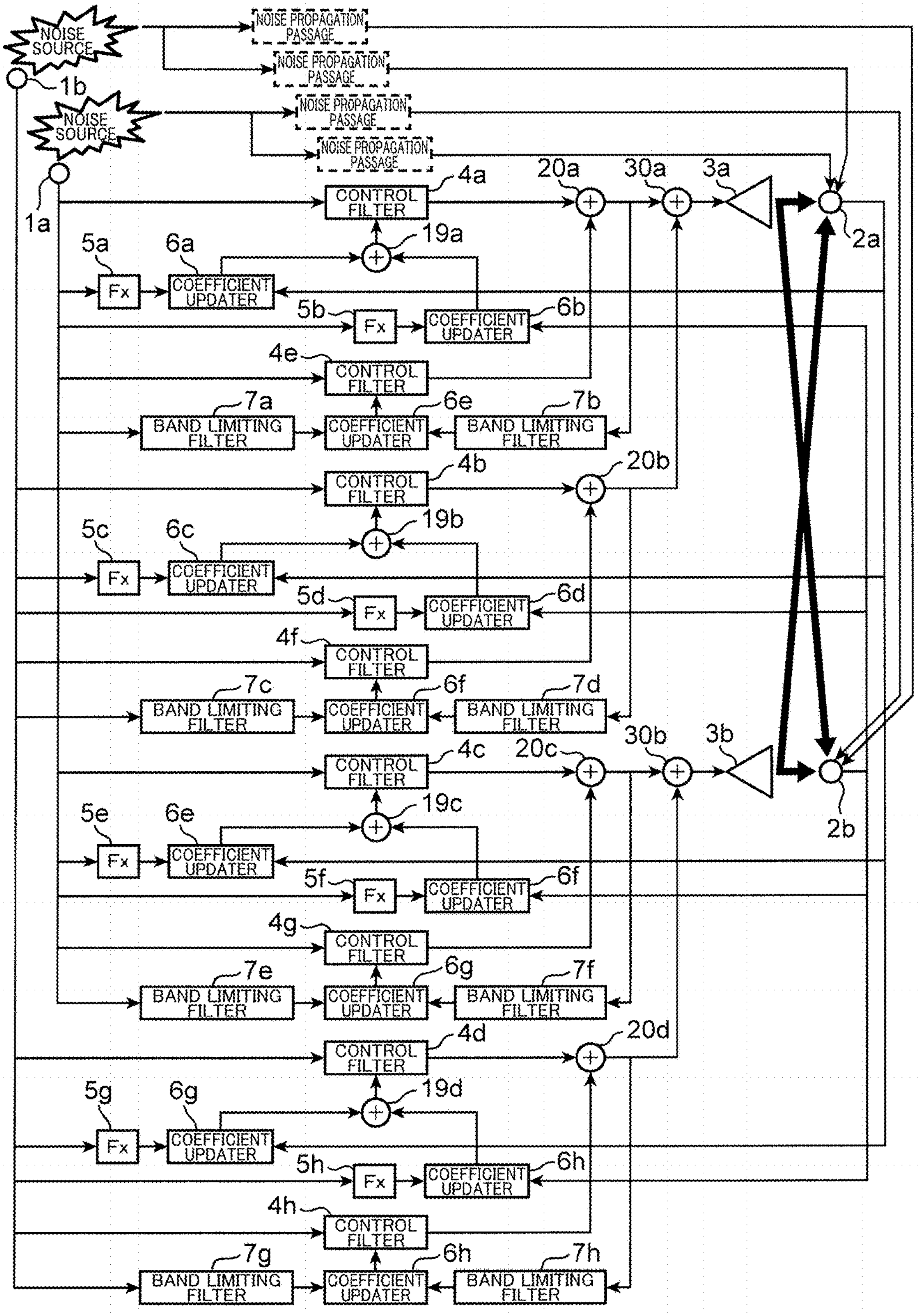
FIG. 12 is a schematic diagram showing a second modification of the configuration of the noise control system according to the first embodiment.

FIG. 12 thus shows four noise propagation passages respectively for the two noise sources and the two control points. Control filters 4_a_, 4_b_, 4_c_, 4_d_ control noises reaching error microphones 2_a_, 2_b_ through the propagation passages. Each of the control filters 4_a_, 4_b_, 4_c_, 4_d_ performs signal processing to a noise signal detected at a noise microphone 1_a_ and/or a noise signal detected at a noise microphone 1_b_ so as to be output to the speaker 3_a_, 3_b_. At this time, when a causality is not satisfied, a noise increases at each of the error microphones 2_a_, 2_b_, and thus, each of control filters 4_e_, 4_f_, 4_g_, 4_h_ suppresses the associated noise increase. Specifically, the control filter 4_e_ reduces a noise increase component contained in an output signal from the control filter 4_a_, the control filter 4_f_ reduces a noise increase component contained in an output signal from the control filter 4_b_, the control filter 4_g_ reduces a noise increase component contained in an output signal from the control filter 4_c_, and the control filter 4_h_ reduces a noise increase component contained in an output signal from the control filter 4_d_.

The configuration described heretofore attains a noise reduction effect while suppressing a noise increase even in the existence of a plurality of noise sources and/or a plurality of control points.

Second Embodiment

Figure 13:
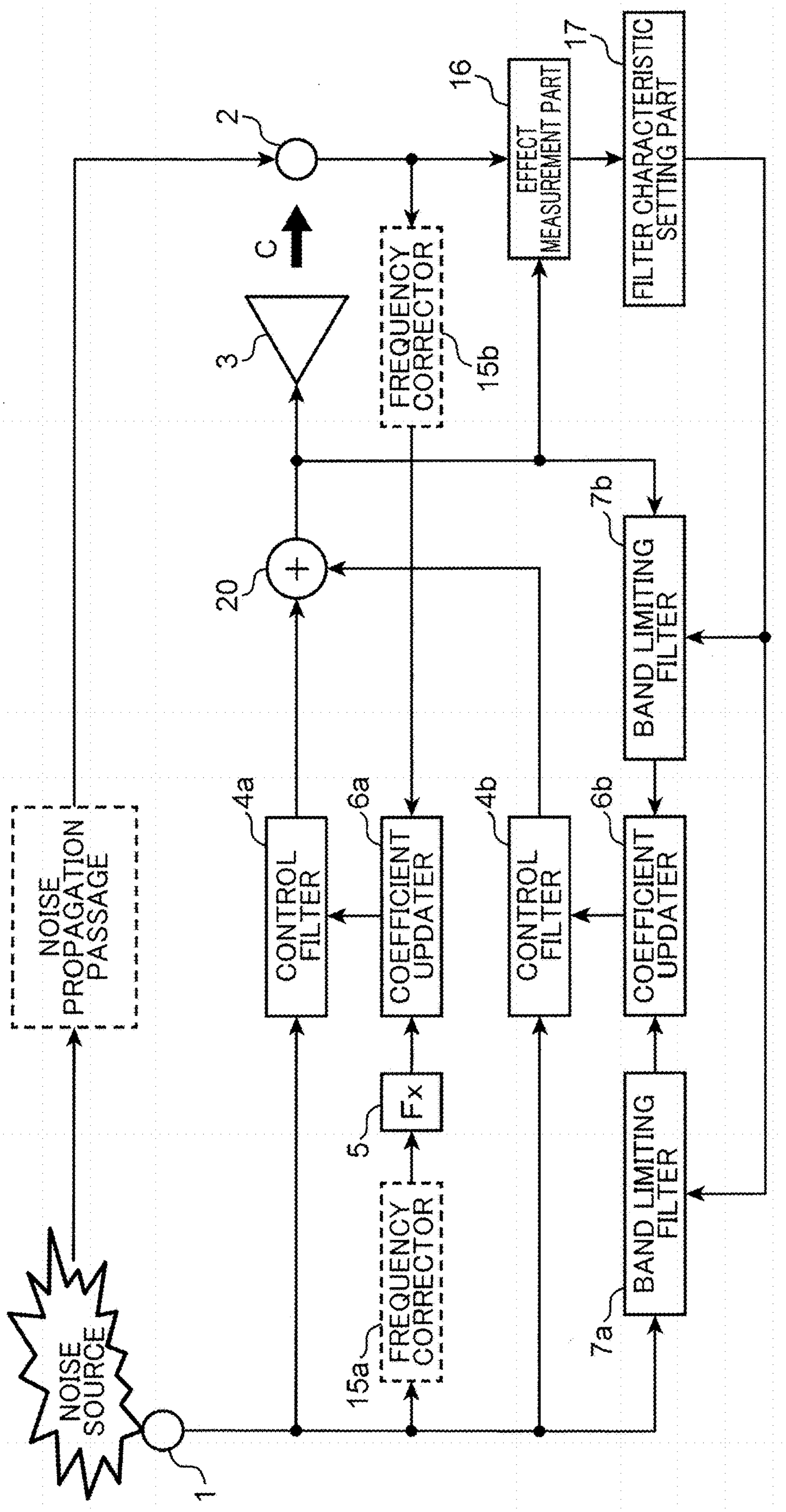
FIG. 13 is a schematic diagram showing a configuration of a noise control system according to a second embodiment.

A configuration of a noise control system according to a second embodiment of the present disclosure will be described. FIG. 13 is a diagram showing the configuration of the noise control system according to the second embodiment.

The noise control system in FIG. 13 includes a noise microphone 1, an error microphone 2, a speaker 3, control filters 4_a_, 4_b_, an Fx filter 5, coefficient updaters 6_a_, 6_b_, band limiting filters 7_a_, 7_b_, and an adder 20 which are equivalent to those in FIG. 1. The elements have the same operability and operations as those in the drawing and have been already described above, and therefore, details of explanation therefor are omitted.

The configuration shown in FIG. 13 additionally includes an effect measurement part 16 and a filter characteristic setting part 17. The additional elements will be described.

First, the control filter 4_a_, the Fx filter 5, and the coefficient updater 6_a_ are activated to perform a noise reduction without activating the control filter 4_b_. Specifically, for instance, a convergence constant of the coefficient updater 6_a_ may be set to an effective value, and a convergence constant of the convergence constant 6_b_ may be set to 0. Alternative various ways include suspending an operation of each of the control filter 4_b_, the band limiting filters 7_a_, 7_b_, and the coefficient updater 6_b_, and keeping an output signal from the control filter 4_b_ from entering the adder 20.

Such operation allows a noise from a noise source and a control sound from the speaker 3 to interfere with each other at the error microphone 2, and an effect representing a result of the interference is detected to be an error signal. The effect measurement part 16 receives the error signal to define the signal as a control-ON signal. The effect measurement part 16 further receives a control signal input into the speaker 3 via the adder 20. The effect measurement part 16 performs predetermined processing to the input signal to generate a control-OFF signal. In this manner, the effect measurement part 16 can confirm a difference between the control-OFF signal and the control-ON signal, i.e., confirm an effect amount, and obtain a result of a noise increase as well as an effect of the noise reduction. The filter characteristic setting part 17 receives the result. The filter characteristic setting part 17 then determines a frequency band in which the noise increases and a level of the increase, and determines an appropriate filter coefficient in accordance with a result of the determination. The filter coefficient is set for each of the band limiting filters 7*a*, 7*b*.

Upon the setting of the filter coefficient of each of the band limiting filters 7*a*, 7*b*, a convergence constant of the coefficient updater 6*b* is set to an appropriate value to start an operation of the control filter 4*b*. This leads to the same state as the state of the configuration described with reference to FIG. 1, and thus, the effect shown in each of FIG. 4 and FIG. 10 is obtainable.

The operation of each of the effect measurement part 16 and the filter characteristic setting part 17 will be described in detail with reference to FIG. 14.

Figure 14:
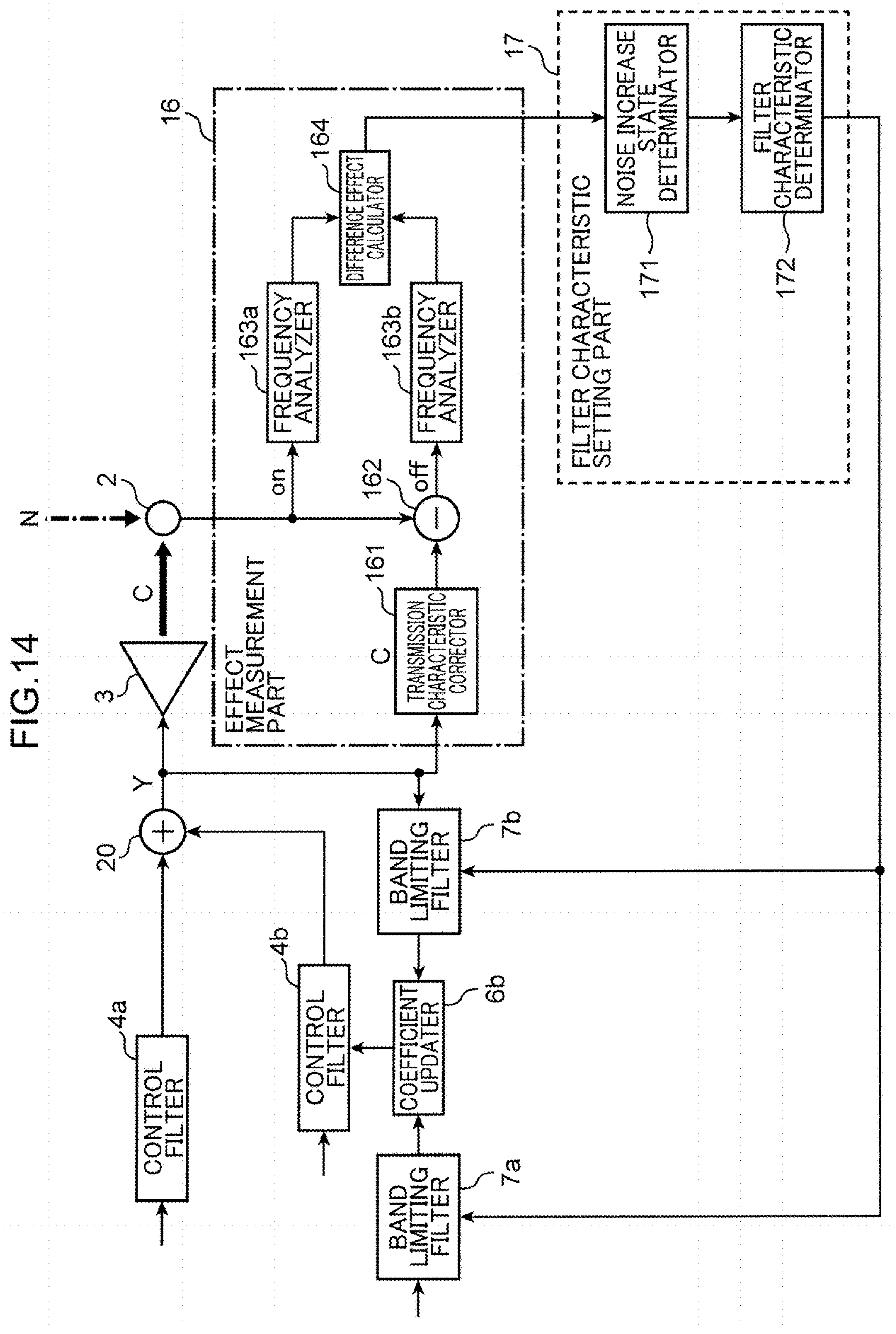
FIG. 14 is a diagram showing respective configurations of an effect measurement part and a filter characteristic setting part in detail.

FIG. 14 shows the effect measurement part 16, the filter characteristic setting part 17, and a periphery therearound extracted from FIG. 13 without illustrating the noise microphone 1 and the Fx filter 5, particularly, shows an internal configuration example of each of the effect measurement part 16 and the filter characteristic setting part 17.

In FIG. 14, the effect measurement part 16 receives an error signal detected at the error microphone 2 to be a control-ON signal. The effect measurement part 16A receives a control signal having passed through the adder 20, and a transmission characteristic corrector 161 performs signal processing to the control signal. Here, the transmission characteristic corrector 161 has a coefficient approximated to a transmission characteristic C from the speaker 3 to the error microphone 2 in the same manner as the Fx filter 5. A subtractor 162 subtracts, from the control-ON signal from the error microphone 2, an output signal from the transmission characteristic corrector 161 to generate a control-OFF signal.

Here, a noise from a noise source at the error microphone 2 is defined as "N", and a control signal from the adder 20 is defined as "Y". In this case, an error signal detected at the error microphone 2, i.e., a control-ON signal, results in "N+CY". By contrast, an output signal from the transmission characteristic corrector 161 is defined as "CY", and thus, an output signal from the subtractor 162, i.e., a control-OFF signal, results in "N+CY−CY=N". In this manner, the control-OFF signal is obtained on the basis of the control-ON signal.

Thereafter, frequency analyzers 163*a*, 163*b* respectively analyses frequency characteristics of the control-ON signal and the control-OFF signal to output an effect of a pre-control (=control-OFF) characteristic and an effect of a post-control (=control-ON) characteristic as shown in an upper graph in FIG. 4. A difference effect calculator 164 receives the control-ON characteristic and the control-OFF characteristic output from the frequency analyzers 163*a*, 163*b* to obtain a difference effect by subtracting the control-ON characteristic from the control-OFF characteristic, i.e, "control-OFF characteristic-control-ON characteristic", as shown in a lower graph in FIG. 4. The effect in FIG. 4 results from appropriate operations of both the control filters 4*a*, 4*b* in the configuration shown in FIG. 1 and indicates a state where a noise increase is suppressed owing to the disclosure. By contrast, the operation of only the control filter 4*a* leads to the effect shown in FIG. 45, and the difference effect calculator 164 outputs a difference effect based on "a control-OFF characteristic-a control-ON characteristic" while including an occurrence of a noise increase. A noise increase state determinator 171 in the filter characteristic setting part 17 obtains a frequency band in which a noise increases and a noise increase level from the difference effect from the difference effect calculator 164. For instance, a frequency with a noise increase over a certain threshold (e.g., −2 dB) is found out, and the frequency is defined as a resonant frequency, i.e., a cutoff frequency "fc", in consideration of the lower graph in FIG. 45. When the noise increase is seen at a frequency which is higher than the frequency fc, an HPF is selected. By contrast, when the noise increase is seen at a frequency which is lower than the frequency fc, an LPF is selected. Next, a filter characteristic determinator 172 receives an input of a filter condition that the order of the type of the selected filter initially defined as having a characteristic of the first-order, and the filter characteristic determinator 172 obtains and sets a filter coefficient of each of the band limiting filters 7*a*, 7*b* under the filter condition.

Upon the setting of the filter coefficient of each of the band limiting filters 7*a*, 7*b*, a convergence constant of the coefficient updater 6*b* is set to an appropriate value to start an operation of the control filter 4*b*, and the control filters 4*a*, 4*b* and the coefficient updaters 6*a*, 6*b* simultaneously execute a noise reduction control and noise increase suppression. After the operation state is kept for a given period, the effect measurement part 16 measures an effect again, and the filter characteristic setting part 17 designs a filter coefficient in accordance with a result of the measurement again. For instance, in the case where the first-order HPF is initially adopted, a second-order HPF is subsequently adopted. In this manner, the order may be changed with the same frequency fc, or alternatively, the frequency may be changed with the same order. Then, the redesigned filter coefficient is set for each of the band limiting filters 7*a*, 7*b* to operate the control filter 4*b* and the coefficient updater 6*b* under the newly set condition. After each of the control filters 4*a*, 4*b* is operated for a given period, the effect measurement part 16 measures an effect again, and the filter characteristic setting part 17 designs a filter coefficient in accordance with a result of the measurement again. Repeating the operation sequence finally leads to attainment of the control effect without a noise increase as shown in FIG. 4.

Conclusively, the embodiment permits the effect measurement part 16 to confirm a noise reduction effect and a situation about an occurrence of a noise increase from a control result detected from the error microphone 2, and permits the filter characteristic setting part 17 to obtain a filter coefficient of each of the band limiting filters 7*a*, 7*b*. Repeating the operation sequence leads to optimization of the filter coefficient of each of the band limiting filters 7*a*, 7*b*, and finally, an optimal noise reduction effect along with suppression of a noise increase at a location of the error microphone 2 is succeeded.

Besides, the internal configuration of the effect measurement part 16 as shown in FIG. 14 enables simultaneous measurement of each of a control-ON characteristic and a control-OFF characteristic while suppressing a noise. However, the configuration is not limited to the one. For example, a control-OFF characteristic may be measured before the control filters 4*a*, 4*b* are operated, and the control filters 4*a*, 4*b* are subsequently operated to thereafter measure the control-ON characteristic.

Figure 15:
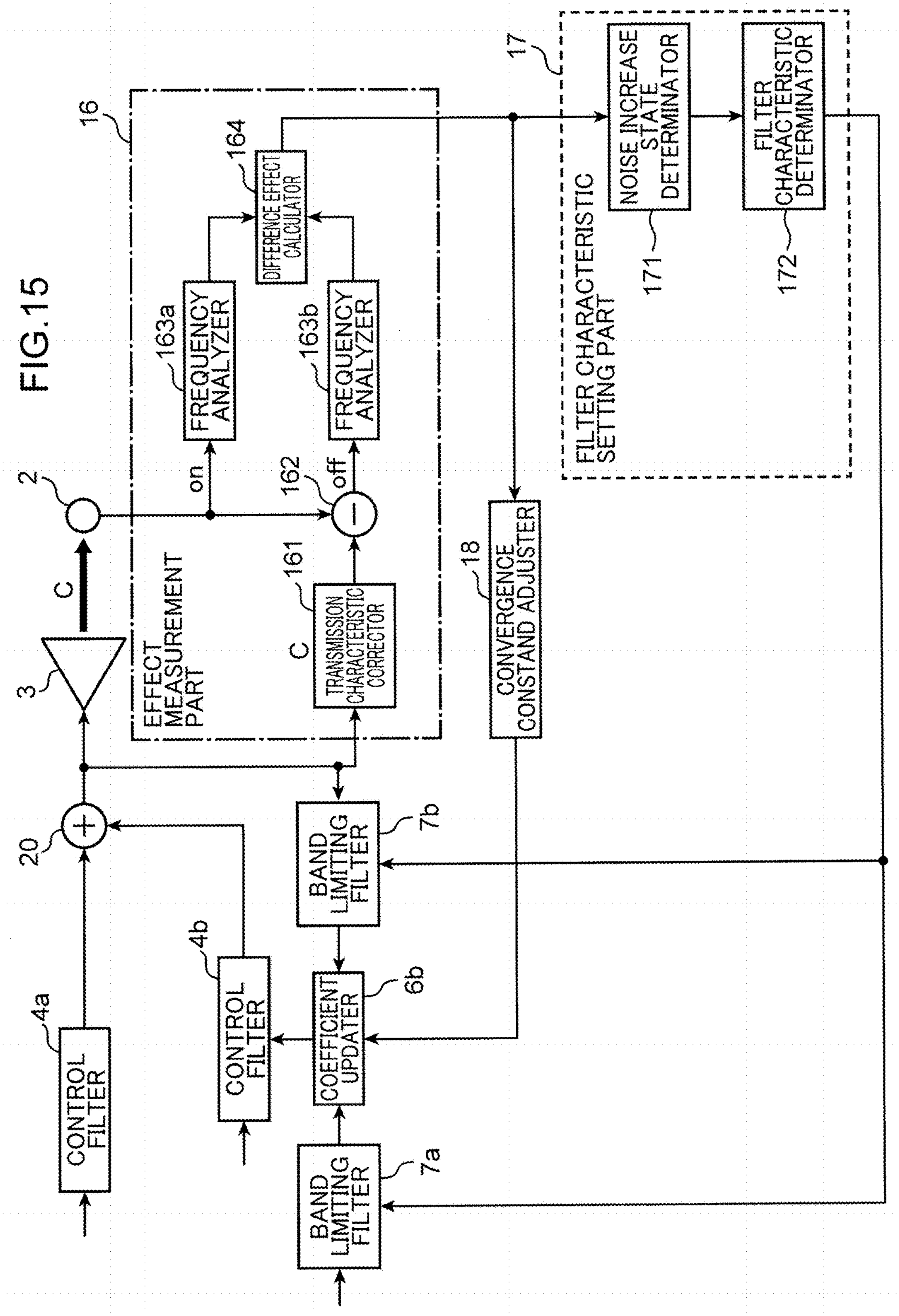
FIG. 15 is a schematic diagram showing a modification of the configuration of the noise control system according to the second embodiment.

The way of setting the filter coefficient of each of the band limiting filters 7*a*, 7*b* is described with reference to FIG. 13 and FIG. 14. FIG. 15 further shows a way of adjusting a convergence constant of the coefficient updater 6*b*. However, it is not indispensable to mount both a convergence constant adjuster 18 and the filter characteristic setting part 17. The configuration in FIG. 15 may exclude the filter characteristic setting part 17.

In comparison with the configuration in FIG. 14, FIG. 15 shows a configuration additionally including the convergence constant adjuster 18 that sets a convergence constant of the coefficient updater 6*b* in accordance with a difference effect signal based on "a control-OFF characteristic-a control-ON characteristic" to be output from a difference effect calculator 164 and input into a noise increase state determinator 171.

The convergence constant adjuster 18 sets the convergence constant of the coefficient updater 6*b* to a predetermined initial value to initially operate the control filter 4*b* and the coefficient updater 6*b*. The control filters 4*a*, 4*b* and the coefficient updaters 6*a*, 6*b* are operated under the setting for a given period, and thereafter, a difference effect signal based on "a control-OFF characteristic-a control-ON characteristic" is input into the noise increase state determinator. When a level of the noise increase does not decrease, the convergence constant is set to a value larger than the initial value for the coefficient updater 6*b*. The control filters 4*a*, 4*b* and the coefficient updaters 6*a*, 6*b* are operated under this setting for another given period, and thereafter, a difference effect signal based on "a control-OFF characteristic-a control-ON characteristic" is input into the noise increase state determinator to check a level of a noise increase. When the noise increase still remains without reduction, the convergence constant of the coefficient updater 6*b* is increased to a much larger value. By contrast, when the noise increase is reduced, the control filters 4*a*, 4*b* and the coefficient updaters 6*a*, 6*b* are operated for another given period without changing the convergence constant. The operation sequence is repeated until the noise increase ceases or reaches a minimum.

As described heretofore, the configuration in FIG. 15 achieves optimization of the convergence constant of the coefficient updater 6*b* independently of the convergence constant of the coefficient updater 6*a* as well as optimization of the band limiting filters 7*a*, 7*b*.

The embodiment including the effect measurement part 16 and the filter characteristic setting part 17 enables appropriate acquisition of an effect amount in a noise control and appropriate setting of a filter coefficient of each of the band limiting filters 7*a*, 7*b* that extracts, in accordance with a result of the acquisition, a frequency band in which a noise increases. The embodiment further including the convergence constant adjuster 18 achieves optimization of the operation of the control filter 4*b* to suppress a noise increase. As a result, a noise reduction effect is attained while suppression of a noise increase is achieved.

The present disclosure is particularly applicable to an ANC system which reduces an operation noise, such as a noise from an automobile, an air conditioner, or a cleaner.

The invention claimed is:

1. A noise control system, comprising:

a noise detector that detects a noise from a noise source to output a noise signal;

a first control filter that performs signal processing to the noise signal to output a first control signal;

a second control filter that performs signal processing to the noise signal to output a second control signal;

an adder that adds the first control signal and the second control signal to output a third control signal;

a speaker that generates a control sound on the basis of the third control signal;

an error microphone that is provided at a control point and detects an interference sound of the noise and the control sound to output an error signal;

a transmission characteristic corrector that has a transmission characteristic coefficient in accordance with a transmission characteristic from the speaker to the error microphone and performs signal processing to the noise signal on the basis of the transmission characteristic coefficient;

a first coefficient updater that updates, on the basis of an output signal from the transmission characteristic corrector and the error signal, a coefficient of the first control filter so as to minimize the error signal;

a first band limiting filter that performs a band limitation to the noise signal in such a manner as to fall within a predetermined frequency band;

a second band limiting filter that performs a band limitation to the third control signal in such a manner as to fall within the predetermined frequency band; and a second coefficient updater that updates, on the basis of an output signal from the first band limiting filter and an output signal from the second band limiting filter, a coefficient of the second control filter so as to minimize the output signal from the second band limiting filter.

2. The noise control system according to claim 1, wherein the first control filter has the number of taps which is different from the number of taps in the second control filter.

3. The noise control system according to claim 2, wherein the number of taps in the second control filter is smaller than the number of taps in the first control filter.

4. The noise control system according to claim 1, wherein the predetermined frequency band is a frequency band in which the error signal increases the noise.

5. The noise control system according to claim 1, further comprising a plurality of processing groups each including the second control filter, the first band limiting filter, the second band limiting filter, and the second coefficient updater, the processing groups having different predetermined frequency bands from each other.

6. The noise control system according to claim 1, wherein the control point includes a first control point and a second control point, and the speaker includes a first speaker for the first control point and a second speaker for the second control point, the noise control system further comprising first and second processing groups each including the second control filter, the first band limiting filter, the second band limiting filter, and the second coefficient updater, the first processing group being for the first speaker and the second processing group being for the second speaker.

7. The noise control system according to claim 1, further comprising:

an effect measurement part that measures a noise control effect on the basis of the error signal; and a filter characteristic setting part that determines the predetermined frequency band on the basis of the noise control effect measured by the effect measurement part, and sets a filter coefficient of each of the first band limiting filter and the second band limiting filter.

8. The noise control system according to claim 7, wherein the effect measurement part generates a difference signal between the error signal and the third control signal, and measures the noise control effect on the basis of the error signal and the difference signal.

9. The noise control system according to claim 1, further comprising:

an effect measurement part that measures a noise control effect on the basis of the error signal; and a convergence constant adjuster that adjusts a convergence constant of the second coefficient updater on the basis of the noise control effect measured by the effect measurement part.

10. The noise control system according to claim 1, further comprising:

a first frequency characteristic adjusting filter that adjusts a frequency characteristic of the noise signal; and a second frequency characteristic adjusting filter that adjusts a frequency characteristic of the error signal, wherein the transmission characteristic corrector receives an output signal from the first frequency characteristic adjusting filter, and the first coefficient updater updates, on the basis of an output signal from the transmission characteristic corrector and an output signal from the second frequency characteristic adjusting filter, the coefficient of the first control filter so as to minimize the output signal from the second frequency characteristic adjusting filter.

11. A non-transitory computer-readable recording medium including a program for operating a signal processor mounted on a noise control system including a noise detector that detects a noise from a noise source to output a noise signal, a speaker that generates a control sound, and an error microphone that is provided at a control point and detects an interference sound of the noise and the control sound to output an error signal, the program comprising:

by the signal processor by executing the program, causing a first control filter to perform signal processing to the noise signal to output a first control signal;

causing a second control filter to perform signal processing to the noise signal to output a second control signal;

outputting a third control signal by adding the first control signal and the second control signal;

causing a transmission characteristic corrector having a transmission characteristic coefficient in accordance with a transmission characteristic from the speaker to the error microphone to perform signal processing to the noise signal on the basis of the transmission characteristic coefficient;

updating, on the basis of an output signal from the transmission characteristic corrector and the error signal, a coefficient of the first control filter so as to minimize the error signal; and updating a coefficient of the second control filter, on the basis of an output signal from a first band limiting filter that performs a band limitation to the noise signal in such a manner as to fall within a predetermined frequency band and an output signal from a second band limiting filter that performs a band limitation to the third control signal in such a manner as to fall within the predetermined frequency band, so as to minimize the output signal from the second band limiting filter.

12. A noise control method to be executed by a noise control system including a noise detector that detects a noise from a noise source to output a noise signal, a speaker that generates a control sound, and an error microphone that is provided at a control point and detects an interference sound of the noise and the control sound to output an error signal, the method comprising:

by a signal processor, causing a first control filter to perform signal processing to the noise signal to output a first control signal;

causing a second control filter to perform signal processing to the noise signal to output a second control signal;

outputting a third control signal by adding the first control signal and the second control signal;

causing a transmission characteristic corrector having a transmission characteristic coefficient in accordance with a transmission characteristic from the speaker to the error microphone to perform signal processing to the noise signal on the basis of the transmission characteristic coefficient;

updating, on the basis of an output signal from the transmission characteristic corrector and the error signal, a coefficient of the first control filter so as to minimize the error signal; and updating a coefficient of the second control filter, on the basis of an output signal from a first band limiting filter that performs a band limitation to the noise signal in such a manner as to fall within a predetermined frequency band and an output signal from a second band limiting filter that performs a band limitation to the third control signal in such a manner as to fall within the predetermined frequency band, so as to minimize the output signal from the second band limiting filter.

* * * * *